United States Patent [19]

Kruse

[11] Patent Number: 4,918,973
[45] Date of Patent: Apr. 24, 1990

[54] APPARATUS AND METHOD FOR CALIBRATING A MEASURING DEVICE

[75] Inventor: Richard M. Kruse, Wichita, Kans.

[73] Assignee: Great Plains Industries, Inc., Wichita, Kans.

[21] Appl. No.: 170,315

[22] Filed: Mar. 18, 1988

[51] Int. Cl.⁵ ............................................. G01F 25/00
[52] U.S. Cl. ..................................... 73/3; 364/571.08
[58] Field of Search ...................... 73/3; 364/571, 510, 364/571.01–571.08

[56] References Cited

U.S. PATENT DOCUMENTS

| 3,517,308 | 6/1970 | Mirdadian | 73/3 X |
| 3,633,401 | 1/1972 | Wada | 73/3 |
| 3,783,248 | 1/1974 | Sugden, Jr. | 235/92 FL |
| 3,795,131 | 3/1974 | Wade et al. | 73/3 |
| 3,823,310 | 2/1974 | Kalotay et al. | 364/571.08 X |
| 4,509,373 | 4/1985 | Brown | 73/861.28 |
| 4,520,650 | 6/1985 | Palmer et al. | 73/3 |
| 4,676,112 | 6/1987 | Uematsu et al. | 73/861.17 |
| 4,700,579 | 10/1987 | Hall | 73/861.78 |

FOREIGN PATENT DOCUMENTS

| 11765 | 1/1979 | Japan | 73/3 |
| 51562 | 4/1979 | Japan | 73/3 |
| 113359 | 9/1979 | Japan | 73/3 |
| 23443 | 2/1980 | Japan | 73/3 |
| 202119 | 9/1986 | Japan | 73/3 |
| 1027528 | 7/1983 | U.S.S.R. | 73/3 |

OTHER PUBLICATIONS

Great Plains Industries, Inc., Product Bulletin No. 920614-1, "Electronic Digital Meters by GPI", 4 pages, 11-1986.

Primary Examiner—Tom Noland
Attorney, Agent, or Firm—Bill D. McCarthy

[57] ABSTRACT

A calibration apparatus includes a microcomputer-based calibrator unit, functioning separately from a measuring device to be calibrated, and a coupling coil, through which calibration information generated by the calibrator unit is electromagnetically transmitted to the measuring device to which the coil is strapped or otherwise connected. This permits the measuring device to be calibrated without the measuring device being removed from the environment in which it is to make measurements. The methodology of the apparatus permits the measuring device to be calibrated either with standard calibration data, such as whereby the measuring device is calibrated to a factory standard calibration, or with variable calibration data, such as whereby a then-current calibration of the measuring device is "tweaked".

6 Claims, 10 Drawing Sheets

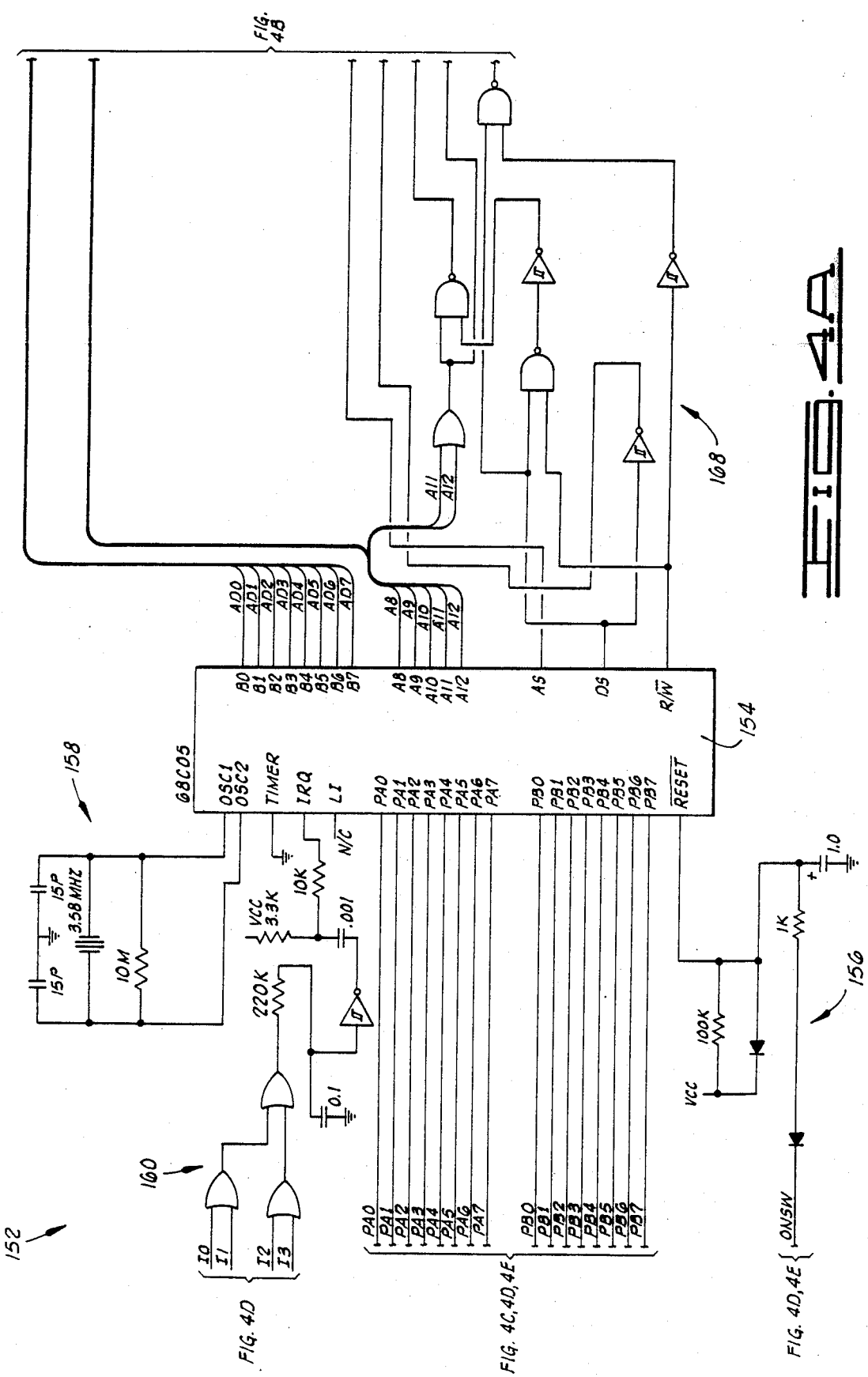

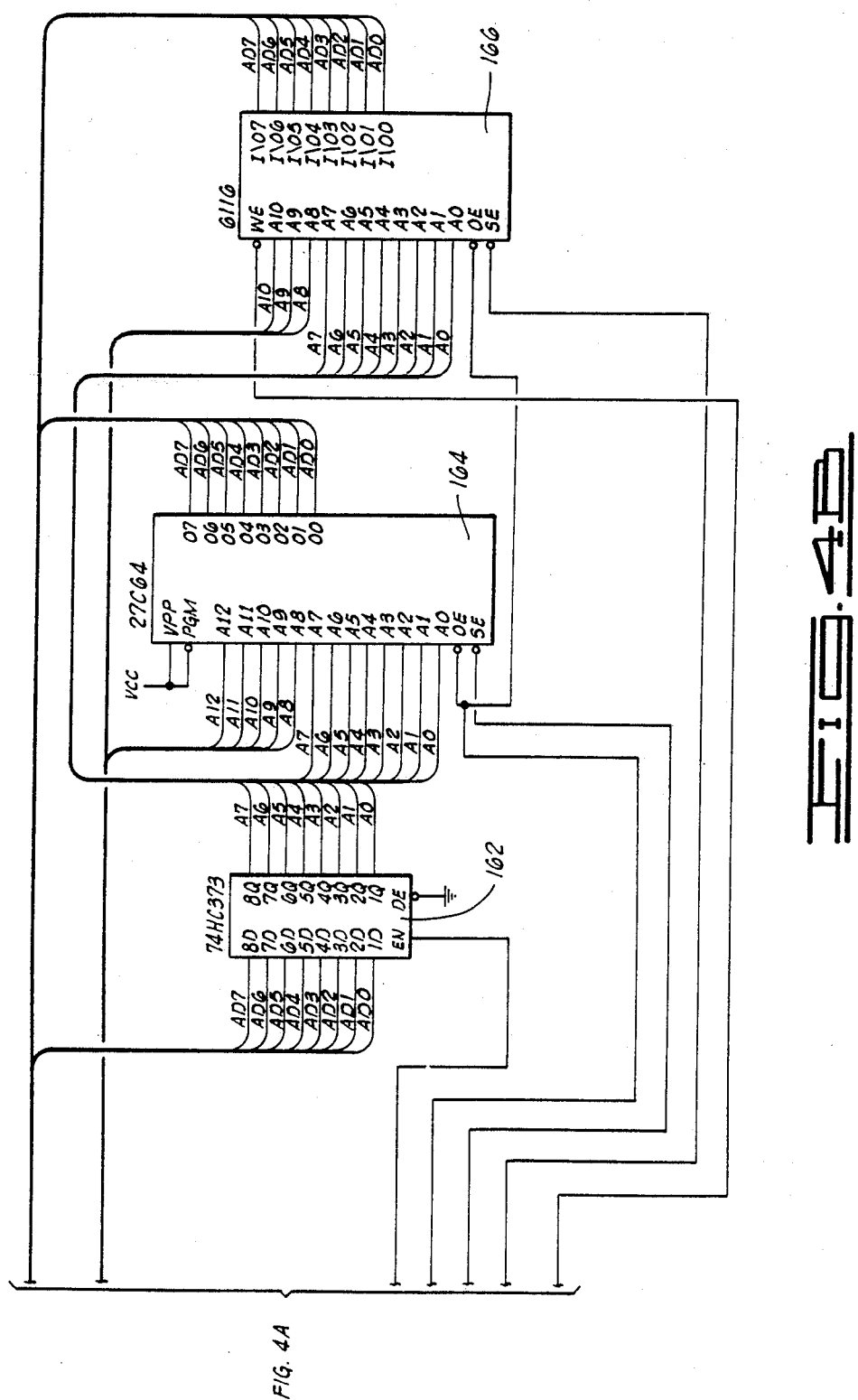

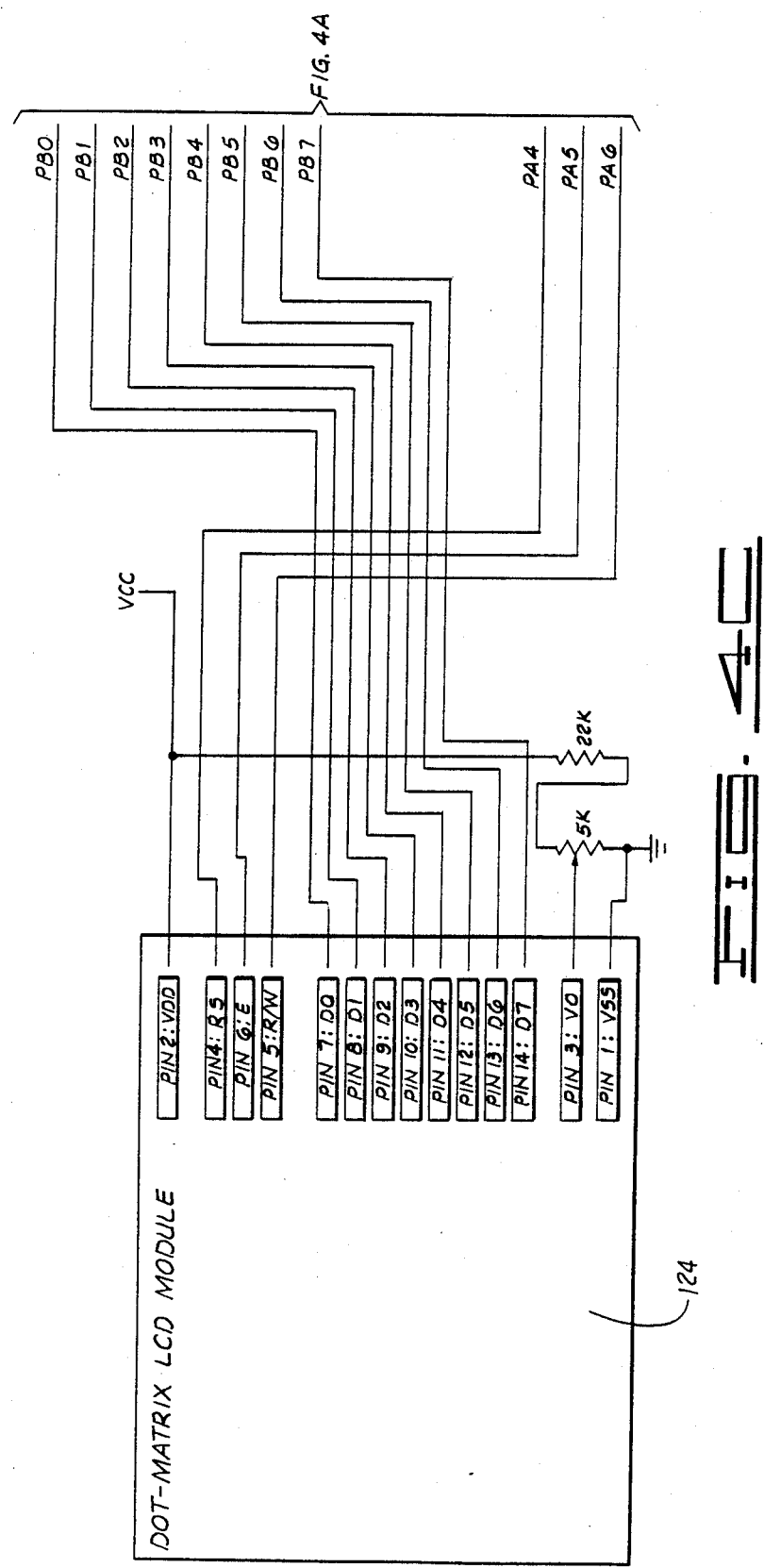

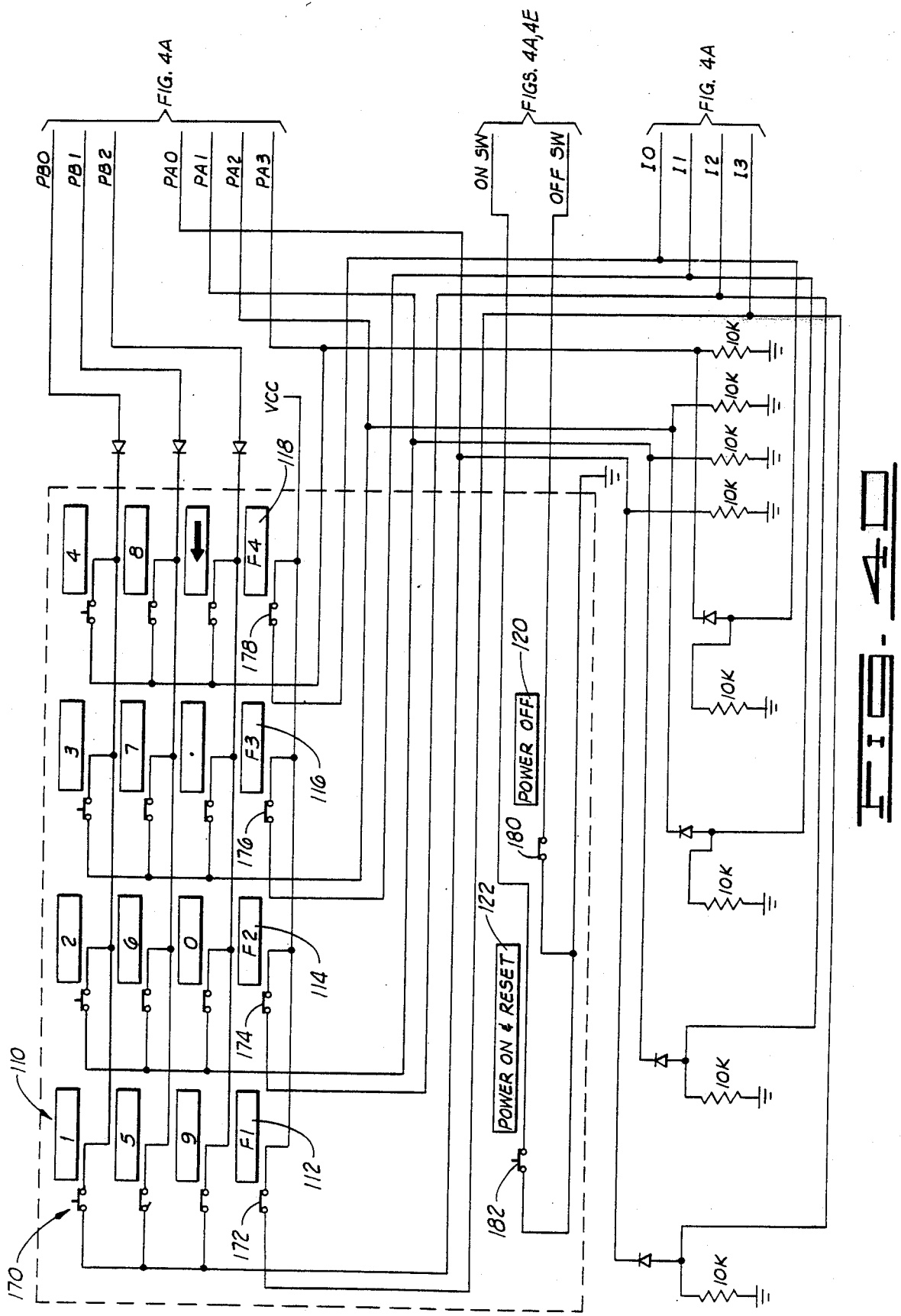

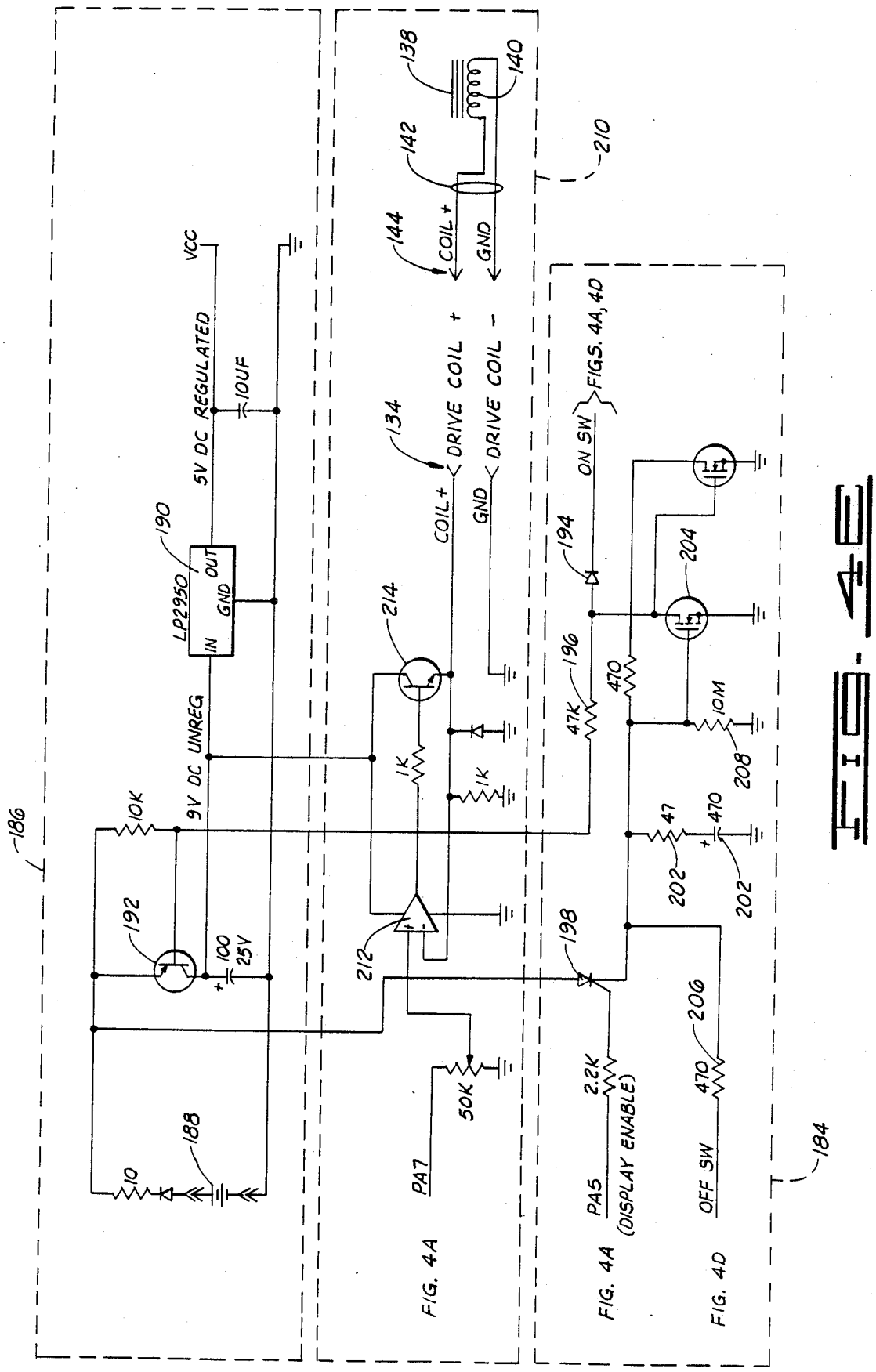

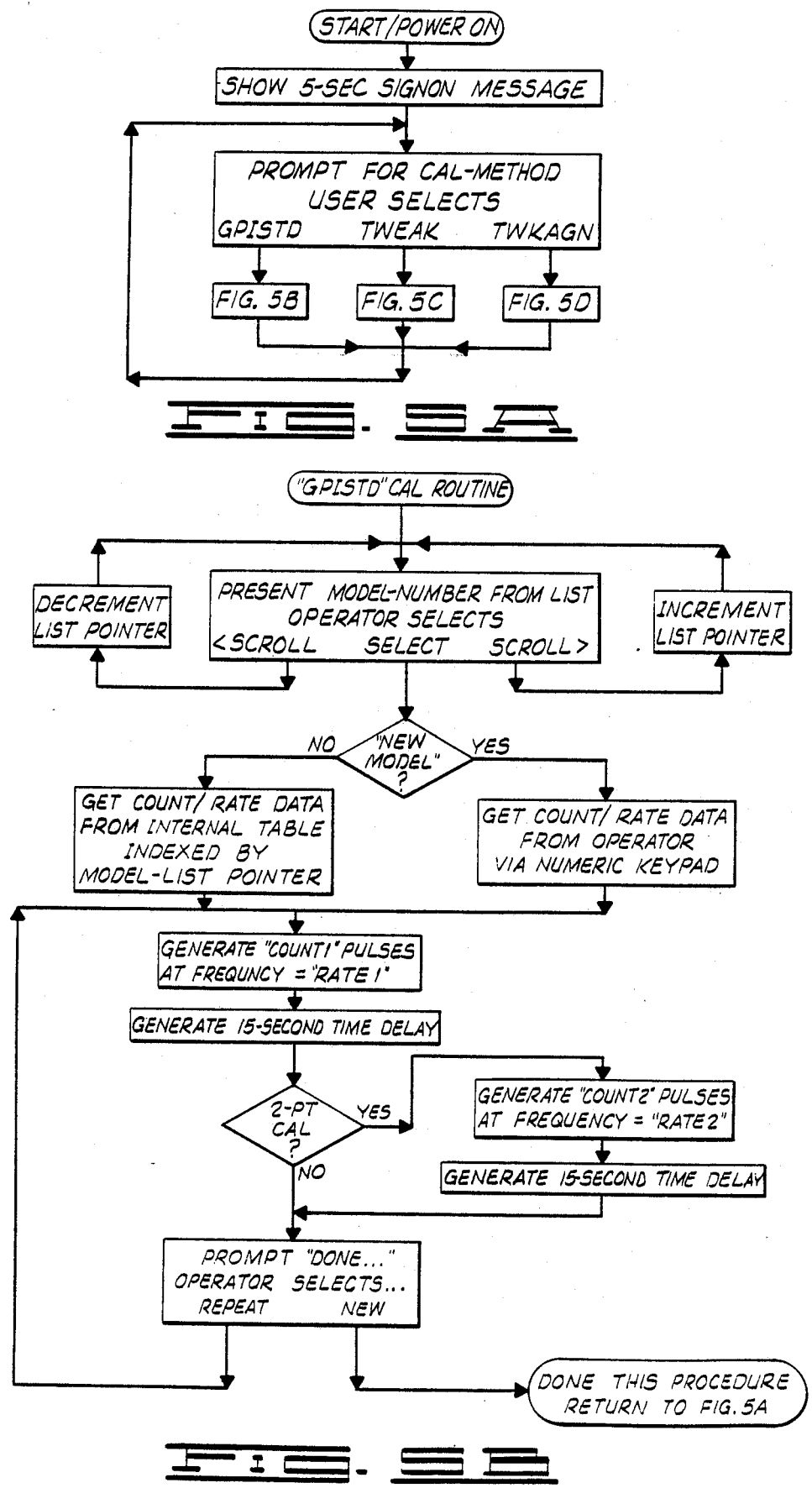

APPARATUS AND METHOD FOR CALIBRATING A MEASURING DEVICE

BACKGROUND OF THE INVENTION

This invention relates generally to apparatus and methods for calibrating measuring devices and particularly, but not by way of limitation, to apparatus and methods for calibrating a flowmeter which includes a body and an electromagnetic member disposed in the body.

To measure a parameter with a measuring device, the parameter causes the measuring device to generate a measurement signal which is used to drive a display of the measuring device whereby the measure of the parameter is made known to an observer. By way of example, consider a fluid flowing through a pipe. The operator who is flowing the fluid commonly desires to measure how much of the fluid is flowing or has flowed. To make such a measurement, a flowmeter can be inserted in line with the pipe so that the flowing fluid impinges on a rotor of the flowmeter, thereby rotating the rotor and causing electrical pulses to be generated in a known manner within the flowmeter. Using an internal calibration factor, the flowmeter converts the number of pulses into the corresponding quantity of fluid and displays that quantity through the display.

As is readily apparent, the accuracy of the displayed value depends, at least in part, on the correctness of the calibration factor. The accuracy also depends on the stability of the electrical and mechanical operation of the flowmeter. Thus, if the electrical or mechanical operation changes, the calibration factor must also be changed to compensate for these other changes. Furthermore, for the specific example of a flowmeter, the correctness of the calibration factor can vary depending upon the type of fluid to be measured, or the plumbing configuration of the fluid circuit into which the flowmeter is connected, or the turbulence of the flow, or the presence of air in the fluid. Whatever the reason, however, it is apparent that to maintain an accurately operating measuring device, such as a flowmeter, one must be able to calibrate the device as needed. That is, one must be able to reset or adjust the calibration factor by which the measuring device correlates the measurement signal it generates to the actual parameter.

With respect to the example of a flowmeter, there is at least one type of slowmeter which can be internally calibrated by flowing a known quantity of fluid through the flowmeter. This type of calibration can, however, be an undesirable technique when, for example, the fluid is expensive or hazardous whereby one does not want to use the fluid merely for calibrating.

Again with respect to the example of a flowmeter, there is at least one type of flowmeter which has an ability to internally calibrate itself within certain preset data or controls contained in the flowmeter. Such preset data, however, do not encompass all the various changes to the calibration factor which a user of the flowmeter may wish to make. For example, the preset data may pertain only to a factory standard calibration which is optimum for only one type of fluid, whereas the flowmeter itself could be used to measure other types of fluids if the flowmeter could be optimally calibrated to such other types. Although such a flowmeter could be removed from the fluid circuit and rebuilt or reprogrammed or otherwise modified as needed to input the desired calibration factor, such removal may be impractical or otherwise undesirable for a specific application of the flowmeter (e.g., if the flowmeter has been permanently plumbed into the fluid circuit).

To overcome these specific exemplary shortcomings, there is the need for an apparatus and a method for calibrating such a flowmeter without having to create an actual flow of the fluid for which the calibration is to be made and without having to remove the flowmeter from the fluid circuit. It is contemplated that other types of measuring devices can be calibrated by a comparable apparatus and method; therefore, more broadly, there is the need for an improved apparatus and method for calibrating measuring devices whereby the actual parameter to be measured need not be used and whereby the measuring device can be calibrated in situ (i.e., at the location where it is to do its measuring).

SUMMARY OF THE INVENTION

The present invention overcomes the above-noted and other shortcomings of the prior art by providing a novel and improved apparatus and method for calibrating a measuring device. This calibration occurs without the need of applying the actual parameter to be measured and without removing the measuring device from its measuring position. In a specific embodiment, the present invention can be used for calibrating a flowmeter without flowing a fluid through the meter during the calibration and while maintaining the flowmeter in situ within the fluid circuit.

The apparatus of the present invention broadly comprises: calibration signal generating means for generating, independently of the operation of the measuring devices, a calibration signal; and communicating means for communicating the calibration signal to the measuring device without disassembling the measuring device.

With specific reference to calibrating a flowmeter which includes a body and an electromagnetic member disposed in the body, the apparatus of the present invention comprises: calibration means for providing a calibration signal characterized as electrical pulses; electromagnetic means, connected to the calibration means, for transmitting electromagnetic pulses in response to the electrical pulses; and means for connecting the electromagnetic means to the body of the flowmeter so that the electromagnetic member of the flowmeter is responsive to the electromagnetic pulses.

The present invention also provides a method of calibrating a measuring device, which method comprises the steps of: generating, separately from the measuring device, a calibration signal; converting the calibration signal into electromagnetic energy; and coupling the electromagnetic energy to the measuring device.

Utilizing a calibration apparatus, which includes a calibration microcomputer having preset calibration data stored therein, a data entry means for entering data into the calibration microcomputer, and a coil connected to the calibration microcomputer, to calibrate a flowmeter connected into a line through which fluid can flow, which flowmeter includes a body and which flowmeter also includes the following disposed in the body: an electromagnetic member, a display, a flowmeter microcomputer connected to the electromagnetic member and the display, and control means for placing the flowmeter microcomputer in a calibration mode of operation, the present invention more specifically provides a method comprising the steps of: coupling the coil of the calibration apparatus to the body of the flowmeter without removing the flowmeter from the line; operating the control means of the flowmeter to place the flowmeter microcomputer in the calibration mode; activating the calibration microcomputer; operating the data entry means of the calibration apparatus so that the calibration microcomputer generates a calibration signal; and transmitting the calibration signal through the coil of the calibration apparatus to the electromagnetic member of the flowmeter.

Therefore, from the foregoing, it is a general object of the present invention to provide a novel and improved apparatus and a novel and improved method for calibrating a measuring device. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIGS. 4A-4E are schematic circuit diagrams of electronic components of the calibrator apparatus shown in FIG. 3.

FIGS. 5A-5D are programming flow charts for operating the preferred embodiment calibrator apparatus depicted in FIGS. 3 and 4A-4E.

DETAILED DESCRIPTION OF THE PREFERRED EMBODIMENT

Figure 1:
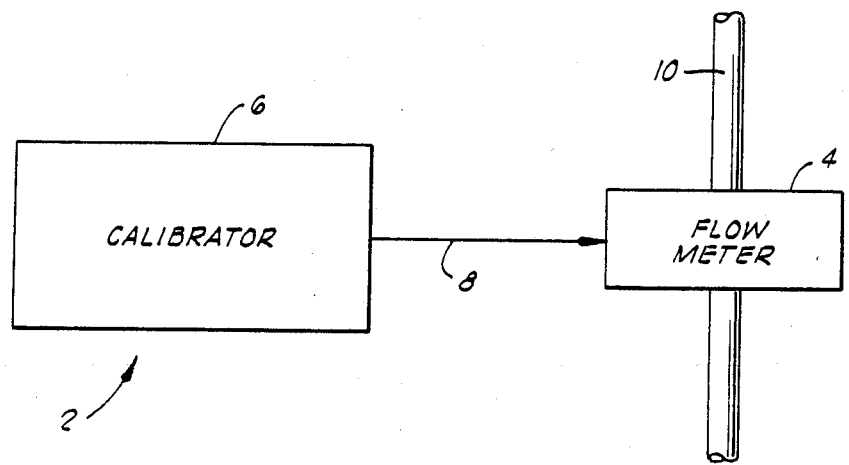
FIG. 1 is a block diagram of a calibrator apparatus for calibrating a flowmeter, which calibrator apparatus is constructed in accordance with the present invention.

The present invention generally provides an apparatus 2 for calibrating a measuring device which is specifically shown as a flowmeter 4 in FIG. 1. The apparatus 2 comprises a calibrator 6 providing means for generating a calibration signal, and the apparatus 2 also comprises communicating means 8 for communicating the calibration signal to the measuring device, namely the flowmeter 4 for the embodiment represented in FIG. 1. The calibrator 6 and the communicating means 8 are constructed and adapted so that they can be used with the flowmeter 4 without removing the flowmeter 4 from its in-line location or connection within a fluid circuit, a part of which is represented in FIG. 1 by a pipe or conduit 10. The apparatus 2 can also be used with the flowmeter 4 when the flowmeter 4 is not connected into a fluid circuit. Although the preferred embodiment of the calibrator 6 and the communicating means 8 will be described herein with reference to the flowmeter 4, it is contemplated that the present invention is applicable or adaptable to use with other types of measuring devices.

Figure 2:
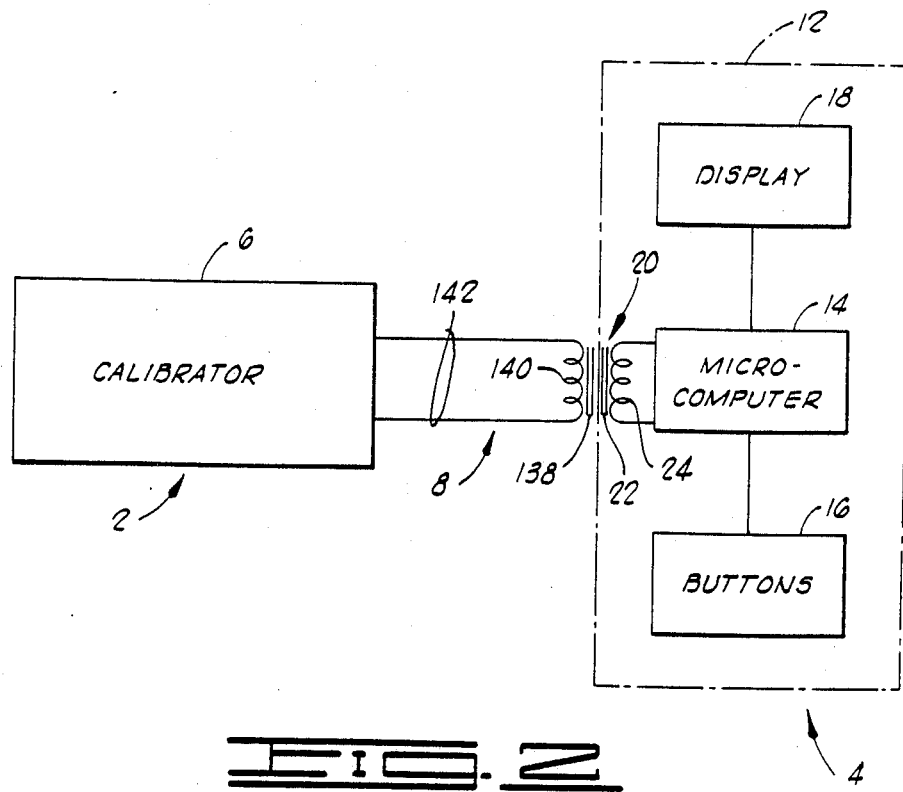
FIG. 2 is a block diagram showing certain components of a particular type of flowmeter with which the preferred embodiment calibrator apparatus of the present invention is adapted to be used.

In describing the preferred embodiment of the apparatus 2 with reference to its use with the flowmeter 4, this description is referenced to a particular type of flowmeter which includes, at least in part, components represented in FIG. 2. This particular type of flowmeter 4 includes a body 12 (see also FIG. 3) in which a microcomputer 14, control buttons 16, and a display 18 are disposed. The buttons 16 actuate switches (not shown) connected to the microcomputer 14 to control at least in part the operation of the flowmeter 4; included in this control is the ability to place the flowmeter 4 in a calibration mode of operation. The display 18 is connected to the microcomputer 14 so that the computed measurement of the measured parameter, for example, can be displayed through the display 18 by the microcomputer 14. The flowmeter 4 also includes an electromagnetic member 20, specifically a metallic core 22 and coil 24, which is connected to the microcomputer 14, as is also represented in FIG. 2. The electromagnetic member 20 generates electrical pulses, which are counted by the microcomputer 14, when a rotor carrying ferrous slugs (not shown) of the flowmeter is rotated relative to the meter 20 in response to fluid flow through the conduit 10 and the flowmeter 4. An example of the type of flowmeter 4 just described is disclosed in U.S. Pat. No. 4,700,579 to Hall, issued Oct. 20, 1987, and assigned to the assignee of the present invention, which patent is incorporated herein by reference. Specific commercial models of flowmeters with which the preferred embodiment of the apparatus 2 can be used include calibratable models of the Electronic Digital Meters of Great Plains Industries, Inc. such as are described in the Great Plains Industries Product Bulletin No. 920614-1, which is also incorporated herein by reference.

Figure 3:
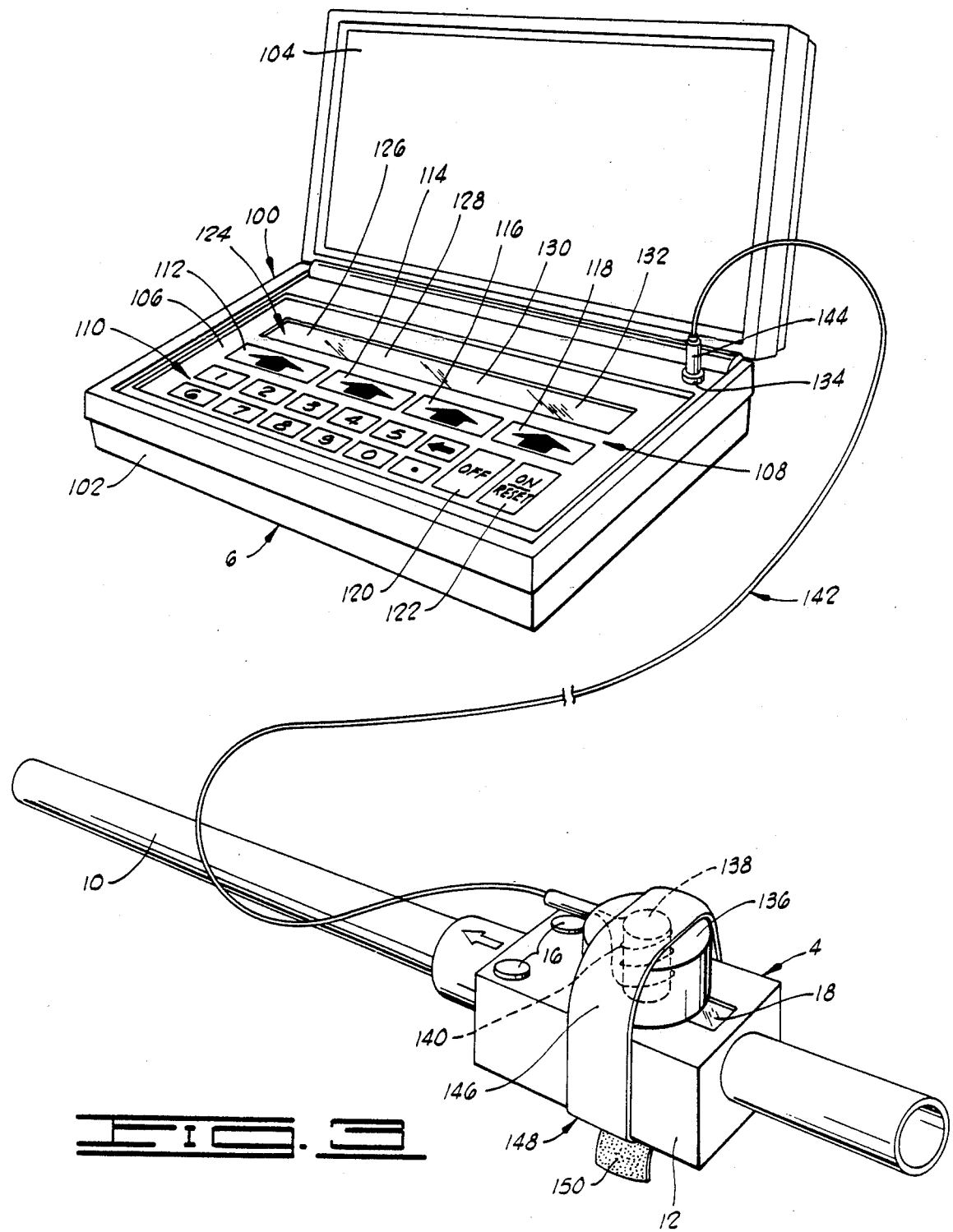
FIG. 3 is a perspective exterior view of the calibrator apparatus of the preferred embodiment of the present invention.

Referring to FIG. 3, the external appearance of the preferred embodiment of the apparatus 2, which includes both the calibrator 6 and the communicating means 8, will next be described.

The preferred embodiment of the calibrator 6 externally includes a portable housing 100 which is separate from the measuring device (i.e., the flowmeter 4 as illustrated). The housing 100 includes a rectangular receptacle portion 102 and a matching lid portion 104 hinged at its lower edge to the back edge of the receptacle portion 102. A faceplate 106 is mounted across the top of the receptacle portion 102. Mounted to or forming part of the faceplate 106 is a keypad 108 including keys 110 for digits 0 through 9, a decimal point (.), and cursor backspace (←). Also included are four function keys 112, 114, 116, 118. There are also an "OFF" key 120 and an "ON/RESET" key 122. All of these keys are associated with switches contained internally within a cavity of the receptacle portion 102 below the faceplate 106, which switches will be described hereinbelow with reference to the internal circuitry of the calibrator 6 shown in FIGS. 4A-4E.

In the preferred embodiment the keys are positioned as illustrated in FIG. 3; however, it is contemplated that other arrangements can be used. Of particular note, however, is that it is preferred that the four function keys 112, 114, 116, 118 be aligned and disposed adjacent a visual output display 124, which is also mounted in the faceplate 106, in the manner illustrated in FIG. 3. This positioning is of importance in the preferred embodiment because of the function keys can have different functional significance as designated by different outputs which can be displayed through the display 124. That is, an output displayed through a portion 126 of the display 124 can be used to designate what function occurs when the function key 112 is pressed. Likewise, displays through areas 128, 130, 132 of the display 124 define the functions of the keys 114, 116, 118, respectively.

The external features of the calibrator 6 illustrated in FIG. 3 also include a connector jack 134.

For the embodiment shown in FIG. 3, the communicating means 8 includes a cylindrical container 136 made of a suitable material, such as plastic, which does not interfere with the transmission of the calibration signal as subsequently described. Retained within the container 136 is a metallic member 138, such as an iron core, around which an electrical current conductive coil 140 is wound. The communicating means 8 also includes conductor means for connecting the coil 140 to the calibration means defined by the calibrator 6. In the preferred embodiment, the conductor means includes a pair of wires 142 (see also FIGS. 2 and 4E) connected to a plug 144 (which is insertable into the jack 134) so that the container 136/core 138/coil 140 assembly can be extended from the calibrator 6 but remain connected thereto.

The communicating means 8 also includes means for connecting the container 136, with the core and coil assembly retained therein, to the body 12 of the flowmeter 4 so that the flowmeter 4 is responsive to the calibration signal transmitted through the core and coil assembly within the container 136. In general, this connecting means is preferably of a type which allows the container 136 and its internal components to be connected to the measuring device so that the measuring device does not have to be disassembled, such as by being removed from the environment or position where it is to take measurements. That is, the connecting should be achieved so that the measuring device can be maintained in situ. In the preferred embodiment illustrated in FIG. 3, this connecting means includes a flexible strap 146 having two ends 148, 150. The container 136 is connected to the strap 146 intermediate the ends 148, 150 (i.e., any suitable location between the longitudinally spaced edges of the strap). The ends 148, 150 are adapted to be secured together after the strap 146 has been wrapped around the body 12 of the flowmeter 4 as shown in FIG. 3. A suitable conventional means of fastening or securing the ends includes a hook and pile fastener, such as of the type marketed under the mark VELCRO®. For the specific models of the Great Plains Industries Electronic Digital Meters with which the preferred embodiment of the present invention can be used as described hereinabove, the container 136 is strapped to the flowmeter so that the container 136 and its internal core and coil assembly are located on the face of such flowmeter where the control buttons 16 are located. This allows the flowmeter to be calibrated in-line with the pipe or conduit 10 as illustrated in FIGS. 1 and 3.

Internal components of the preferred embodiment calibrator 6 will next be described with reference to the schematic circuit diagrams shown in FIGS. 4A–4E.

The internal components of the calibration means by which the calibration signal is generated include a microcomputer 152 having the circuitry illustrated in FIGS. 4A–4B. The microcomputer 152 includes a microprocessor 154 which is activated in response to the ON/RESET key 122 being pressed and which is reset, through a circuit 156 connected to the reset input of the microprocessor 154, each time the key 122 is pressed. The timing of the microprocessor 154 is controlled by an oscillator circuit 158. The microprocessor 154 responds to interrupt requests received through a circuit 160 from any of four interrupt signals I0–I3 shown in FIG. 4D to be generated in response to pressing of any one of the four function keys 112–118.

The microprocessor 154 has two 8-bit input/output ports PA0–PA7 and PB0–PB7 by which the microprocessor 154 communicates with the various other components to which these ports are connected as shown in FIGS. 4C–4E and subsequently described.

The microprocessor 154 includes an 8-bit address-/data port B0–B7 and additional address lines A8–A12. Through these terminals, the microprocessor 154 communicates with an address demultiplexer 162, a read only memory 164 and a random access memory 166 (FIG. 4B). The read only memory 164 contains the program of the microcomputer 152 which controls the operation of the microprocessor 154. A flow chart of the preferred embodiment of such program is set forth in FIGS. 5A–5D, which will be described subsequently. An example of a specific program implementing that shown in the flow chart is contained in the Appendix hereto; however, it is contemplated that any suitable type of program can be readily developed to operate the present invention consistent with its overall objectives and features described herein.

Forming another part of the microcomputer 152 illustrated in FIG. 4A is a logic circuit 168 providing chip enable or select signals to the chips 162, 164, 166, and a write enable signal to the random access memory 166.

The microcomputer 152 controls the operation of the display 124 which is observed through the faceplate 106 as shown in FIG. 3. The display 124 is also represented in FIG. 4C, where it is identified as a dot-matrix LCD module. A suitable specific type of such module is the Hitachi LM018L two-line by forty-character display with integral controller, or its equivalent. As shown in FIG. 4C, the display 124 is controlled through the PB0–PB7 and PA4–PA6 lines of the input/output ports of the microprocessor 154.

The input/output ports of the microprocessor 154 are also used to interface the external keys 110–122 with the microprocessor 154. This interfacing is shown in FIG. 4D.

In FIG. 4D each of the keys 110 is shown associated with a respective one of a set of switches 170. When one of these keys is depressed, it closes the respective one of the switches 170. These switch closures are monitored by the microprocessor 154 through the PB0–PB2 and PA0–PA3 lines of the input/output ports as labeled in FIG. 4D.

As previously mentioned, the function keys 112–118 generate the interrupt signals I0–I3. This occurs when one of the keys 112, 114, 116, 118 is pushed to close the associated respective switch 172, 174, 176, 178 shown in FIG. 4D.

As also shown in FIG. 4D, the OFF key 120 is associated with a switch 180, and the ON/RESET key 122 is associated with a switch 182. When the switch 180 is closed in response to pressing of the OFF key 120, an "OFFSW" signal is provided to a power control circuit 184 shown in FIG. 4E and described subsequently hereinbelow. Pressing the ON/RESET key 122 closes the switch 182, thereby generating the labeled "ONSW" signal, which is provided both to the reset circuit 156 shown in FIG. 4A and to the power control circuit 184 shown in FIG. 4E.

The power control circuit 184 shown in FIG. 4E controls the operation of a power supply circuit 186 which provides electrical energy to the apparatus 2 (specifically, to the circuitry shown in FIGS. 4A–4E). The power supply circuit 186 includes a battery 188, a voltage regulator 190 and a power switching transistor 192 for switchably connecting the battery 188 to the voltage regulator 190 in response to the power control circuit 184. These elements are connected with the remaining conventional components as shown in FIG. 4E.

To turn the transistor 192 on, and thereby to connect the voltage from the battery 188 to the input of the voltage regulator 190, the switch 182 (FIG. 4D) is closed by pressing the ON/RESET key 122. This switch 182 closure provides the electrical ground ONSW signal to a diode 194 and a resistor 196 of the power control circuit 184 to pull the base of the transistor 192 low. When this power activation occurs, the microprocessor 154 generates a display enable signal through the PA5 input/output port lines. This display enable signal is provided to the power control circuit 184 to turn on an SCR 198, which allows the voltage of the battery 188 to charge a capacitor 200 through a resistor 202. The charge maintained by by the capacitor 200 turns a field effect transistor (FET) 204 on, which holds the junction between the diode 194 and the resistor 196 near electrical ground and thus maintains the transistor 192 in its power on condition.

To turn the power off, the OFF key 120 is pressed to close the switch 180, thereby generating the electrical ground OFFSW signal. This grounds one side of a resistor 206, the other side of which is connected to the resistor 202 as shown in FIG. 4E. This quickly discharges the capacitor 200 through the resistors 202, 206, thereby turning the FET 204 off, which in turn turns the transistor 192 off.

The power control circuit 184 also includes timer means, having a time period which expires if the time period is not restarted prior thereto, for automatically deactivating the power supply when the time period expires. In the preferred embodiment this timer means is implemented by the capacitor 200, the resistor 202 and a resistor 208. Once the capacitor 200 has been charged by the display enable signal received over the PA5 line, the capacitor 200 begins to discharge through the resistors 202, 208 (assuming the OFF switch 180 is not closed). The values of the components 200, 202, 208 are selected to achieve a desired discharge rate, which defines a desired time period before the power supply is turned off. At the end of this time period, the power supply is turned off because the capacitor 200 has sufficiently discharged through the resistors 202, 208 to lower the voltage applied to the gate terminal of the FET 204 sufficiently to switch the FET 204 off, thereby deactivating the power supply in the same manner as if the OFF switch 180 had been closed. In the preferred embodiment the timer means is continually reset each time there is a write to the display 124. That is, the capacitor 200 is recharged each time the display enable signal is generated by the microprocessor 154 and output over the PA5 line. Therefore, no automatic deactivation occurs in the preferred embodiment so long as the display enable signal is generated more frequently than the length of the time period set by the values of the capacitor 200 and the resistors 202, 208.

Also disclosed in FIG. 4E is a connector means 210 for connecting the microcomputer 152 to the conductor means of the communicating means 8 (namely, to the wires 142 and jack 144 as indicated in FIG. 4E). The connector means 210 of the preferred embodiment is a coil drive buffer. The buffer includes an amplifier 212 and a transistor 214 and the illustrated associated components. These elements are connected between the PA7 input/output put port line, over which the calibration signal is transmitted from the microprocessor 154, and the jack 134 as shown in FIG. 4E.

Next, a general description of the method and operation of the apparatus 2 of the present invention will be given, following which a more detailed description will be given with reference to FIGS. 5A-5D.

The apparatus 2 generates, separately from the measuring device 4, a calibration signal. In the preferred embodiment the calibration signal is a series of electrical pulses which are generated within the calibrator 6 independently of the operation of the flowmeter 4, which exemplifies a particular type of measuring device. In general, the electrical pulses are generated within the computing means defined in the preferred embodiment by the microcomputer 152 disposed within the housing 100. The computing means performs its functions in response to data entered through the data entry means, which includes the various keys described hereinabove and shown in FIG. 3 for the preferred embodiment. The computing means also controls the display 124.

Within the microcomputer 152 of the preferred embodiment, there is contained preset calibration data stored within the read only memory 164, defining at least part of a data storage means. In one mode of operation, referred to herein as the standard calibration mode, the preset calibration data is used by the microcomputer 152 to compute and output the calibration signal; however, in an alternative mode of operation, referred to herein as the variable calibration mode, new calibration data entered through the keys depicted in FIG. 3 is used in computing and outputting the calibration signal. These modes of operation will be more particularly described hereinbelow with reference to FIGS. 5A-5D.

In the illustrated preferred embodiment, the microcomputer 152 also outputs text visually through the visual output display 124 to prompt an operator of the apparatus 2 to operate the various keys of the data entry means to achieve operation in one of the two aforementioned modes of operation. Part of the displayed output includes indicia designating specific functions to be selected upon actuation of the functions keys 112–118. That is, at different times, text is output into one or more of the respective display regions 126, 128, 130, 132 to define the function to be performed upon actuation of the respective function keys 112, 114, 116, 118 located below the display 124.

The operation of the present invention also includes converting the calibration signal into electromagnetic energy. In the preferred embodiment this conversion occurs in conducting the electrical pulses generated by the microcomputer 152 through the coil 140 so that the calibration signal is transmitted electromagnetically as electromagnetic pulses. Although the electromagnetic transmission of the preferred embodiment occurs by way of conducting pulses through a coil, this terminology is intended to encompass other forms of electromagnetic energy or radiation, such as light or photooptical transmission or sound generated electromagnetically.

The method of the present invention also includes coupling the electromagnetic energy to the measuring device. In the preferred embodiment, this coupling is performed by connecting the container 136 and the electromagnetic means (including the core 138 and the coil 140) contained therein to the flowmeter 4 by means of the strap 146 as illustrated in FIG. 3. It is contemplated, however, that other types of coupling apparatus or techniques can likely be used.

Two define more specifically the preferred embodiment of the aforementioned method of the present invention, reference will next be made to FIGS. 5A–5D and to the use of the apparatus 2 with a specific type of flowmeter 4. This specific type of flowmeter 4 is any suitable model of Electronic Digital Meter of Great Plains Industries, referred to hereinabove. Each such flowmeter contains an internal microcomputer 14 (see FIG. 2) which is programmed so that when the microcomputer 14 is placed in the calibration mode, the number of pulses counted during a calibration sequence is internally set equal to five gallons of fluid. This is the only information needed by the flowmeter if it is one which has a linear response or uses a constant "k" factor (number of turbine revolutions per gallon of fluid) regardless of the flow rate of the fluid. This "one-point calibration" is usually adequate when a low viscosity fluid which does not significantly change with temperature is to be measured (e.g., gasoline or water). If a more viscous fluid is to be measured, for example, then a "two-point calibration" can be required. In this case, the microcomputer 14 of the exemplary flowmeter 4 sets a first count of pulses transmitted at a suitable low rate to five gallons and a second set of pulses transmitted at a suitably high rate also to five gallons, whereafter when actual flow is monitored, the appropriate calibration or a linear interpolation therefrom is used to calculate the actual flow. Both types of calibration have been previously, and are currently being, used internally within this type of flowmeter of Great Plains Industries when these flowmeters are being calibrated using actual fluid flow which creates actual turbine pulses from the turbine of the flowmeter 4 rotating in response to the flowing fluid.

Within this context, the preferred embodiment of the present invention operates in either a standard calibration mode or a variable calibration mode. The standard calibration mode is based on the specific model number of the flowmeter and preset or predetermined calibration information necessary to restore the flowmeters to factory calibration, which information is contained within the read only memory 164 of the calibrator 6. The variable calibration mode is used when a particular model number of the flowmeter to be calibrated is not contained within the read only memory 164 data. The variable calibration mode is also used when an existing calibration of a flowmeter is to be adjusted from its present setting to a new setting which is desired but which is different from the present data contained in the read only memory 164. For example, a flowmeter may be properly calibrated from a factory or standard calibration standpoint; however, when an actual known flow occurs, some error results such as due to fluid type or to mechanical or electrical changes in the flowmeter for which some small adjustment needs to be made. The details of these two modes of operation are shown in FIGS. 5A–5D.

As shown in FIG. 5A, when the ON/RESET key 122 is pressed, the apparatus 2 is energized and a five-second sign-on message appears. For example, there may be displayed a copyright notice, or information about the name of the program, or a warning to insure that some preliminary step or steps has or have been performed, such as strapping the container 136 to the body 12 of the flowmeter 4.

After the sign-on message has appeared, the method as shown in FIG. 5A then prompts the operator to select the desired calibration routine. In the preferred embodiment this is done by a suitable command displayed in the upper line of the two-line display 124 and by captioning the function keys 112, 114, 116 with the "GPISTD", "TWEAK" and "TWKAGN" legends (see FIG. 5A) in the display spaces 126, 128, 130, respectively. The "GPISTD" legend designates the factory calibration set up by whomever has preset the apparatus 2 ("GPI" or Great Plains Industries, as the assignee of the present invention, is designed herein). The "TWEAK" and the "TWKAGN" legends designate two variable calibration mode routines within the preferred embodiment by which current calibrations of flowmeters can be adjusted to calibrations other than the factory standards which are used within the "GPISTD" calibration routine. That is, these last two routines are used to slightly modify the flowmeter response, such as to compensate for measuring a fluid having a particular characteristic or effect on the flowmeter.

The "GPISTD" calibration routine is shown in FIG. 5B. When in this routine, the list of model numbers stored in the read only memory 164 is displayed, one at a time, through the first line of the display 124. The second line of the display 124 is used to designate the function keys 112, 114, 116 as "SCROLL DOWN", "SELECT" and "SCROLL UP" functions, respectively. Using the SCROLL keys, the list of model numbers is incremented or decremented to the desired model number or to an entry referred to as "new model." "New model" indicates that the operator is going to calibrate a model of flowmeter which is not contained within the preset list which has been loaded into the read only memory 164.

Once the model selection is made, the microcomputer 152 determines whether the selection has been for a new model. If not, the microcomputer 152 obtains the count/rate data from the internal table stored within the read only memory 164. If a new model is to be calibrated, the microcomputer 152 receives the count/rate data from the operator via the keys 110. This count/rate data can be made known to the operator such as by a chart updated to list new models and standard calibration data not contained in the read only memory 164. Whether a one-point calibration or a two-point calibration is to be made is also entered via the keys 110. In the preferred embodiment, the count data for a particular model pertains to the number of pulses which are to be transmitted to the flowmeter 4 to designated five gallons of fluid; the rate data pertains to the rate, or frequency, at which the pulses are to be transmitted to the flowmeter 4.

With the appropriate count/rate data, the microcomputer 152 generates the count of pulses which are to designate to the flowmeter 4 five gallons of fluid. This number of pulses is generated at a frequency equal to the rate associated with the count. These pulses are transmitted through the coil 140 to simulate the pulses which would otherwise be generated by the turbine of the flowmeter 4 if the calibration were being done by the "actual flow" prior art technique of calibration. It is to be noted that in the preferred embodiment, prior to generating the pulses, the microcomputer 152 prompts, through the display 124, the operator to place the flowmeter into its calibration mode (which, for a particular type of flowmeter, is accomplished by pressing both of the buttons 16 illustrated in FIG. 3).

Having generated and performed this initial calibration, the microcomputer 152 generates a fifteen second time delay to allow for an internal time delay of the exemplary type of flowmeter 4 referred to hereinabove. If necessary, the microcomputer 152 generates a second count of pulses at a second frequency if a two-point calibration is to be performed. Whether a two-point calibration is to be performed within the "GPISTD" routine is determined either by what has been preset in the read only memory 164 to designate whether the known models of flowmeters require one-point or two-point calibration or by the information input by the operator for a new model of flowmeter to be calibrated.

During generation and transmission of the calibration pulses, a display, such as a disappearing string of asterisks, can be provided through the display 124 to advise the operator about the duration of this part of the calibration.

After the second calibration point pulses are sent and a fifteen-second time delay occurs, or if not two-point calibration is needed, the microcomputer 152 designates that the calibration has been done through a suitable prompt display in the first line of the display 124. The second line prompts either a "REPEAT" or "NEW" selection to either repeat the previous calibration or to return the calibrator 6 to the initial prompt-for-calibrationroutine step shown in FIG. 5A. A prompt to instruct the operator to return the flowmeter 4 to its normal operational mode can also be given.

Figure 5C:
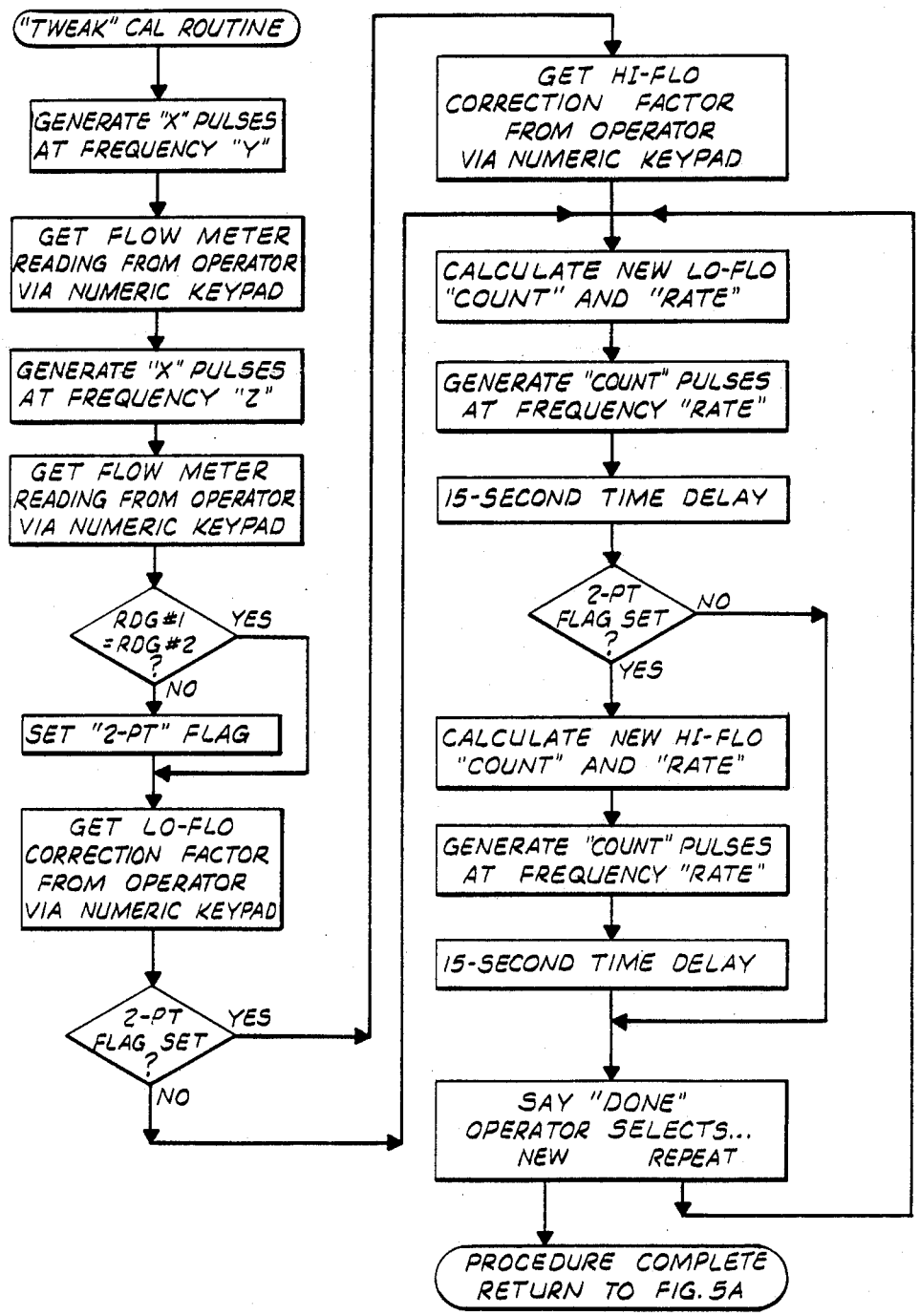

The TWEAK routine is shown in FIG. 5C. To use the TWEAK routine, the operator known that the flowmeter to be calibrated already has a calibration, and the operator also knows how much correction needs to be made to that calibration in order to give correct readings. This correction is input by the operator via the keys 110 of the calibrator 6. Before entering the correction, the apparatus 2 determines whether the flowmeter requires one-point or two-point calibration.

Following the steps shown in FIG. 5C, the microcomputer 152 generates a known number of pulses at a known first rate. This is done after the operator has been prompted to clear the total from the flowmeter 4. As the apparatus 2 is generating and inducing the known pulses at the known first rate, the flowmeter is displaying an increasing count in its display 18.

After the pulses have been induced, the apparatus 2 prompts the operator to enter the displayed flowmeter reading. This is done by way of the keys 110 of the calibrator 6.

The microprocessor 152 prompts the operator to again clear the total from the flowmeter 4, which is again indicated to the microcomputer 152 by pressing one of the function keys 112-118 which has been designated "OK". The microcomputer 152 then generates the same number of pulses but at a known second frequency. The flowmeter 4 again displays an increasing count through the display 18. The ultimate total is entered into the calibrator 6 by way of the keys 110.

The microcomputer 152 then compares the two flowmeter readings which have been entered by the operator. If they are equal, the microcomputer knows that only a one-point calibration is needed, but if the two readings are unequal, the microcomputer 152 sets a "two-point" flag to designate that a two point calibration is needed.

The microcomputer 152 then prompts the operator to enter a low-flow correction factor. The correction factor in the preferred embodiment is the desired reading to be obtained from the flowmeter 4 divided by the actual reading which has been obtained when the known flow of fluid has been actually flowed through an measured by the flowmeter 4 prior to the present calibration routine. The correction factor will typically be a little smaller than, or a little greater than, unity. For example, the operator knows that prior to calibration, upon dispensing exactly ten gallons of fluid, the flowmeter 4 has displayed a reading of only 9.5 gallons. Thus, the correction factor is (10/9.5) or 1.0526 (in the preferred embodiment, the correction factor is internally rounded to three places to the right of the decimal point).

The microcomputer 152 next prompts the entry of the high flow correction factor is two-point calibration is to be performed. Once this has been done, or if only one-point calibration is to be performed, the microcomputer 152 then calculates the required count(s) and selects from two preset rates and generates the corresponding pulses at the respective rates or rates as specified in the remaining steps shown in FIG. 5C. This is, of course, performed after the operator has placed the flowmeter in its mode to receive the calibration, such as may be done in response to a prompt generated by the microcomputer 152 through the display 124.

In calculating the news counts, the microcomputer 152 has computed the current "k" factor at which the flowmeter is already calibrated. This computation is made from the known number of pulses that were generated to test for one-point calibration or two-point calibration and from the respective reading entered from the flowmeter. Using this current "k" factor and the respective entered correction factor, the microcomputer 152 computes the new, desired "k" factor. This gives a pulses-pergallon number which is then multiplied by five to yield the count representing five gallons of fluid which the specific embodiment of flowmeter needs for it to be calibrated.

Figure 5D:
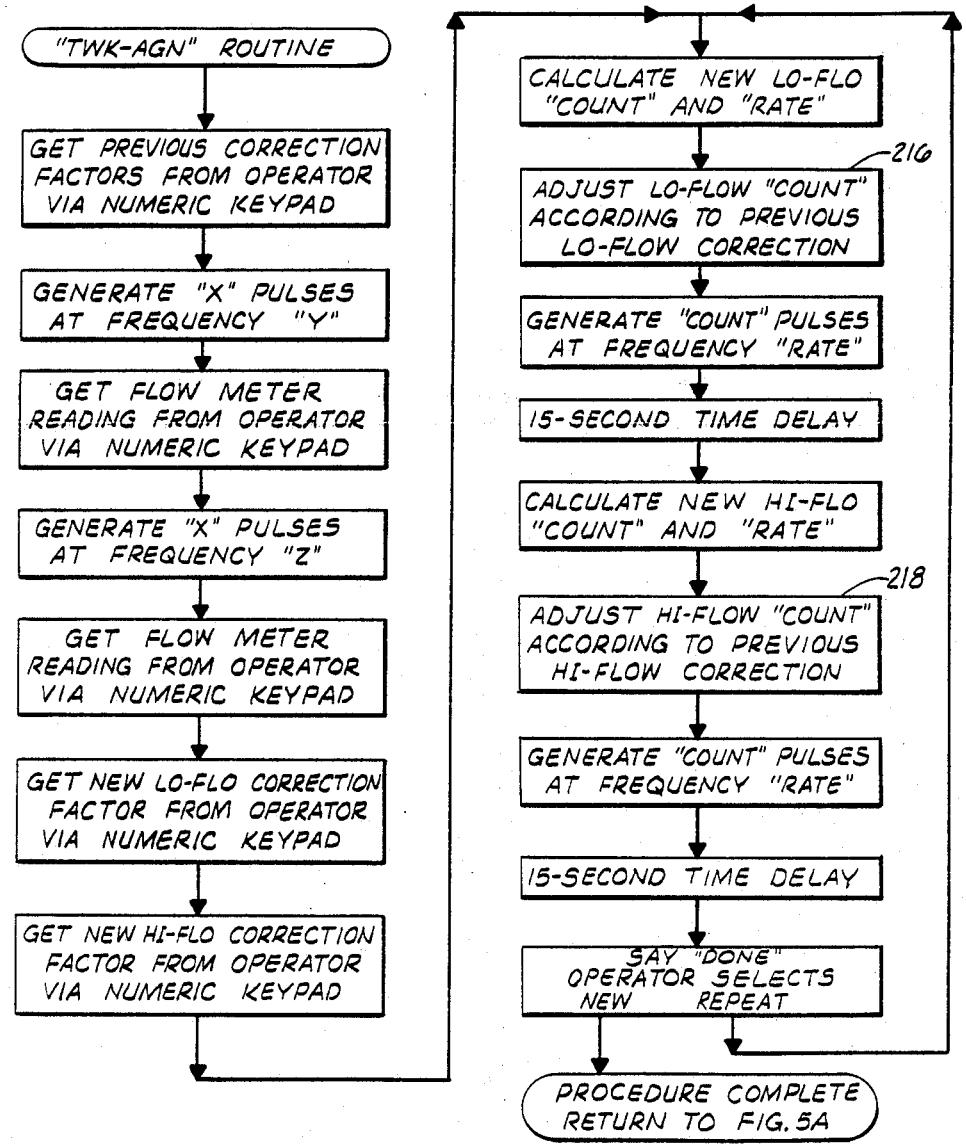

The tweak again ("TWKAGN") procedure is shown in FIG. 5D. This procedure is used only after the tweak procedure has been used. The purpose of the "tweak again" routine is to improve the accuracy of the new flowmeter calibration in fewer procedures than would likely be needed if the basic "TWEAK" routine shown in FIG. 5C were simply rerun enough to obtain the desired accuracy. Thus, in the preferred embodiment, once the "TWEAK" routine of FIG. 5C has been run, further "tweaking" of that "tweak" is performed using the "TWKAGN" routine shown in FIG. 5D.

The steps of the "TWKAGN" routine shown in FIG. 5D are believed to be self-explanatory in that they are identified as steps which are the same as comparable ones in the previous routines, except for the "ADJUST" steps (see FIG. 5D, reference numerals 216, 218).

In these two steps, namely adjusting the low flow count (#216) and the high flow count (#218), these adjustments are based on the previous corresponding corrections whereby the subsequent adjustments are more quickly focused to obtain the desired accuracy more quickly. More specifically, after the microcomputer 152 has calculated, in the manner described hereinabove, a new five-gallon pulse count as designated in the "TWKAGN" routine, it multiplies that new count by a factor inversely proportional to the difference between the previous correction factor and the new correction factor. Thus, the final, adjusted count can be significantly "increased" if the last tweak did not adjust far enough, or it can be significantly "decreased" if the last tweak overshot the desired reading. In the specific program set forth in the Appendix, the inversely proportional factor was experimentally or empirically chosen or derived from flow rate/readout/correction experiments or tests to obtain a suitable rate of focusing or arriving at the desired accuracy.

The foregoing describes the preferred embodiment of the present invention; however, it is contemplated that the present invention can encompass other types of hardware and software and have utility with other types of measuring devices. One specific contemplated modification with respect to further use with flowmeters is to permit calibration based upon fluid type. This calibration would be comparable to the "GPISTD" calibration except based upon fluid type rather than model type. Preset fluid type information would be stored in the read only memory 164, but new fluid type information could be input through the keys 110. To implement the latter, the operator would designate whether one-point or two-point calibration were needed (as in the GPISTD routine) and then the rate and count information would be entered such as taken from a fluid calibration table generated by the manufacturer of the apparatus 2.

Thus, the present invention is well adapted to carry out the objects and attain the ends and advantages mentioned above as well as those inherent therein. While, a preferred embodiment of the invention has been described for the purpose of this disclosure, changes in the construction and arrangement of parts and the performance of steps can be made by those skilled in the art, which changes are encompassed within the spirit of this invention as defined by the appended claims.

```
FALSE     EQU       0
TRUE      EQU       NOT FALSE
;
UDL       EQU       FALSE         ;SET TRUE FOR TEST ON UDL ONLY
FLUID     EQU       FALSE         ;SET TRUE IF USED FOR FLUID-TYPES
;
;This 6805 firmware is for use in the GPI "supercalibrator" for EDMs.
;
;            ***********************************
;            *   COPYRIGHT 1987, 1988 GPI INC.  *
;            ***********************************
;
;-----------------------------------------------------------------
;THE FOLLOWING information deals with address decoding for this system:
;-----------------------------------------------------------------
;in addition to on-chip I/O and RAM facilities, the design has
;the following external address map:
;         $0080-$07FF      =standard 2K system RAM
;         $0800-$1FFF      =standard 6K system ROM incl. vectors
;
;----------------------------------------------------------------
;DETAILS REGARDING INTERNAL/EXTERNAL RAM:
;----------------------------------------------------------------
;The supercal 2K RAM space is linearly addressed as a contiguous
;2048 bytes. It is divided in hardware between the lowest 128 bytes
;and the rest: The lowest 128 bytes (i.e. bottom half of page0) are
;ram and I/O registers inside the 6805, and are shadowed in external
;RAM. The rest is external RAM in the 6116. Note that the R/M/W in-
;structions of the 6805 can only access page 0 (both internal and
;external). No bank switching is used in this system. All of the
;I/O is accomplished by the standard processor PA and PB ports.
;
;(note:$0000-$000F is on-chip registers. Writes to this area go
;      also to the same address in external RAM, but this external RAM
;      data is ignored on reads.)
;
;----------------------------------------------------------------
;DETAILS REGARDING FORMAT OF DATA STORED IN ROM:
;----------------------------------------------------------------
;The 2 ROM tables will now be:
;
;.FTM (Table, ASCII-Fluid/Model-Name) will contain a variable-length fluid-
;name or model-name designation, in ASCIIZ, that will appear on the display.
;
;.TFND (Table, Fluid/Model Numerical Data) will contain the corresponding
;2-byte binary values for COUNT1, RATE1, COUNT2, and RATE2.
;
;There are also ROM tables for miscellaneous messages for the display
;upper line (".ULM") and for the display lower line (".KLM"). These
;messages are also ASCIIZ and variable length.
;
;*** Above changes identified as V1.1...RMK...12/87
;
;+++++ MORE REVISIONS +++++
;***** In this revision of the calibrator firmware, some "ease-of-use"
;factors have been considered. Mainly, provision has been added for a set
;of "shadow" registers for the COUNT and RATE data, so that a calibration-
;run can be repeated with the same values, without having to go through
;the entire data-entry process.
;
```

```
;*** all above revisions identified as V1.2...RMK...12/87
;
;+++++ MORE REVISIONS +++++
;Discovered error in original TWEAK routines. TWEAK did not account for the
;presence of a X10 or a X100 strap on the EDM being calibrated. In this re-
;vision, after entry of the 'CAL-CHECK' EDM readings, the program determines
;if a strap is present by looking at the position of the DP in the entered
;value: If was entered as N.NN, then is normal X1, and readings used as be-
;fore. If was entered as NN.N, then has X10 strap, and readings are divided
;by 10 before use. If was entered as NNN, then has X100 strap, and readings
;are divided by 100 before use.
;
;*** with all above revisions identified as V1.3...RMK...1/88
;
;------------------------------------------------------------
;the following equates echo the above ADDRESSING information...
;(AS APPLIED TO THE 6805, SEE ITS DATA FOR MORE DETAILS)
;------------------------------------------------------------
;
          CIOBAS    EQU    0               ;ON-CHIP I/O ALL HERE
          PPA       EQU    CIOBAS          ;PARL PORT A DATA
          PPB       EQU    PPA+1           ;PARL PORT B DATA
          DDRA      EQU    CIOBAS+4        ;DDR FOR PPA
          DDRB      EQU    DDRA+1          ;DDR FOR PPB
          TIMDAT    EQU    CIOBAS+8        ;TIMER DATA REG
          TIMCTL    EQU    TIMDAT+1        ;TIMER CONTROL DATA
          IRAMB     EQU    $10             ;FIRST BYTE OF ON-CHIP RAM
          IRAMT     EQU    $7F             ;LAST BYTE OF ON-CHIP RAM
          ERAMB     EQU    $80             ;FIRST BYTE OF EXTERNAL RAM
          PAGE1     EQU    $100            ;PAGE 1 OF EXTERNAL RAM
          PAGE2     EQU    $200            ;PAGE 2 OF EXTERNAL RAM
          PAGE3     EQU    $300            ;PAGE 3 OF EXTERNAL RAM
          ERAMT     EQU    $3FF            ;LAST BYTE OF EXTERNAL RAM
          ROMBAS    EQU    $800            ;first byte of system ROM
          IVBAS     EQU    $1FF6           ;BASE OF INTRPT VECTORS
          TIMWV     EQU    IVBAS           ;VECTORS....TIMER FRM WAIT
          TIMIV     EQU    IVBAS+2         ;TIMER ELSE
          EXTIV     EQU    IVBAS+4         ;HDWE INTERRUPT (IRQ)
          SWIIV     EQU    IVBAS+6         ;SFTWE INTERRUPT
          RESTV     EQU    IVBAS+8         ;PWR-UP/HDWE RESET
          ;
                    ;------------------------------------------
                    ;SOME CONSTANTS USED THRUOUT PROGRAM...
                    ;------------------------------------------
0028      LL        EQU    40              ;LENGTH OF DISPLAY LINE
0027      LLM1      EQU    LL-1            ;VARIATION THEREOF
0008      NDGTS     EQU    8               ;DIGITS USED IN INTERNAL CALCULATIONS
0007      NDGM1     EQU    NDGTS-1         ;VARIATION OF ABOVE
0006      NDGM2     EQU    NDGTS-2         ;ALSO
000D      TC32      EQU    %00001101       ;TIME CTRL VALUE FOR /32 AND RESET
000E      TC64      EQU    %00001110       ;DITTO FOR /64 AND RESET
000F      TC128     EQU    %00001111       ;DITTO FOR /128 AND RESET
0038      TK10      EQU    56              ;TIME-COUNT VALUE FOR 10-MSEC TICK @ ..
          ;
          ;------------------------------------------------------------
          ;NO VARIABLES ARE STORED IN THE *** INTERNAL *** RAM AREA (WHICH
          ;IS BOTTOM HALF OF PAGE0). IT IS RESERVED FOR STACK USE ONLY.
          ;------------------------------------------------------------
          ;
          ;------------------------------------------------------------
          ;NOW *** EXTERNAL RAM BUT STILL PG0 ***. ALL SINGLE-BYTE WORKING
          ;VARIABLES ARE STORED HERE:
          ;------------------------------------------------------------
0080      MTA0      EQU    ERAMB           ;ALL OF THE MXXXX VARIABLES ARE USED
0081      MTA1      EQU    MTA0+1          ; AND SHARED AMONG THE MATH PROCESSORS
0082      MTA2      EQU    MTA1+1
0083      MTX0      EQU    MTA2+1
0084      MTX1      EQU    MTX0+1
0085      MTX2      EQU    MTX1+1
0086      MTX3      EQU    MTX2+1
0087      MC0       EQU    MTX3+1
0088      MC1       EQU    MC0+1
0089      MC2       EQU    MC1+1
008A      MF0       EQU    MC2+1
008B      MF1       EQU    MF0+1
008C      MF2       EQU    MF1+1
008D      MF3       EQU    MF2+1
          ;
008E      BDT       EQU    MF3+1           ;BINARY TEMP USED IN MATH OPS (2 BYTES
```

```
0090            CNT1     EQU     BDT+2           ;NOW BINARY WORK REGISTERS (2 BYTES EA
0092            RAT1     EQU     CNT1+2          ; THESE MUST BE SEQUENTIAL!
0094            CNT2     EQU     RAT1+2
0096            RAT2     EQU     CNT2+2
                ;
0000            *** new ***
0098            OOC1     EQU     RAT2+2          ;SHADOWS FOR ABOVE
009A            OOR1     EQU     OOC1+2
009C            OOC2     EQU     OOR1+2
009E            OOR2     EQU     OOC2+2
                ;
00A0            AITMP    EQU     OOR2+2          ;ADDTL 2-BYTE BINARY TEMPS
00A2            AIMSK    EQU     AITMP+2
00A4            GBT      EQU     AIMSK+2
                ;
00A6            FKEYS    EQU     GBT+2           ;1-BYTE TEMPS: IRQ HNDLR PUTS FKEYS HERE
00A7            FKF      EQU     FKEYS+1         ;AND A FLAG FOR IT TOO
00A8            FLTP     EQU     FKF+1           ;INTERNAL fluid/model TYPE #
00A9            GPT0     EQU     FLTP+1          ;TEMP SHARED SEVERAL PLACES
00AA            GPC0     EQU     GPT0+1          ;COUNTER SHARED SEVERAL PLCS
00AB            NNDX     EQU     GPC0+1          ;NUMERICAL fluid/model-DATA INDEX
00AC            ANDX     EQU     NNDX+1          ;ASCII fluid/model-DATA INDEX
00AD            NPTS     EQU     ANDX+1          ;FLAG FOR 1PT/2PT CAL TYPE
00AE            WDGK     EQU     NPTS+1          ;FOR NKEY SCAN, HOLDS KEY CODE
00AF            CTXT     EQU     WDGK+1          ;USED DURING CAL RUNS
00B0            LXT0     EQU     CTXT+1          ;USED WHILE WAITING FOR LCD NBSY
00B1            ADT0     EQU     LXT0+1          ;USED DURING TIME DELAYS
00B2            ADT1     EQU     ADT0+1          ;DITTO
00B3            MNO      EQU     ADT1+1          ;DSP MSG# TEMP
00B4            KLN      EQU     MNO+1           ;ANOTHER ONE
00B5            MLG      EQU     KLN+1           ;DSP MSG LNGTH TEMP
00B6            DCP      EQU     MLG+1           ;DSP CTR POS TEMP
00B7            AICNT    EQU     DCP+1           ;ACT.IND. COUNTER
00B8            TCTL     EQU     AICNT+1         ;DIVISOR PRIVATE FOR TIMER
00B9            TDAT     EQU     TCTL+1          ;COUNTDOWN PRIVATE FOR TIMER
00BA            IDPP     EQU     TDAT+1          ;DP POSITION/FLAG FOR NUM ENTRY
00BB            IDP1     EQU     IDPP+1          ;SHADOW FOR ABOVE
00BC            TAF      EQU     IDP1+1          ;FLAG FOR TWK-AGAIN PROCEDURE
                ;
                ;
                ;-----------------------------------------------------------
                ;THE FOLLOWING ARE ADDRESSES IN *PAGE 1 OF THE EXTERNAL RAM AREA*.
                ;ALL OF THE BCD MATH OPERATIONS ARE CARRIED OUT ON THESE.
                ;-----------------------------------------------------------
0100            DUMMY    EQU     PAGE1
0108            RG0      EQU     DUMMY+NDGTS     ;NINE WORKING BCD REGISTERS...
0110            RG1      EQU     RG0+NDGTS
0118            RG2      EQU     RG1+NDGTS
0120            RG3      EQU     RG2+NDGTS
0128            RG4      EQU     RG3+NDGTS
0130            RG5      EQU     RG4+NDGTS
0138            RG6      EQU     RG5+NDGTS
0140            RG7      EQU     RG6+NDGTS
0148            RG8      EQU     RG7+NDGTS
                ;
0150            MLPLR    EQU     RG8+NDGTS       ;...AND 4 SHARED BCD TEMPS
0150            DIVSR    EQU     MLPLR
0150            BTAT0    EQU     MLPLR
0158            MLCND    EQU     MLPLR+NDGTS
0158            DIVDD    EQU     MLCND
0158            BTAT1    EQU     MLCND
0160            PPROD    EQU     MLCND+NDGTS
0160            PQUOT    EQU     PPROD
0168            FPROD    EQU     PPROD+NDGTS
0168            FQUOT    EQU     FPROD
                ;
                ;
                ;-----------------------------------------------------------
                ;IN THE FOLLOWING CODE THE SIGNIFICANCE OF SYMBOLS BEGINNING WITH
                ;"." IS THAT THEY (ONLY) WILL BE PASSED ON TO THE UDL ANALYZER SYSTEM.
                ;All symbols are treated identically by the assembler.
                ;-----------------------------------------------------------
                ;
                ;-----------------------------------------------------------
                ;FOR DISPLAY SUBROUTINE THAT WILL BE MOVED INTO RAM...
0200            .IILA    EQU     PAGE2
                ;-----------------------------------------------------------
                ;
                ;-----------------------------------------------------------
```

```
                ;A LOT OF THIS PROGRAM IS KEPT IN 'INCLUDE' FILES WHICH WILL BE
                ;GATHERED BY THE ASSEMBLER. THIS IS TO KEEP THE INDIVIDUAL DISK
                ;FILES DOWN TO A MANAGEABLE SIZE FOR EDITING.
                ;------------------------------------------------------------
                ;
                ;------------------------------------------------------------
                ;assembler actually starts generating obj code here...
                ;------------------------------------------------------------
  0800                  ORG     ROMBAS            ;BOTTOM OF ROM AREA
                ;
                ;*******************************************
                ;FIRST AN AREA FOR GENERIC DATA TABLES...
                ;*******************************************
                        INCLUD  C:SCGNDAT.INC     ;DATA TABLES for dsply etc
                ;This is table-related data to be included in the SUPERCALIBRATOR
                ;program-storage space.
                ;
                ;legal copyright notice...
                ;this will be first programmed bytes in EPROM
  0800 434F5059  DB      'COPYRIGHT 1987,1988 GPI INC.'
                ;
                ;THIS IS THE TIME, AS SEC E-7, OF THE BASIC TIME TICK
  081C 00000000  BTICK   DB      0,0,0,0,0,4,4,7          ;FOR CLOCK/32
                ;
                ;ONE SET OF FLUID/model DATA, FOR RUNNING CAL CHECK...
                ;2 RUNS, SAME PULSECOUNT, DFRNT PULSERATES...
  0824 0BB8001E  TCCK:   DW      3000,30,3000,300
                ;
                ;same value as above TCCK pulsecount but as E-3...
  082C 00030000  DCCT    DB      0,3,0,0,0,0,0,0
                ;
                ;used to make (5x) total pulsecount for cal runs...
  0834 00000000  DCNU    DB      0,0,0,0,0,0,0,5
                ;
                ;GENERIC UPPER-LINE DISPLAY MESSAGES
                ;MESSAGES ARE VARIABLE LENGTH (MAX 40), ASCIIZ
                ;------------------------------------------------------------
  083C 53454C45  .ULM:   DB      "SELECT CALIBRATION METHOD",0      ;MSG#0
  0856 504C4143          DB      "PLACE EDM INTO *CAL* MODE",0      ;1
  0870 52554E4E          DB      "RUNNING #1 OF 1... STAND BY",0    ;2
  088C 52554E4E          DB      "RUNNING #1 OF 2... STAND BY",0    ;3
  08A8 52554E4E          DB      "RUNNING #2 OF 2... STAND BY",0    ;4
  08C4 444F4E45          DB      "DONE... RESTORE EDM TO NORMAL MODE",0  ;5
  08E7 585800            DB      "XX",0                             ;6
  08EA 53454C45          DB      "SELECT CALIBRATION TYPE",0        ;7
  0902 454E5445          DB      "ENTER NEW >COUNT-1< VALUE...",0   ;8
  091F 454E5445          DB      "ENTER NEW >RATE-1< VALUE...",0    ;9
  093B 454E5445          DB      "ENTER NEW >COUNT-2< VALUE...",0   ;A
  0958 454E5445          DB      "ENTER NEW >RATE-2< VALUE...",0    ;B
  0974 434C4541          DB      "CLEAR (ZERO) EDM BATCH TOTAL",0   ;C
  0991 52554E4E          DB      "RUNNING CAL CHECK... STAND BY",0  ;D
  09AF 454E5445          DB      "ENTER DISPLAYED EDM READING",0    ;E
  09CB 454E5445          DB      "ENTER NEW CORRECTION FACTOR",0    ;F
  09E7 454E5445          DB      "ENTER NEW LO-FLOW CORRECTION FACTOR",0  ;10
  0A0B 454E5445          DB      "ENTER NEW HI-FLOW CORRECTION FACTOR",0  ;11
  0A2F 54494D45          DB      "TIME DELAY... STAND BY",0         ;12
  0A46 594F5527          DB      "YOU'LL NEED PREVIOUS CORRECTION FACTORS!",0  ;13
  0A6F 454E5445          DB      "ENTER PREVIOUS LO-FLOW CORRECTION FACTOR",0  ;14
  0A98 454E5445          DB      "ENTER PREVIOUS HI-FLOW CORRECTION FACTOR",0  ;15
                ;
                ;KEY-LABEL MESSAGES FOR DSPLY LOWER LINE
                ;MESSAGES ARE VARIABLE LENGTH (MAX 10), ASCIIZ
  0AC1 202000    .KLM:   DB      "  ",0                             ;MSG#0
  0AC4 47504953          DB      "GPIStd",0                         ;1
  0ACB 5477656l          DB      "Tweak",0                          ;2
  0AD1 4F6B00            DB      "Ok",0                             ;3
  0AD4 3C3C3C00          DB      "<<<",0                            ;4
  0AD8 53656C65          DB      "Select",0                         ;5
  0ADF 3E3E3E00          DB      ">>>",0                            ;6
  0AE3 312D706F          DB      "1-point",0                        ;7
  0AEB 322D706F          DB      "2-point",0                        ;8
  0AF3 456E7465          DB      "Enter",0                          ;9
  0AF9 436C6561          DB      "Clear",0                          ;A
  0AFF 5477B41           DB      "TwkAgain",0                       ;B
  0B08 4E657700          DB      "New",0                            ;C
  0B0C 52657065          DB      "Repeat",0                         ;D
                ;
                ;
                        END     ;OF INCLUDE
```

```
;*******************************************
;NOW AN AREA FOR fluid/model-TYPE DATA TABLES...
;*******************************************
        INCLUD  C:SCFTDAT.INC   ;DATA TABLES for fluid/models
;This special file contains the EDM-FLUID/MODEL data that is stored
;in the SUPERCAL EPROM. This file, AND ONLY THIS FILE, must be updated
;when changing the FLUID/model tables! After this file is updated, the
;entire SUPERCAL program must be re-assembled. Presumably a new EPROM
;release will then be generated.
;
;***************************************************************************
;*         STEP-BY-STEP INSTRUCTIONS FOR ADDING A NEW FLUID/MODEL:         *
;*-------------------------------------------------------------------------*
;* 1. Determine the NAME of the FLUID/model as it will be displayed on     *
;*    THE upper LCD line during selection. This may include almost any-    *
;*    THING, but the MAXIMUM LENGTH IS 40 CHARACTERS.                      *
;*                                                                          *
;* 2. Determine the "COUNT" AND "PULSERATE" numbers for the (first)        *
;*    calibration run for the new FLUID/model. "COUNT" is the number of    *
;*    simulated "PICKUP PULSES" (4X the number of turbine revs), "RATE"    *
;*    is the FREQUENCY, IN PULSES-PER-SECOND, of the simulated "PICKUP     *
;*    PULSES" (4X THE turbine rotation SPEED in REVS/SEC).                 *
;*                                                                          *
;* 3. If this is to be a "2-POINT" calibration, determine a SECOND set     *
;*    of "COUNT" and "PULSERATE" numbers, as above, but to be used         *
;*    during the SECOND "cal run."                                         *
;*                                                                          *
;* 4. In the ".FTM" table below, immediately after the last valid FLUID/   *
;*    MODEL name, but before the "NEW FLUID/MODEL" message, add a "DB"     *
;*    statement with the new name. Use EXACTLY the same pattern as the    *
;*    other names in the table, INCLUDING THE SPACING AND THE SINGLE-     *
;*    QUOTE MARKS (') and the TERMINATING "0" CHARACTER.                   *
;*                                                                          *
;* 5. In the ".TFND" table below, immediately after the last existing      *
;*    "DW" statement, add a new "DW" statement defining the new values     *
;*    for "COUNT(1)", "RATE(1)", "COUNT(2)", AND "RATE(2)".                *
;*    * NOTE: ALL FOUR VALUES MUST ALWAYS BE INCLUDED IN THE DW STATE-     *
;*            MENT! If this is to be a 1-POINT CAL procedure, enter        *
;*            "0" values FOR "COUNT(2)" and "RATE(2)" positions!           *
;*    Use EXACTLY THE SAME PATTERN as the other table entries, including   *
;*    the spacing and the commas (,) seperating numeric values.            *
;*                                                                          *
;* 6. Update the "MAXFT" variable, immediately below, to reflect the new   *
;*    NUMBER OF DEFINED FLUIDS/MODELS in the new table.                    *
;*                                                                          *
;* 7. If desired, update the "SOL" message near the end of this file       *
;*    with a new release # and date. This is the message that appears      *
;*    on the supercal LCD for 5 seconds following power-up or reset.       *
;*    THE TOTAL LENGTH OF THIS MESSAGE (BETWEEN "'" CHARACTERS) MUST       *
;*    REMAIN EXACTLY 40 CHARACTERS! This message doesn't affect the        *
;*    calibrator operation in any way, but should be updated after any     *
;*    change for the sake of documentation.                                *
;***************************************************************************
;
;--->YOU MUST UPDATE THIS VARIABLE WHEN ADDING/DELETING FLUIDS/MODELS
;IT IS JUST THE CURRENT NUMBER OF FLUIDS/MODELS IN THE TABLE, NOT
;INCLUDING THE "NEW FLUID/MODEL" NAME...
0018            MAXFT   EQU     24              ;# KNOWN FLUIDS/MODEL #S
;
;FOR EACH FLUID/MODEL, THERE IS AN ASCIIZ NAME IN ONE TABLE,
;AND A CORRESPONDING SET OF NUMERIC data IN A SECOND TABLE...
;
;FLUID/MODEL-TABLE 1: FLUID/MODEL NAMES FOR UPPER DISPLAY LINE:
;Messages are variable length (max 40), ASCIIZ.
0B13            .FTM:
0B13 4D6F6465          DB      'Model xA30Gx',0    ;model# 0, ALUM LO-FLO GALLON
0B20 4D6F6465          DB      'Model xB30Gx',0    ;1, TEFLON LO-FLO GALLON
0B2D 4D6F6465          DB      'Model xS30Gx',0    ;2, SS LO-FLO GALLON
0B3A 4D6F6465          DB      'Model xV30Gx',0    ;3, PVDF LO-FLO GALLON
0B47 4D6F6465          DB      'Model xN30Gx',0    ;4, NYLON LO-FLO GALLON
0B54 4D6F6465          DB      'Model xA31Gx',0    ;model# 5, ALUM 1-INCH GALLON
0B61 4D6F6465          DB      'Model xB31Gx',0    ;6, TEFLON 1-INCH GALLON
0B6E 4D6F6465          DB      'Model xS31Gx',0    ;7, SS 1-INCH GALLON
0B7B 4D6F6465          DB      'Model xV31Gx',0    ;8, PVDF 1-INCH GALLON
0B88 4D6F6465          DB      'Model xN31Gx',0    ;9, NYLON 1-INCH GALLON
0B95 4D6F6465          DB      'Model xA32Gx',0    ;model# 10, ALUM 2-INCH GALLON
0BA2 4D6F6465          DB      'Model xS32Gx',0    ;11, SS 2-INCH GALLON
0BAF 4D6F6465          DB      'Model xA11Lx',0    ;model# 12, ALUM LO-FLO LITER
```

```
0BBC 4D6F6465        DB      'Model xB11Lx',0        ;13. TEFLON LO-FLO LITER
0BC9 4D6F6465        DB      'Model xS11Lx',0        ;14. SS LO-FLO LITER
0BD6 4D6F6465        DB      'Model xV11Lx',0        ;15. PVDF LO-FLO LITER
0BE3 4D6F6465        DB      'Model xN11Lx',0        ;16. NYLON LO-FLO LITER
0BF0 4D6F6465        DB      'Model xA12Lx',0        ;model# 17. ALUM 1-INCH LITER
0BFD 4D6F6465        DB      'Model xB12Lx',0        ;18. TEFLON 1-INCH LITER
0C0A 4D6F6465        DB      'Model xS12Lx',0        ;19. SS 1-INCH LITER
0C17 4D6F6465        DB      'Model xV12Lx',0        ;20. PVDF 1-INCH LITER
0C24 4D6F6465        DB      'Model xN12Lx',0        ;21. NYLON 1-INCH LITER
0C31 4D6F6465        DB      'Model xA13Lx',0        ;model# 22. ALUM 2-INCH LITER
0C3E 4D6F6465        DB      'Model xS13Lx',0        ;23. SS 2-INCH LITER
                ;(... ETC ... NEW FLUIDS/MODELS GO HERE. DONT ERASE FOLLOWING MSG.)
                ;
0C4B 4E455720        DB      'NEW MODEL',0
                ;
                ;FLUID/MODEL-TABLE 2: CORRESPONDING NUMERIC DATA.
                ;EACH LINE BELOW MATCHES THE CORRESPONDING LINE ABOVE.
                ;FOUR NUMERIC VALUES FOR EACH FLUID/MODEL ARE:
                ;PULSECOUNT(1). PULSERATE(1). PULSECOUNT(2). PULSERATE(2).
                ;PULSECOUNT(2) NON-ZERO IS FLAG FOR 2-POINT CAL THIS FLUID/MODEL.
0C55            .TFND:
0C55 2BA10019        DW      11169,25,11309,100      ;model# 0. ALUM LO-FLO GALLON
0C5D 2D1F0019        DW      11551,25,11888,100      ;1. TEFLON LO-FLO GALLON
0C65 2A710019        DW      10865,25,11172,100      ;2. SS LO-FLO GALLON
0C6D 2D350019        DW      11573,25,11770,100      ;3. PVDF LO-FLO GALLON
0C75 2D160019        DW      11542,25,11637,100      ;4. NYLON LO-FLO GALLON
0C7D 0DB5004B        DW      3509,75,3549,300        ;model# 5. ALUM 1-INCH GALLON
0C85 0DF6004B        DW      3574,75,3609,300        ;6. TEFLON 1-INCH GALLON
0C8D 0D90004B        DW      3472,75,3518,300        ;7. SS 1-INCH GALLON
0C95 0E92004B        DW      3730,75,3787,300        ;8. PVDF 1-INCH GALLON
0C9D 0E2B004B        DW      3627,75,3707,300        ;9. NYLON 1-INCH GALLON
0CA5 0D91004B        DW      3473,75,3639,300        ;model# 10. ALUM 2-INCH GALLON
0CAD 0D99004B        DW      3481,75,3630,300        ;11. SS 2-INCH GALLON
0CB5 0B870019        DW      2951,25,2988,100        ;model# 12. ALUM LO-FLO LITER
0CBD 0BEC0019        DW      3052,25,3141,100        ;13. TEFLON LO-FLO LITER
0CC5 0B360019        DW      2870,25,2951,100        ;14. SS LO-FLO LITER
0CCD 0BF10019        DW      3057,25,3109,100        ;15. PVDF LO-FLO LITER
0CD5 0BE90019        DW      3049,25,3074,100        ;16. NYLON LO-FLO LITER
0CDD 2434004B        DW      9268,75,9375,300        ;model# 17. ALUM 1-INCH LITER
0CE5 24E1004B        DW      9441,75,9534,300        ;18. TEFLON 1-INCH LITER
0CED 23D4004B        DW      9172,75,9294,300        ;19. SS 1-INCH LITER
0CF5 267E004B        DW      9854,75,10003,300       ;20. PVDF 1-INCH LITER
0CFD 256E004B        DW      9582,75,9792,300        ;21. NYLON 1-INCH LITER
0D05 23D7004B        DW      9175,75,9610,300        ;model# 22. ALUM 2-INCH LITER
0D0D 23EB004B        DW      9195,75,9590,300        ;23. SS 2-INCH LITER
                ;(... ETC ...)
                ;
                ;
                ;SPECIAL MESSAGES FOR SIGN-ON, FIXED LENGTH
0D15 20202020  SOU:  DB      '     ---- EDM CALIBRATION SYSTEM ----     '
0D3D 2056312E  SOL:  DB      ' V1.3 R001  Copyright 1987,1988 GPI Inc '
                ;
                ;
                        END             ;OF INCLUDE
                ;*****************************************
                ;BCD MATH SUBROUTINES FOR THE 6805
                ;*****************************************
                        INCLUD  C:SCMATH.INC    ;ALL BCD MATH ROUTINES
                ;THE FOLLOWING ROUTINES DO BCD ARITHMETIC ON RAM-BASED REGISTERS
                ;WHICH ARE ASSUMED 8 BYTES LONG, WITH 1 BCD DIGIT PER BYTE. WITHIN
                ;EACH REGISTER THE MSD IS AT THE LOWEST ADDRESS, WITH DIGITS IN DES-
                ;CENDING ORDER SO THAT THE LSD IS AT THE HIGHEST ADDRESS.
                ;EXAMPLE: 12345 IS STORED AS     BASE     BYTE 00h
                ;                                BASE+1   BYTE 00h
                ;                                BASE+2   BYTE 00h
                ;                                BASE+3   BYTE 01h
                ;                                BASE+4   BYTE 02h
                ;                                BASE+5   BYTE 03h
                ;                                BASE+6   BYTE 04h
                ;                                BASE+7   BYTE 05h
                ;
                ;ADDITIONALLY, THE BINARY-TO-BCD ROUTINE EXPECTS THE BINARY VALUE TO
                ;LIVE IN A 2-BYTE REGISTER, AND USES ANOTHER 2-BYTE REGISTER FOR
                ;TEMPORARY WORK. BINARY VALUES ARE STORED IN THESE REGISTERS AS
                ;STRAIGHT 16-BIT CODE. THE LSD IS AT THE LOW END OF THE HIGHEST
                ;ADDRESS. EXAMPLE: 1234h IS      BASE     BYTE 12h
                ;                                BASE+1   BYTE 34H
                ;
                ;ALL BCD REGISTERS ARE ASSUMED TO BE IN PAGE-1 RAM SO AS TO
                ;BE ADDRESSABLE VIA "100,X" INSTRUCTIONS.
```

```
                    ;ALL BINARY REGISTERS ARE ASSUMED TO BE IN PAGE-0 RAM SO AS TO
                    ;BE ADDRESSABLE VIA ",X" INSTRUCTIONS.
                    ;
                    ;WHEN A SINGLE OPERAND IS NEEDED, THE REG INDEX IS PASSED IN X.
                    ;IF A SECOND OPERAND IS NEEDED, ITS REG INDEX IS PASSED (ALSO) IN A.
                    ;TERMINOLOGY:   R(A) MEANS REGISTER ADDRESSED BY ACC
                    ;               R(X) MEANS REGISTER ADDRESSED BY X
                    ;
                    ;
                    ;*****************************
                    ;NOW THE ACTUAL BCD ROUTINES
                    ;*****************************
                    ;THIS COPIES ANY PG1 R(X) INTO ANY PG1 R(A).
                    ;USES MTA0,MC0,MTX0 TEMPS, NO OTHER SRS.
                    ;-----------------------------------------
0D65 B780           .XCPYA: STA     MTA0
0D67 A607                   LDA     #NDGM1              ;TO DO ALL DIGITS
0D69 B787                   STA     MC0
0D6B BF83                   STX     MTX0
0D6D BE83           XCYA1:  LDX     MTX0
0D6F D60100                 LDA     PAGE1,X             ;GET SOURCE BYTE
0D72 BE80                   LDX     MTA0
0D74 D70100                 STA     PAGE1,X             ;PUT IT IN DESTINATION
0D77 3C83                   INC     MTX0
0D79 3C80                   INC     MTA0
0D7B 3A87                   DEC     MC0                 ;LOOP FOR ALL DIGITS
0D7D 2AEE                   BPL     XCYA1
0D7F 81                     RTS

;
                    ;
                    ;-----------------------------------------
                    ;THIS ALSO COPIES R(X) TO R(A), BUT ASSUMES R(X) IN FIRST PAGE
                    ;OF ROM, R(A) IS IN RAM. (IE LOAD A CONSTANT INTO RAM).
                    ;USES SAME VARIABLES AS XCPYA ABOVE
                    ;-----------------------------------------
0D80 B780           .XROMA: STA     MTA0
0D82 A607                   LDA     #NDGM1              ;TO DO ALL DIGITS
0D84 B787                   STA     MC0
0D86 BF83                   STX     MTX0
0D88 BE83           XRMA1:  LDX     MTX0
0D8A D60800                 LDA     ROMBAS,X
0D8D BE80                   LDX     MTA0
0D8F D70100                 STA     PAGE1,X
0D92 3C83                   INC     MTX0
0D94 3C80                   INC     MTA0
0D96 3A87                   DEC     MC0                 ;LOOP FOR ALL DIGITS
0D98 2AEE                   BPL     XRMA1
0D9A 81                     RTS

;
                    ;
                    ;       PAGE    6
                    ;-----------------------------------------
                    ;ANOTHER COPIER, THIS TIME FROM PAGE2 (INDEXED BY X)
                    ;TO PAGE1 (INDEXED BY A). USES SAME TEMPS AS ABOVE...
                    ;-----------------------------------------
                    ;.X2A1   STA     MTA0
                    ;        LDA     #NDGM1              ;TO DO ALL DIGITS
                    ;        STA     MC0
                    ;        STX     MTX0
                    ;X211:   LDX     MTX0
                    ;        LDA     PAGE2,X             ;GET SOURCE BYTE
                    ;        LDX     MTA0
                    ;        STA     PAGE1,X             ;PUT IT IN DESTINATION
                    ;        INC     MTX0
                    ;        INC     MTA0
                    ;        DEC     MC0                 ;LOOP FOR ALL DIGITS
                    ;        BPL     X211
                    ;        RTS

;
                    ;       PAGE    6
                    ;-----------------------------------------
                    ;AND THE REVERSE OF ABOVE... COPY FROM PAGE1 (INDEXED BY X)
                    ;TO PAGE2 (INDEXED BY A). USES SAME TEMPS AS ABOVE...
                    ;-----------------------------------------
                    ;.X1A2   STA     MTA0
                    ;        LDA     #NDGM1              ;TO DO ALL DIGITS
                    ;        STA     MC0
                    ;        STX     MTX0
                    ;X121:   LDX     MTX0
```

```
              ;       LDA       PAGE1,X          ;GET SOURCE BYTE
              ;       LDX       MTA0
              ;       STA       PAGE2,X          ;PUT IT IN DESTINATION
              ;       INC       MTX0
              ;       INC       MTA0
              ;       DEC       MC0              ;LOOP FOR ALL DIGITS
              ;       BPL       X121
              ;       RTS
              ;
              ;
              ;       PAGE      6
              ;-----------------------------------------------------------
              ;YET ANOTHER COPIER, THIS TIME FROM PAGE3 (INDEXED BY X)
              ;TO PAGE1 (INDEXED BY A). USES SAME TEMPS AS ABOVE...
              ;-----------------------------------------------------------
              ;.X3A1  STA       MTA0
              ;       LDA       #NDGM1           ;TO DO ALL DIGITS
              ;       STA       MC0
              ;       STX       MTX0
              ;X311:  LDX       MTX0
              ;       LDA       PAGE3,X          ;GET SOURCE BYTE
              ;       LDX       MTA0
              ;       STA       PAGE1,X          ;PUT IT IN DESTINATION
              ;       INC       MTX0
              ;       INC       MTA0
              ;       DEC       MC0              ;LOOP FOR ALL DIGITS
              ;       BPL       X311
              ;       RTS
              ;
              ;
              ;       PAGE      6
              ;-----------------------------------------------------------
              ;AND THE REVERSE OF ABOVE... COPY FROM PAGE1 (INDEXED BY X)
              ;TO PAGE3 (INDEXED BY A). USES SAME TEMPS AS ABOVE...
              ;-----------------------------------------------------------
              ;.X1A3  STA       MTA0
              ;       LDA       #NDGM1           ;TO DO ALL DIGITS
              ;       STA       MC0
              ;       STX       MTX0
              ;X131:  LDX       MTX0
              ;       LDA       PAGE1,X          ;GET SOURCE BYTE
              ;       LDX       MTA0
              ;       STA       PAGE3,X          ;PUT IT IN DESTINATION
              ;       INC       MTX0
              ;       INC       MTA0
              ;       DEC       MC0              ;LOOP FOR ALL DIGITS
              ;       BPL       X131
              ;       RTS
              ;
              ;
              ;-----------------------------------------------------------
              ;TEST R(X) FOR ALL-0. RTN A=0 AND Z SET IF TRUE
              ;USES MC0 TEMP, CALLS NO OTHER SRS.
              ;-----------------------------------------------------------
0D9B A607     .XCHK0: LDA       #NDGM1           ;FOR ALL DIGITS
0D9D B787             STA       MC0
0D9F 4F               CLRA                       ;A WILL GET RESULT
0DA0 DA0100   XC01:   ORA       PAGE1,X          ;NEXT DIGIT
0DA3 5C               INCX
0DA4 3A87             DEC       MC0
0DA6 2AF8             BPL       XC01
0DA8 AA00             ORA       #0
0DAA 81               RTS
              ;
              ;
              ;-----------------------------------------------------------
              ;CLEAR THE R(X) TO ALL ZERO.
              ;USES MC0 TEMP, NO OTHER SRS CALLED.
              ;-----------------------------------------------------------
0DAB A607     .XCLR:  LDA       #NDGM1           ;FOR ALL DIGITS
0DAD B787             STA       MC0
0DAF 4F               CLRA
0DB0 D70100   XCL2:   STA       PAGE1,X          ;CLEAR A BYTE
0DB3 5C               INCX                       ;RDY FOR NEXT
0DB4 3A87             DEC       MC0              ;SEE IF MORE
0DB6 2AF8             BPL       XCL2             ;THEN REPEAT
0DB8 81               RTS
              ;
              ;
              ;-----------------------------------------------------------
              ;increment a BCD register R(X) IN PLACE.
```

```
                    ;return Z for Zero result. C for overflow result
                    ;USES MC0 TEMP, NO OTHER SRS CALLED.
                    ;-------------------------------------------
0DB9 A607           .XINC:  LDA     #NDGM1          ;WILL DO LOOP ALL TIMES
0DBB B787                   STA     MC0
0DBD D60107         XIN1:   LDA     PAGE1+NDGM1,X
0DC0 4C                     INCA
0DC1 A109                   CMP     #9
0DC3 2205                   BHI     XIN3
0DC5 D70107                 STA     PAGE1+NDGM1,X
0DC8 98                     CLC                     ;NORMAL EXIT. RETURN NX AND NC
0DC9 81                     RTS
0DCA 4F             XIN3:   CLRA
0DCB D70107                 STA     PAGE1+NDGM1,X
0DCE 5A                     DECX
0DCF 3A87                   DEC     MC0
0DD1 2AEA                   BPL     XIN1
0DD3 4F                     CLRA                    ;OVERFLOW IF HERE. SET Z & C
0DD4 99                     SEC
0DD5 81                     RTS
                    ;
                    ;
                    ;-------------------------------------------
                    ;DECREMENT a BCD register R(X) IN PLACE.
                    ;return Z for Zero result. C for UNDERflow result.
                    ;USES MC0 AND MTX0 TEMPS. AND MAY CALL XCHK0 ROUTINE.
                    ;-------------------------------------------
                    ;.XDEC:  LDA    #NDGM1          ;WILL DO LOOP ALL TIMES
                    ;        STA    MC0
                    ;        STX    MTX0
                    ;XDE1:   LDA    PAGE1+NDGM1,X
                    ;        DECA
                    ;        BMI    XDE3
                    ;        STA    PAGE1+NDGM1,X
                    ;        LDX    MTX0            ;NORMAL EXIT.
                    ;        JSR    .XCHK0          ;MUST CHK RSLT FOR ALL ZERO
                    ;        CLC                    ;AND BE SURE NC
                    ;        RTS
                    ;XDE3:   LDA    #9
                    ;        STA    PAGE1+NDGM1,X
                    ;        DECX
                    ;        DEC    MC0
                    ;        BPL    XDE1
                    ;        SEC                    ;UNDERFLOW IF HERE. SET C.
                    ;        RTS
                    ;
                    ;
                    ;-------------------------------------------
                    ;SHIFT R(X) LEFT ONE DIGIT (I.E. MULT X 10).
                    ;LSD BECOMES 0. OVERFLOW, IF ANY, IS RETURNED IN A.
                    ;SEE REGISTER USE FOR XROL, WHICH IS PART OF THIS.
                    ;-------------------------------------------
0DD6 4F             .XSHL:  CLRA
                    ;SAME BUT LO NYBBLE OF A GOES INTO LSD OF R(X).
                    ;USES TEMPS MTX0,MC0,MTA0. NO OTHER SRS CALLED.
                    ;-------------------------------------------
0DD7 B783           .XROL:  STA     MTX0            ;WILL USE LATER
0DD9 A607                   LDA     #NDGM1          ;FOR ALL DIGITS
0DDB B787                   STA     MC0
0DDD D60100                 LDA     PAGE1,X
0DE0 B730                   STA     MTA0            ;STASH CURRENT MSD
0DE2 D60101         XRL2:   LDA     PAGE1+1,X
0DE5 D70100                 STA     PAGE1,X
0DE8 5C                     INCX
0DE9 3A87                   DEC     MC0
0DEB 26F5                   BNE     XRL2            ;CUZ ONLY 9 TIMES HERE
0DED B683                   LDA     MTX0            ;PUT A IN LSD
0DEF D70100                 STA     PAGE1,X
0DF2 B630                   LDA     MTA0            ;RETN WITH OLD MSD
0DF4 81                     RTS
                    ;
                    ;
                    ;-------------------------------------------
                    ;SHIFT R(X) RIGHT ONE DIGIT (I.E. DIV X 10).
                    ;MSD BECOMES 0. UNDERFLOW, IF ANY, IS RETURNED IN A.
                    ;SEE REG USE FOR XROR, WHICH IS PART OF THIS.
                    ;-------------------------------------------
0DF5 4F             .XSHR:  CLRA
                    ;SAME BUT LO NYBBLE OF A GOES INTO MSD OF R(X).
                    ;USES TEMPS MTX0,MC0,MTA0. NO OTHER SRS CALLED.
                    ;-------------------------------------------
```

```
0DF6 B783          .XROR:  STA     MTX0
0DF8 A607                  LDA     #NDGM1          ;FOR ALL DIGITS
0DFA B787                  STA     MC0
0DFC D60107                LDA     PAGE1+NDGM1,X   ;STASH THE CURRENT LSD
0DFF B780                  STA     MTA0
0E01 D60106        XRR2:   LDA     PAGE1+NDGM2,X
0E04 D70107                STA     PAGE1+NDGM1,X   ;X/C GO OTHER WAY
0E07 5A                    DECX
0E08 3A87                  DEC     MC0
0E0A 26F5                  BNE     XRR2            ;NINE TIMES
0E0C B683                  LDA     MTX0            ;PUT A IN MSD
0E0E D70107                STA     PAGE1+NDGM1,X
0E11 B680                  LDA     MTA0            ;RETURN WITH OLD LSD
0E13 81                    RTS
                   ;
                   ;-------------------------------------------------
                   ;COMPARE R(X) - R(A), NO CHANGE EITHER. RET CY/Z PER RESULT JUST
                   ;LIKE CPU CMP INSTRUCTION. DON'T DISTURB ANY BCD REGISTERS.
                   ;USES TEMPS MTA0,MTX0,C8XA, NO OTHER SRS CALLED.
                   ;-------------------------------------------------
0E14 B780          .XCMPA: STA     MTA0            ;SAVE INPUT REG#S
0E16 BF83                  STX     MTX0
0E18 A607                  LDA     #NDGM1          ;FOR ALL DIGITS
0E1A B787                  STA     MC0
0E1C BE83          XCMA1:  LDX     MTX0
0E1E D60100                LDA     PAGE1,X         ;GET A DGT OF R(X)
0E21 BE80                  LDX     MTA0
0E23 D10100                CMP     PAGE1,Y         ;CMP W/DGT OF R(A)
0E26 2701                  BEQ     XCA2            ;CONTINUE IF EQUAL
0E28 81                    RTS                     ;ELSE CAN RETURN NOW.
0E29 3C80          XCA2:   INC     MTA0
0E2B 3C83                  INC     MTX0
0E2D 3A87                  DEC     MC0             ;MORE DIGITS?
0E2F 2AEB                  BPL     XCMA1           ;THEN DO THEM
0E31 4F                    CLRA                    ;IF HERE ALL EQUAL
0E32 81                    RTS                     ;RETURN ACCORDINGLY.
                   ;
                   ;-------------------------------------------------
                   ;DO R(X) + R(A), RSLT TO R(X). RET CY/Z PER RSLT.
                   ;USES TEMPS MTA0,MTX0,MTX1,MC1,MF0, AND CALLS XCHK0 SR.
                   ;-------------------------------------------------
0E33 B780          .XADDA: STA     MTA0
0E35 BF83                  STX     MTX0
0E37 BF84                  STX     MTX1            ;WILL NEED LATER
0E39 A607                  LDA     #NDGM1
0E3B B788                  STA     MC1             ;MUST DO ALL DIGITS
0E3D 3F8A          XADA1:  CLR     MF0             ;USE THIS FOR OVERFLOW DETECT
0E3F BE83                  LDX     MTX0            ;GET APPROPRIATE DIGIT
0E41 D60107                LDA     PAGE1+NDGM1,X   ;FROM R(X)
0E44 BE80                  LDX     MTA0            ;POINT TO R(A)
0E46 DB0107                ADD     PAGE1+NDGM1,X   ;ADD ITS VALUE
0E49 BE83                  LDX     MTX0            ;STORE IN R(X) AGN
0E4B 2904                  BHCS    XADA2           ;SEE IF HALF-CY
0E4D A109                  CMP     #9              ;OR > 9
0E4F 2315                  BLS     XADA4           ;IF NEITHER THEN DONE THIS DIGIT
0E51 AB06          XADA2:  ADD     #6              ;ELSE MUST CORRECT
0E53 A40F          XADA3:  AND     #$F             ;MASK OFF HI NYBBLE
0E55 3C8A                  INC     MF0             ;SHOW OVERFLOW THIS DIGIT
0E57 3D88                  TST     MC1
0E59 270B                  BEQ     XADA4           ;AND SKIP CY OP IF JUST DID MSD
0E5B B78B                  STA     MF1
0E5D D60106                LDA     PAGE1+NDGM2,X   ;ELSE THIS CAUSES DECIMAL CY
0E60 4C                    INCA
0E61 D70106                STA     PAGE1+NDGM2,X
0E64 B68B                  LDA     MF1
0E66 D70107        XADA4:  STA     PAGE1+NDGM1,X   ;REPLACE THIS DIGIT
0E69 3A83                  DEC     MTX0
0E6B 3A80                  DEC     MTA0
0E6D 3A88                  DEC     MC1             ;SEE IF MORE DIGITS
0E6F 2ACC                  BPL     XADA1           ;AND LOOP IF SO
0E71 BF84                  LDX     MTX1            ;NEED FOR .XCHK0
0E73 3D8A                  TST     MF0             ;SEE IF WAS OVERFLOW LAST TIME
0E75 2603                  BNE     XADA5           ;THEN OVFLW EXIT
0E77 CD0DF8                JSR     .XCHK0          ;ELSE SET/RESET I CONDITION
0E7A 98                    CLC                     ;AND NORMAL EXIT
0E7B 81                    RTS
0E7C CD0DF8        XADA5:  JSR     .XCHK0          ;SET RESET I
0E7F 99                    SEC                     ;AND EXIT W/OVERFLOW
```

```
0E80 81                    RTS

;-------------------------------------------------------------------
;DO R(X) - R(A), RSLT TO R(X). UNDERFLOW RET CY.
;USES TEMPS MTA0,MTX0,MTX1,MC1,MF0, ALSO CALLS XCHK0 SR.
;-------------------------------------------------------------------
0E81 B780      .XSUBA: STA   MTA0
0E83 BF83              STX   MTX0
0E85 BF84              STX   MTX1            ;MUST PRESERVE THIS
0E87 A607              LDA   #NDGM1
0E89 B789              STA   MC1             ;MUST DO ALL DIGITS
0E8B 3F8A      XSBA1:  CLR   MF0             ;WILL SHOW UNDRFLW EACH DGT
0E8D BE83              LDY   MTX0            ;GET APPROPRIATE DIGIT
0E8F D60107            LDA   PAGE1+NDGM1,X   ;FROM R(X)
0E92 BE80              LDX   MTA0            ;POINT TO R(A)
0E94 D00107            SUB   PAGE1+NDGM1,X   ;SUBTRACT ITS VALUE
0E97 BE83              LDX   MTX0            ;STORE IN R(X) AGN
0E99 AA00              ORA   #0              ;RESTORE FLAGS
0E9B 2A15              BPL   XSBA4
0E9D A006              SUB   #6              ;ELSE MUST CORRECT
0E9F A40F              AND   #$F             ;MASK MSNYBBLE
0EA1 3C8A              INC   MF0             ;UNDRFLW THIS DIGIT
0EA3 3D89              TST   MC1             ;SEE IF THIS WAS MSD
0EA5 270B              BEQ   XSBA4
0EA7 B78B              STA   MF1
0EA9 D60106            LDA   PAGE1+NDGM2,X
0EAC 4A                DECA
0EAD D70106            STA   PAGE1+NDGM2,X   ;ELSE THIS CAUSES DECIMAL BW
0EB0 B68B              LDA   MF1
0EB2 D70107    XSBA4:  STA   PAGE1+NDGM1,X   ;REPLACE THIS DIGIT
0EB5 3A83              DEC   MTX0
0EB7 3A80              DEC   MTA0
0EB9 3A89              DEC   MC1             ;SEE IF MORE DIGITS
0EBB 2ACE              BPL   XSBA1           ;AND LOOP IF SO
0EBD BE84              LDX   MTX1            ;NEED FOR .XCHK0
0EBF 20B2              BRA   XASX            ;GOTO COMMON EXIT

;-------------------------------------------------------------------
;MULTIPLY R(X) * R(A), RELULT TO R(X). RESULT IS EXPECTED TO FIT
;INTO ONE 10-DIGIT REGISTER. ON RETURN Z SET MEANS OK, NO OVERFLOW.
;Z CLEAR MEANS WAS OVERFLOW. IF SO, THE HIGH-ORDER 10 DIGITS WILL
;BE IN PPROD. USES BYTE TEMPS MTX2,CSXMA,MF2. USES BCD TEMPS
;MLPLR, MLCND,PPROD,FPROD. ALSO CALLS .XCPYA, .XCLR, .XADDA,
;.XSHL, AND .XCHK0 SUBROUTINES.
;-------------------------------------------------------------------
0EC1 BF85      .XMLTA: STX   MTX2            ;SAVE THE INCOMING MULTIPLICAND
0EC3 97                TAX
0EC4 A650              LDA   #MLPLR-PAGE1    ;COPY R(A) VALUE TO MLPLR
0EC6 CD0D65            JSR   .XCPYA          ;(THIS IS MULTIPLIER)
0EC9 BE85              LDX   MTX2
0ECB A658              LDA   #MLCND-PAGE1    ;COPY R(X) VALUE TO MLCND
0ECD CD0D65            JSR   .XCPYA          ;(THIS IS THE MULTIPLICAND)
0ED0 AE60              LDX   #PPROD-PAGE1
0ED2 CD0DAB            JSR   .XCLR           ;CLEAR FPROD TO RECEIVE RESULTS
0ED5 A607              LDA   #NDGM1          ;(NO NEED TO CLR FPROD CUZ SHIFTS
0ED7 B789              STA   MC2             ;DO FOLLOWING ALL TIMES
0ED9 3F8C      XMA1:   CLR   MF2             ;KEEP TRACK ADD OVERFLOW EACH DIGIT
0EDB BE89      XMA3:   LDX   MC2
0EDD D60150            LDA   MLPLR,X
0EE0 4A                DECA
0EE1 D70150            STA   MLPLR,X         ;SEE IF DONE THIS DIGIT
0EE4 2B0D              BMI   XMA33           ;THEN SKIP
0EE6 AE60              LDX   #PPROD-PAGE1    ;ELSE REPEATED ADD OF MLCND TO PPROD
0EE8 A658              LDA   #MLCND-PAGE1
0EEA CD0E33            JSR   .XADDA
0EED 24EC              BCC   XMA3            ;IF NO ADD OVERFLOW CONTINUE
0EEF 3C8C              INC   MF2             ;ELSE MARK IT IN FLAG
0EF1 20E8              BRA   XMA3            ;CONTINUE THIS DIGIT
0EF3 B68C      XMA33:  LDA   MF2             ;NOW HAS #CYS FRM THIS DIGIT
0EF5 AE60              LDX   #PPROD-PAGE1
0EF7 CD0DF6            JSR   .XROR           ;CONTENT OF MF2 TO MSD OF PPROD
0EFA AE68              LDX   #FPROD-PAGE1    ;& ROTATE PPROD INTO FPROD
0EFC CD0DF6            JSR   .XROR
0EFF 3A89              DEC   MC2             ;SEE IF MORE DIGITS TO DO
0F01 2AD6              BPL   XMA1            ;YES, DO NEXT DIGIT
0F03 AE68              LDX   #FPROD-PAGE1    ;NOW MOVE RSLT FPROD TO ORIG MCND
0F05 B685              LDA   MTX2
0F07 CD0D65            JSR   .XCPYA
```

```
0F0A AE60              LDX    #PPROD-PAGE1    ;SEE IF ANY FINAL OVERFLOW
0F0C CC0D9B            JMP    .XCHK0          ;WILL RTN Z IF OK, ELSE NZ
                       ;
                       ;
                       ;-----------------------------------------------------
                       ;DIVIDE R(X) / R(A), RESULT TO R(X). WILL RETURN QUOTIENT IN R(X).
                       ;Z CLR ON RETURN MEANS THERE IS A REMAINDER... IT WILL BE IN THE
                       ;DIVDD REGISTER. THIS USES BYTE TEMPS MTX2,MTA1. USES BCD TEMPS
                       ;DIVSR,DIVDD,PQUOT,FQUOT. ALSO CALLS .XCHK0, .XCMPA, .XCLR, .XINC,
                       ;.XCPYA, .XSHL, AND .XSUBA SUBROUTINES.
                       ;-----------------------------------------------------
0F0F BF85     .XDIVA:  STX    MTX2            ;SAVE INPUT DIVIDEND
0F11 B781              STA    MTA1            ;SAVE INPUT DIVISOR
0F13 97                TAX
0F14 CD0D9B            JSR    .XCHK0          ;SEE IF DIVISOR=0
0F17 2601              BNE    XDA11
0F19 81                RTS                    ;DIVSR=0! JUST RETURN NOW.
0F1A BE85     XDA11:   LDX    MTX2            ;ELSE SEE WHICH IS BIGGER
0F1C B681              LDA    MTA1
0F1E CD0E14            JSR    .XCMPA          ;(OR PERHAPS SAME)
0F21 2611              BNE    XDA1
0F23 BE85              LDX    MTX2            ;DIVIDEND=DIVISOR! QUOTIENT
0F25 CD0DAB            JSR    .XCLR           ; =1, REMAINDER =ZERO.
0F28 BE85              LDX    MTX2
0F2A CD0DB9            JSR    .XINC           ;FORCE QUOT (R(X))=1
0F2D AE58              LDX    #DIVDD-PAGE1
0F2F CD0DAB            JSR    .XCLR           ;FORCE REMAINDER=0
0F32 2070              BRA    XDAX            ;AND DONE.
0F34 240E     XDA1:    BCC    XDA2
0F36 BE85              LDX    MTX2            ;DIVIDEND < DIVISOR
0F38 CD0DAB            JSR    .XCLR           ;FORCE QUOTIENT=0
0F3B BE81              LDX    MTA1
0F3D A658              LDA    #DIVDD-PAGE1    ;DIVISOR TO REMAINDER
0F3F CD0D65            JSR    .XCPYA
0F42 2060              BRA    XDAX            ;AND DONE.
                       ;NORMAL DIVIDE. DIVIDEND > DIVISOR
0F44 BE85     XDA2:    LDX    MTX2
0F46 A658              LDA    #DIVDD-PAGE1    ;MOVE DIVIDEND TO DIVDD
0F48 CD0D65            JSR    .XCPYA
0F4B AE60              LDX    #PQUOT-PAGE1    ;USE PQUOT FOR INTERMEDIATE WORK
0F4D CD0DAB            JSR    .XCLR
0F50 AE68              LDX    #FQUOT-PAGE1    ;QUOTIENT WILL FORM IN FQUOT
0F52 CD0DAB            JSR    .XCLR
                       ;HERE ONLY FIRST TIME THRU FOLLOWING LOOP:
0F55 3F8C     XDA5:    CLR    MF2             ;THIS WILL KEEP TRACK OF SHIFTS
0F57 BE81              LDX    MTA1
0F59 A650              LDA    #DIVSR-PAGE1    ;PUT ORIG DIVSOR IN DIVSR
0F5B CD0D65            JSR    .XCPYA
0F5E C60150   XDA51:   LDA    DIVSR           ;SEE IF MSD DIVSR HAS DIGIT
0F61 2614              BNE    XDA52           ; THEN SKIP
0F63 AE50              LDX    #DIVSR-PAGE1
0F65 CD0DD6            JSR    .XSHL           ;ELSE SHIFT DIVSR LEFT 1
0F68 3C8C              INC    MF2             ; KEEPING TRACK OF TIMES DONE
0F6A 20F2              BRA    XDA51           ; AND CHECK AGAIN
                       ;HERE SUCCEEDING TIMES THRU LOOP:
0F6C 3D8C     XDA54:   TST    MF2             ;IF ANY SHIFTS REMAINING...
0F6E 272D              BEQ    XDA6
0F70 AE50              LDX    #DIVSR-PAGE1    ; SHFT DIVSR BACK RIGHT ONE PLACE
0F72 CD0DF5            JSR    .XSHR
0F75 3A8C              DEC    MF2             ; AND KEEP TRACK RIGHT SHIFTS
                       ;HERE IF WILL BE DIGIT TO RSLT. CALC IT.
0F77 AE58     XDA52:   LDX    #DIVDD-PAGE1    ;DIVDD IS >= DIVSR...
0F79 A660              LDA    #PQUOT-PAGE1    ; CALC THIS RSLT DGT BY REPEATED SUBS
0F7B CD0D65            JSR    .XCPYA          ;USE PQUOT FOR TEMP CALCS
0F7E 3F8D              CLR    MF3             ;THIS WILL ACCUMULATE SUBS/DIGIT
0F80 AE60     XDA8:    LDX    #PQUOT-PAGE1
0F82 A650              LDA    #DIVSR-PAGE1
0F84 CD0E81            JSR    .XSUBA          ;HOW MANY TIMES GOZINTA
0F87 250B              BCS    XDA7
0F89 3C8D              INC    MF3             ;KEEP TRACK THEREOF
0F8B AE60              LDX    #PQUOT-PAGE1
0F8D A658              LDA    #DIVDD-PAGE1    ;UPDATE DIVIDEND
0F8F CD0D65            JSR    .XCPYA
0F92 20EC              BRA    XDA8
                       ;HERE TO PUT THIS DIGIT INTO RESULT:
0F94 B68D     XDA7:    LDA    MF3             ;AND PUT #TIMES INTO QUOT
0F96 AE68              LDX    #FQUOT-PAGE1
0F98 CD0DD7            JSR    .XROL
0F9B 20CF              BRA    XDA54           ;AND REPEAT
                       ;HERE WHEN DIVISOR SHIFTED BACK TO ORIG POSITION
```

```
0F9D AE68    XDA6:   LDX     #FQUOT-PAGE1
0F9F B685            LDA     MTX2
0FA1 CD0D65          JSR     .XCPYA              ;MOVE QUOTIENT TO ORIG DIVIDEND
0FA4 AE58    XDAX:   LDX     #DIVDD-PAGE1
0FA6 CC0D9B          JMP     .XCHK0              ;WILL RETURN NZ IF ANY REMAINER
```

;----------------------------------------------------------------
;THIS CONVERTS AND TRANSFERS THE CONTENTS OF A 2-BYTE BINARY REGISTER
;PER X INTO ANY OF THE 8-DIGIT BCD REGISTERS PER A. RETURN Z SET IF
;VALUE IS ZERO. DO NOT DESTROY ORIGINAL BYTE VALUE. THIS USES THE BDT
;2-BYTE-BINARY TEMP, AND BYTE TEMPS MTA1,MTA2, AND BCD TEMPS BTAT0,BTAT1
;ALSO CALLS .XCLR, .XINC, .XADDA, AND .XCPYA SRS. ALL (AND ONLY) BINARY
;BYTE REGISTERS ARE ON PAGE 0!
;----------------------------------------------------------------

```
0FA9 B781    .BXDA:  STA     MTA1                ;SAVE INDEX TO RCVNG BCD REGISTER
0FAB BF82            STX     MTA2                ; AND TO INCOMING BINARY REGISTER
0FAD BE81            LDX     MTA1
0FAF CD0DAB          JSR     .XCLR               ;CLEAR THE RCVNG BCD REG
0FB2 BE92            LDX     MTA2
0FB4 F6              LDA     ,X                  ;CHECK BINARY INPUT FOR ZERO...
0FB5 EA01            ORA     1,X
0FB7 2601            BNE     BXA4
0FB9 81              RTS                         ;CAN QUIT NOW IF ALL ZERO.
0FBA F6      BXA4:   LDA     ,X                  ;ELSE MAKE COPY OF BINARY...
0FBB B78E            STA     BDT
0FBD E601            LDA     1,X
0FBF B78F            STA     BDT+1
0FC1 AE50            LDX     #BTAT0-PAGE1
0FC3 CD0DAB          JSR     .XCLR               ;SEED THE BTAT0 REGISTER
0FC6 AE50            LDX     #BTAT0-PAGE1
0FC8 CD0DB9          JSR     .XINC                ;WITH "1"
0FCB AE0F            LDX     #15                 ;PREP TO LOOP 16 TIMES
0FCD BF82            STX     MTA2
0FCF 348E    BXA2:   LSR     BDT
0FD1 368F            ROR     BDT+1               ;CHECK LSD OF BINARY VALUE
0FD3 2407            BCC     BXA3                ;SKIP AHEAD IF THIS DIGIT NOT ON
0FD5 BE81            LDX     MTA1                ; ELSE ADJUST DECIMAL RESULT
0FD7 A650            LDA     #BTAT0-PAGE1
0FD9 CD0E33          JSR     .XADDA
0FDC AE50    BXA3:   LDX     #BTAT0-PAGE1
0FDE A658            LDA     #BTAT1-PAGE1
0FE0 CD0D65          JSR     .XCPYA
0FE3 AE50            LDX     #BTAT0-PAGE1
0FE5 A658            LDA     #BTAT1-PAGE1
0FE7 CD0E33          JSR     .XADDA              ;DOUBLES BTAT1 VALUE
0FEA 3A82            DEC     MTA2                ;DONE 16 TIMES?
0FEC 2AE1            BPL     BXA2                ;AGN IF NOT
0FEE 81              RTS                         ;ELSE ALL DONE.
```

;----------------------------------------------------------------
;THIS IS THE INVERSE OF ABOVE. IT CONVERTS AND TRANSFERS THE CONTENTS
;OF A 8-DIGIT BCD REGISTER PER X INTO A 2-BYTE BINARY REGISTER PER A.
;USES BDT BINARY TEMP. RETURN Z SET IF VALUE IS ZERO. NO ERROR CHECKING
;ASSUME BCD# <5536! DO NOT DESTROY ORIGINAL BCD VALUE.
;ALL BINARY REGISTERS ARE ON PAGE 0.
;----------------------------------------------------------------

```
0FEF B781    .DXBA:  STA     MTA1                ;SAVE the binary index...
0FF1 BF84            STX     MTX1                ; AND THE BCD INDEX...
0FF3 BE81            LDX     MTA1
0FF5 7F              CLR     ,Y                  ;CLEAR RCVNG BINARY
0FF6 6F01            CLR     1,Y
0FF8 BE84            LDX     MTX1
0FFA CD0D9B          JSR     .XCHK0              ;SEE IF INCOMING = 0
0FFD 2601            BNE     DXA1
0FFF 81              RTS                         ;IS ZERO, CAN QUIT NOW
1000 BE84    DXA1:   LDX     MTX1
1002 A650            LDA     #BTAT0-PAGE1
1004 CD0D65          JSR     .XCPYA              ;ELSE COPY BCD INTO TEMP...
1007 AE50            LDX     #BTAT0-PAGE1
1009 BF84            STX     MTX1                ;SAVE THE WORKING BCD INDEX...
100B 3F8E            CLR     BDT                 ;SEED TEMP WITH 1
100D A601            LDA     #1
100F B78F            STA     BDT+1
1011 CD103B          JSR     DBSUB               ;ADD 1'S DIGIT TO RESULT
1014 A60A            LDA     #10                 ;SEED TEMP WITH 10
1016 B78F            STA     BDT+1
1018 CD103B          JSR     DBSUB               ;ADD 10'S DIGIT TO RESULT
101B A664            LDA     #100                ;SEED TEMP WITH 100
101D B78F            STA     BDT+1
```

```
101F CD103B          JSR     DBSUB           ;ADD 100'S DIGIT TO RESULT
1022 A603            LDA     #HIGH 1000
1024 B78E            STA     BDT
1026 A6E8            LDA     #LOW 1000       ;SEED TEMP WITH 1000
1028 B78F            STA     BDT+1
102A CD103B          JSR     DBSUB           ;ADD 1000'S DIGIT TO RESULT
102D A627            LDA     #HIGH 10000
102F B78E            STA     BDT
1031 A610            LDA     #LOW 10000      ;SEED TEMP WITH 10000
1033 B78F            STA     BDT+1
1035 CD103B          JSR     DBSUB           ;ADD 10000'S DIGIT TO RESULT
1038 A601            LDA     #1              ;SO NOT RETURN Z
103A 81              RTS                     ;AND DONE.
                ;THIS SUB-SUBROUTINE USED ONLY BY DXBA: (NO ERROR CHECKS)
103B BE84   DBSUB:   LDX     MTX1
103D CD0DF5          JSR     .XSHR           ;LSD FROM BCD TO A
1040 AA00            ORA     #0              ;SEE IF IT'S ZERO
1042 2712            BEQ     DBS3            ;THEN SKIP AHEAD
1044 B782            STA     MTA2            ;ELSE MOVE TO TEMP
1046 BE81            LDX     MTA1            ;GET INDEX TO RCVND REG
1048 E601   DBS2:    LDA     1,X             ;AND ADD BDT TEMP TO IT
104A BB8F            ADD     BDT+1
104C E701            STA     1,X
104E F6              LDA     ,X              ;(BOTH BYTES)
104F B98E            ADC     BDT
1051 F7              STA     ,X
1052 3A82            DEC     MTA2            ;NEED MORE OF THIS DIGIT?
1054 26F2            BNE     DBS2            ;THEN DO AGAIN
1056 81     DBS3:    RTS                     ;AND DONE THIS DIGIT
                ;
                     END                     ;OF INCLUDE
                ;
                ;******************************************
                ;ROUTINES TO GATHER DATA FROM THE KEYPAD...
                ;******************************************
                     INCLUD  C:SCNKYS.INC    ;NUMERIC KEYPAD FUNCTIONS
                ;THIS DOES EVERYTHING NECESSARY TO INPUT NUMERIC DATA FROM THE KEYPAD.
                ;PLACING IT IN RG0 AND DISPLAYING IT IN THE rightMOST POSITIONS OF THE
                ;LOWER LINE OF THE LCD. EXITS WITH CY-CLR FOR OKFINE, CY-SET FOR CANCEL
1057 A607   DGNI:    LDA     #%00000111
1059 B701            STA     PPB
105B AE31            LDX     #49             ;KEY PBLY STILL ON...
105D B600   WNFK:    LDA     PPA             ; WAIT TILL ALL RELEASED
105F A40F            AND     #%00001111
1061 26F4            BNE     DGNI
1063 5A              DECX
1064 2AF7            BPL     WNFK
                ;NOW SCAN THE NUMERIC KEYS:
1066 AE0C   DGN1:    LDX     #12             ;KEY I.D. COUNTER
1068 BFAE            STX     WDGK
106A AE31            LDX     #49             ;DEBOUNCE COUNTER
106C A604            LDA     #%00000100      ;START WITH 9 0 . <
                ;DO THE FOLLOWING FOR EACH ROW OF 4 KEYS:
106E B701   DGN4:    STA     PPB             ;ACTIVATE ROW OF 4 KEYS
1070 3AAE            DEC     WDGK
1072 070008          BRCLR   3,PPA,DGN5      ;SKIP IF 4 8 < COLUMN INACTIVE
1075 0700EE  DGN8:   BRCLR   3,PPA,DGN1      ;FOUND 4 8 < COLUMN ACTIVE. DBNCE IT.
1078 5A              DECX
1079 2AFA            BPL     DGN8
107B 202E            BRA     .DKDN           ;GOT SOLID HIT. DO ACTION.
107D 3AAE   DGN5:    DEC     WDGK
107F 050008          BRCLR   2,PPA,DGN6      ;SKIP IF 3 7 . COLUMN INACTIVE
1082 0500E1  DGN9:   BRCLR   2,PPA,DGN1      ;FOUND 3 7 . COLUMN ACTIVE. DBNCE IT.
1085 5A              DECX
1086 2AFA            BPL     DGN9
1088 2021            BRA     .DKDN           ;GOT SOLID HIT. DO ACTION.
108A 3AAE   DGN6:    DEC     WDGK
108C 030008          BRCLR   1,PPA,DGN7      ;SKIP IF 2 6 0 COLUMN INACTIVE
108F 030004  DGNA:   BRCLR   1,PPA,DGN1      ;FOUND 2 6 0 COLUMN ACTIVE. DBNCE IT.
1092 5A              DECX
1093 2AFA            BPL     DGNA
1095 2014            BRA     .DKDN           ;GOT SOLID HIT. DO ACTION.
1097 3AAE   DGN7:    DEC     WDGK
1099 010008          BRCLR   0,PPA,DGNB      ;SKIP IF 1 5 9 COLUMN INACTIVE
109C 010007  DGNC:   BRCLR   0,PPA,DGN1      ;FOUND 1 5 9 COLUMN ACTIVE. DBNCE IT.
109F 5A              DECX
10A0 2AFA            BPL     DGNC
10A2 2007            BRA     .DKDN           ;GOT SOLID HIT. DO ACTION.
10A4 3DAE   DGNB:    TST     WDGK            ;SEE IF TIME TO RESTART SCAN
```

```
10A6 27BE              BEQ     DGN1            ;THEN REDO FROM
10A8 44                LSRA
10A9 20CC              BRA     DGN4            ;ELSE CONTINUE SCAN NEXT ROW
       ;
       ;THIS IS USED ONLY BY THE ABOVE ROUTINE. AFTER A VALID KEYPRESS.
       ;WAIT LONG ENUFF TO REGISTER AN INTERRUPT IN CASE WAS FKEY...
10AB AE14     .DKDN:   LDX     #20
10AD 3FA9     DKD50:   CLR     GPT0
10AF 0EA709   DKD51:   BRSET   7,FKF,DKD8      ;GOT INTERRUPT. WAS FKEY
10B2 3AA9              DEC     GPT0            ;ELSE DELAY SOME MORE
10B4 26F9              BNE     DKD51
10B6 5A                DECX                    ;MAKES ABOUT 50MSEC TOTAL
10B7 26F4              BNE     DKD50           ;IF NO INTERRUPT
10B9 206A              BRA     DKD7            ;THEN WAS NKEY
       ;
       ;KEYPRESS WAS A FUNCTION KEY. FIND WHICH ONE...
       ;
10BB 3FA7     DKD8:    CLR     FKF             ;WAS FKEY. RESET FLAG
10BD 01A63E            BRCLR   0,FKEYS,DKD5    ;TEST FOR ENTER
       ;KEYPRESS WAS ENTER. IF DECIMAL WAS NOT ALLOWED, EXIT NOW.
       ;IF DECIMAL WAS ALLOWED. NORMALIZE TO E-3 AND EXIT...
       ;NEVER ACCEPT ZERO AS A VALID ENTRY...
10C0 0EBA17   DKDZ:    BRSET   7,IDPP,DKDV     ;SKIP IF DP NOT ALLOWED
10C3 06BA02            BRSET   3,IDPP,DKDG     ; ELSE NORMALIZE
10C6 3CBA              INC     IDPP
10C8 B6BA     DKDG:    LDA     IDPP
10CA A40F              AND     #$F
10CC B78B              STA     IDF1            ;SAVE INITIAL DP POSTN
10CE B6BA     DKDW:    LDA     IDPP
10D0 A40F              AND     #$F
10D2 B7BA              STA     IDPP
10D4 A105              CMP     #5              ;IDEAL DP POSITION FOR E-3
10D6 2508              BLO     DKDX
10D8 221B              BHI     DKDY
10DA AE08     DKDV:    LDX     #RG0-PAGE1      ;ALL EXIT THRU HERE
10DC CD0D9B            JSR     .XCHK0          ;DONT ALLOW ZERO ENTRY
10DF 2720              BEQ     .DGNTR          ; (JUST MAKE START ENTRY AGN)
10E1 98                CLC                     ;ELSE = OK
10E2 81                RTS
10E3 AE08     DKDX:    LDX     #RG0-PAGE1
10E5 CD0DF5            JSR     .XSHR           ;TOO MANY PLACES RIGHT...
10E8 A105              CMP     #5              ;ADJUST WITH ROUNDOFF...
10EA 2505              BLO     OGLE
10EC AE08              LDX     #RG0-PAGE1
10EE CD0DB9            JSR     .XINC
10F1 3CBA     OGLE:    INC     IDPP            ;...TILL OK
10F3 20D9              BRA     DKDW
10F5 AE08     DKDY:    LDX     #RG0-PAGE1
10F7 CD0DD6            JSR     .XSHL           ;TOO MANY PLACES LEFT...
10FA 3ABA              DEC     IDPP            ;ADJUST TILL OK
10FC 20D0              BRA     DKDW
       ;
10FE 03A61F   DKD5:    BRCLR   1,FKEYS,DKD6    ;TEST FOR CLEAR
       ;KEYPRESS WAS CLEAR. START FRESH WITH RG0...
       ;(THIS IS ALSO THE ENTRY POINT FOR THE WHOLE ROUTINE.)
1101 AE08     .DGNTR:  LDX     #RG0-PAGE1      ;WAS CLEAR.
1103 CD0DAB            JSR     .XCLR           ;CLR THE RG0 VALUE
1106 A604     .DGNOV   LDA     #%00000100      ;PREPARE THE LCD...
1108 CD11E3            JSR     .WDCTL          ;SET DSP DEC NTRY MODE
110B A60D              LDA     #%00001101
110D CD11E3            JSR     .WDCTL          ;TURN ON BLINK
1110 A6E7              LDA     #$C0+39
1112 CD11E3            JSR     .WDCTL          ;SET CP 40TH POS BTM LINE
1115 B6BA              LDA     IDPP
1117 A480              AND     #$80
1119 AA08              ORA     #8
111B B7BA              STA     IDPP            ;INIT DP-POSITION STUFF
111D CD115F            JSR     .DGDSP          ;FINALLY DSPLY RG0
1120 3FA7     DKD6:    CLR     FKF
1122 CC1057            JMP     DGNI            ;AND CONTINUE
       ;
       ;
       ;KEYPRESS WAS ONE OF THE NON-FUNCTION KEYS...
1125 B6AE     DKD7:    LDA     WDGK            ;RETRV KEYCODE
1127 A10A              CMP     #10             ;WAS DECIMAL OR BACKSPACE?
1129 2518              BLO     DKD2            ;SKIP AHEAD IF WAS DIGIT
112B 220A              BHI     DKD1            ;SKIP AHEAD IF WAS BACKSPACE
       ;
       ;KEYPRESS WAS DECIMAL POINT...
112D 0EBA2C            BRSET   7,IDPP,DKDS     ;DP MAY NOT BE ALLOWED AT ALL
```

```
1130 07BA29            BRCLR   3,IDPP,DKDS     ;ELSE ONLY 1 DP ALLOWED
1133 3ABA              DEC     IDPP            ;ELSE PUT A DP HERE
1135 2022              BRA     DKDR            ;DISPLAY AND DONE
;
;       KEYPRESS WAS BACKSPACE...
1137 AE08      DKD1:   LDX     #RG0-PAGE1
1139 CD0DF5            JSR     .XSHR           ;DROP THE LSD OF RG0
113C 06BA1A            BRSET   3,IDPP,DKDR     ;TEST FOR DP...
113F 3CBA              INC     IDPP            ; IS DP, MOVE IT RIGHT...
1141 2016              BRA     DKDR            ;DISPLAY AND DONE.
;
;       KEYPRESS WAS NUMBER 0-9. PUT IT INTO RG0...
1143 06BA08    DKD2:   BRSET   3,IDPP,DKD3     ;TEST FOR DP...
1146 3ABA              DEC     IDPP            ; IS DP, MOVE IT LEFT...
1148 2A04              BPL     DKD3
114A 3CBA              INC     IDPP            ; BUT DONT ALLOW PAST 0
114C 200E              BRA     DKDS
114E 4C        DKD3:   INCA                    ;MUST XLATE KEY CUZ FUNNY MATRIX...
114F A10A              CMP     #10
1151 2501              BLO     DKD0
1153 4F                CLRA
1154 AE08      DKD0:   LDX     #RG0-PAGE1
1156 CD0DD7            JSR     .XROL           ;MOVE DIGIT INTO LSD OF RG0
1159 CD115F    DKDR:   JSR     .DGDSP          ;DISPLAY FROM RG0
115C CC1087    DKDS:   JMP     DGNI            ;AND GET ANOTHER KEY
;
;THIS IS USED ONLY BY THE ABOVE ROUTINES. IT DISPLAYS THE NUMBER FROM
;RG0 IN THE LOWER DISPLAY LINE. HANDLE LEAD-ZERO BLANKING.
;CURSOR IS ALRDY IN POSITION RIGHT OF LAST DIGIT...
115F A67F     .DGDSP:  LDA     #$7F
1161 CD11EF            JSR     .WDDAT          ;PUT A "<"
1164 AE08              LDX     #RG0-PAGE1
1166 5F                CLRX
1167 D60109    DGD2:   LDA     RG0,X           ;LEAD-ZERO BLANK SCAN
116A 260D              BNE     DGD5            ;STOP BLANKING NON-ZERO DGT
116C A307              CPX     #7
116E 2709              BEQ     DGD5            ;STOP BLANKING LSD DGT
1170 B3BA              CPX     IDPP
1172 2602              BNE     DGD1
1174 2003              BRA     DGD5            ;STOP BLANKING DP DGT
1176 5C        DGD1:   INCX
1177 20EE              BRA     DGD2
1179 BFA9      DGD5:   STX     GPT0
117B AE07              LDX     #7
117D B3BA      DGD6:   CPX     IDPP            ;TIME FOR DP?
117F 2605              BNE     DGD3
1181 A62E              LDA     #'.'            ;YES. PUT IT.
1183 CD11EF            JSR     .WDDAT
1186 D60108    DGD3:   LDA     RG0,X           ;NOW PUT DIGIT
1189 AA30              ORA     #'0'
118B CD11EF            JSR     .WDDAT
118E 5A                DECX
118F 2B04              BMI     DGDD            ;IN CASE ALL 8 SHOWN
1191 B3A9              CPX     GPT0            ;DSPLY DGTS UNBLANKED
1193 24EE              BHS     DGD6
1195 5C        DGDD:   INCX                    ;CUZ MIGHT BE DP
1196 A620      DGDX:   LDA     #' '            ;FILL TO LEFT WITH BLANKS
1198 CD11EF            JSR     .WDDAT
119B 5A                DECX
119C 2AF8              BPL     DGDX
119E A6E7              LDA     #$C0+3F
11A0 CD11ED            JSR     .WDCTL          ;SET CR 40TH POS BTM LINE AGAIN
11A3 81                RTS
;
;
                       END                     ;OF INCLUDE
;
;
;*****************************************
;ROUTINES TO DISPLAY DATA ON THE LCD...
;*****************************************
           INCLUD C:SCDISP.INC    ;ROUTINES FOR LCDS
;These supercal routines are responsible for formatting data for
;the dot-matrix display, and transmitting the data to it. THESE FIRST 2
;basic routines MAKE USE OF A TINY SUBROUTINE THAT GETS INSTALLED INTO
;RAM AT INIT. THIS ACTS LIKE AN INDEXED INDIRECT LDA INSTRUCTION...
;
;THIS IS MOVED INTO RAM BY INIT, THEN RUN FROM THERE AS .IILA
11A4 060800    IILA:   LDA     ROMBAS,X
```

```
11A7 81                   RTS

;
                          ;
                          ;EVERYTHING ELSE STAYS IN ROM...
                          ;
                          ;LOCATE A MESSAGE IN ROM...
                          ;ENTER WITH IILA INSTRUCTION ALRDY ADJUSTED TO START OF
                          ;MESSAGE TABLE, VARIABLE MNO ALRDY SET TO MESSAGE # (BASE 0)
                          ;EXIT WITH A=HIGH MBASE, X=LOW MBASE, VARIABLE MLG=LNGTH
11A8 5F         .MLOC:    CLRX                ;COUNT CHARS IN X
11A9 CD0200     MLO0:     JSR    .IILA        ;GET NXT CHAR VIA IILA IN RAM
11AC 2703                 BEQ    MLO1         ;EXIT IF END CODE
11AE 5C                   INCX
11AF 20F8                 BRA    MLO0         ;ELSE KEEP LOOKING FOR END CODE
11B1 3AB3       MLO1:     DEC    MNO          ;OUR MESSAGE?
11B3 2B11                 BMI    MLO2         ; THEN EXIT
11B5 5C                   INCX                ;ELSE SCAN NEXT MESSAGE
11B6 9F                   TXA
11B7 CB0202               ADD    .IILA+2      ;AFTER ADJUST MESSAGE BASE
11BA C70202               STA    .IILA+2
11BD 4F                   CLRA
11BE C90201               ADC    .IILA+1
11C1 C70201               STA    .IILA+1
11C4 20E2                 BRA    .MLOC
11C6 BFB5       MLO2:     STX    MLG          ;STORE MESSAGE LENGTH
11C8 C60201               LDA    .IILA+1      ;MAKE A=HIGH MBASE
11CB CE0202               LDX    .IILA+2      ; AND X=LOW MBASE
11CE 81                   RTS                 ;AND DONE.

;DISPLAY CHARACTERS FROM ROM TO LCD...
                          ;ENTER WITH "CURSOR" POSITION ALRDY SET AT END CHAR. ADDRESS IN
                          ;.IILA INSTRUCTION ALREADY ADJUSTED TO FIRST CHAR OF MSG.
                          ;X=MSG LNG-1 (I.E. X POINTS TO END CHAR IN MSG)
                          ;THIS WRITES FROM RIGHT TO LEFT... CHARS IN REV ORDER...
11CF A604       .XMSG:    LDA    #%00000100
11D1 CD11E3               JSR    .WDCTL       ;SET TO DEC CP
11D4 A60C                 LDA    #%00001100
11D6 CD11E3               JSR    .WDCTL       ;TURN CURSOR OFF
11D9 CD0200     XMS0:     JSR    .IILA        ;GET ROM DATA BYTE
11DC CD11EF               JSR    .WDDAT       ;DISPLAY A CHARACTER
11DF 5A                   DECX
11E0 2AF7                 BPL    XMS0         ;CONTINUE FOR ALL LC CHARS
11E2 81                   RTS

;
                          ;
                          ;THESE ARE ELEMENTARY 1-CHARACTER DISP ROUTINES. .WDCTL WAITS FOR
                          ;NOT BUSY. THEN SENDS A CONTROL BYTE FROM A. DCTL DOES THIS IMMED.
11E3 CD11FB     .WDCTL:   JSR    .WDNB        ;WAIT FOR NOT BUSY VIA SUBR
11E6 B701       DCTL:     STA    PPB          ;PUT DATA ON PPB LINES
11E8 1900                 BCLR   4,PPA        ;RS LOW FOR CTRLS
11EA 1A00                 BSET   5,PPA        ;PULSE THE ENABLE LINE
11EC 1B00                 BCLR   5,PPA
11EE 81                   RTS

;
                          ;.WDDAT WAITS FOR NOT BUSY. THEN SENDS A DATA BYTE FROM A.
                          ;DDAT DOES THIS IMMEDIATELY.
11EF CD11FB     .WDDAT:   JSR    .WDNB        ;WAIT FOR NOT BUSY VIA SUBR
11F2 B701       DDAT:     STA    PPB          ;PUT DATA ON PPB LINES
11F4 1800                 BSET   4,PPA        ;RS HIGH FOR DATA
11F6 1A00                 BSET   5,PPA        ;PULSE ENABLE LINE
11F8 1B00                 BCLR   5,PPA
11FA 81                   RTS

;
                          ;THIS IS USED BY BOTH ABOVE. IT WAITS UNTIL THE LCD IS NOT BUSY
11FB B750       .WDNB:    STA    LXT0         ;SAVE A REGISTER
11FD 3F05                 CLR    DDRB         ;MUST MAKE PPB INPUTS
11FF 1900                 BCLR   4,PPA        ;WILL READ CTRL REGISTER
1201 1C00                 BSET   6,PPA        ;R/W HIGH TO READ FROM LCD
1203 1A00       WNB0:     BSET   5,PPA        ;SET ENABLE HIGH
1205 B601                 LDA    PPB          ;GET THE LCD DATA
1207 1B00                 BCLR   5,PPA        ;DEENABLE
1209 4D                   TSTA
120A 2BF7                 BMI    WNB0         ;BUSY AS LONG AS B7=1
120C 1D00                 BCLR   6,PPA        ;R/W LOW TO WRITE AGAIN
120E 3A05                 DEC    DDRB         ;PPB REVERTS TO OUTPUTS
1210 B650                 LDA    LXT0         ;RESTORE A
1212 81                   RTS                 ;READY TO XMIT

;
                          ;
```

```
                ;THIS JUST CLEARS THE UPPER MESSAGE LINE TO ALL BLANK
1213 A680       UCLR:   LDA     #$80
1215 2002               BRA     XDC0                    ;GOTO COMMON ROUTINE
                ;THIS CLEARS THE LOWER LINE DITTO...
1217 A6C0       LCLR:   LDA     #$C0
                ;COMMON EXIT FOR BOTH ABOVE...
1219 CD11E3     XDC0:   JSR     .WDCTL                  ;SET SURSOR BEGIN LINE
121C A606               LDA     #%00000110
121E CD11E3             JSR     .WDCTL                  ;SET CP MOVE RIGHT
1221 A60C               LDA     #%00001100
1223 CD11E3             JSR     .WDCTL                  ;TURN CURSOR OFF
1226 A620               LDA     #' '                    ;BLANK CHAR
1228 AE27               LDX     #LLM1                   ;LINE-LNGTH - 1
122A CD11EF     XDC1:   JSR     .WDDAT                  ;STORE THE CHARACTER
122D 5A                 DECX
122E 2AFA               BPL     XDC1                    ;CONTINUE WHOLE LINE
1230 81                 RTS                             ;THEN DONE.
                ;
                ;THIS ROUTINE DISPLAYS ONE OF THE GENERIC MESSAGES CENTERED ON THE
                ;UPPER DISPLAY LINE. ENTER WITH A = MESSAGE #.
1231 B7B3       .DGM:   STA     MNO                     ;STORE MSG NO.
1233 A608               LDA     #HIGH .ULM              ;MESSAGE-TABLE BASE
1235 AE3C               LDX     #LOW .ULM
1237 2008               BRA     DUX                     ;GOTO COMMON EXIT
                ;LIKE ABOVE, BUT DISPLAYS ONE OF THE FLUID/model# MESSAGES PER FLTP
1239 B6A8       .DFT:   LDA     FLTP
123B B7B3               STA     MNO
123D A60B               LDA     #HIGH .FTM
123F AE13               LDX     #LOW .FTM
                ;COMMON EXIT FOR BOTH ABOVE... CENTERS & DSPLYS MESSAGE
1241 C70201     DUX:    STA     .IILA+1                 ;ADJUST ADDR IN RAM ROUTINE
1244 CF0202             STX     .IILA+2
1247 CD11A8             JSR     .MLOC                   ;LOCATE THE MESSAGE IN TABLE
124A C70201             STA     .IILA+1                 ;PUT MSG BASE IN DSP ROUTINE
124D CF0202             STX     .IILA+2
1250 A693               LDA     #$80+19
1252 87B6               STA     DCP                     ;DCP = CTR TOP LINE
1254 CD1213             JSR     UCLR                    ;CLEAR UPPER LINE
1257 2022               BRA     DXX                     ;GOTO COMMON EXIT
                ;
                ;
                ;SIMILAR TO ABOVE, BUT DISPLAYS ONE OF THE KEY-LABEL MESSAGES ON
                ;THE LOWER LINE. ENTER WITH X=MSG# BASE 0, A=LABEL# BASE 0...
                ;ASSUMES AREA IS ALREADY BLANK.
1259 BFB3       D1KL:   STX     MNO                     ;SAVE MSG#
125B B7B6               STA     DCP
125D 48                 LSLA                            ;MULT LBL# * 10
125E 48                 LSLA
125F 48                 LSLA
1260 BBB6               ADD     DCP
1262 BBB6               ADD     DCP
1264 ABC4               ADD     #$C0+4
1266 B7B6               STA     DCP                     ;DCP = CTR DESIRED LABEL
1268 A60A               LDA     #HIGH .KLM
126A C70201             STA     .IILA+1
126D A6C1               LDA     #LOW .KLM
126F C70202             STA     .IILA+2
1272 CD11A8             JSR     .MLOC                   ;FIND THE MESSAGE
1275 C70201             STA     .IILA+1                 ;PUT MSG BASE IN DSP ROUTINE
1278 CF0202             STX     .IILA+2
                ;COMMON EXIT FOR ABOVE ROUTINES...
127B B6B5       DXX:    LDA     MLG                     ;CALC POS LAST CHAR
127D 44                 LSRA
127E BBB6               ADD     DCP
1280 CD11E3             JSR     .WDCTL                  ;SET "CURSOR" POSITION
1283 BEB5               LDX     MLG                     ;MAKE X=END CHAR OFFSET
1285 5A                 DECX
1286 CC11CF             JMP     .YMSG                   ;AND DISPLAY IT.
                ;
                ;
                ;THIS WILL DISPLAY ALL FOUR OF THE KEY LABELS, INCLUDING ANY
                ;BLANK ONES. ENTER WITH A(HI)=LBL# FOR KEY#1, A(LO)=LBL# FOR KEY#2,
                ;X(HI)=LBL# FOR KEY#3, AND X(LO)=LBL# FOR KEY#4
1289 B7A4       .D4KL:  STA     GBT                     ;SAVE INDEX
128B BFA5               STX     GBT+1
128D CD1217             JSR     LCLR                    ;CLEAR THE LOWER LINE
1290 3FB4               CLR     KLN
1292 4F         D4K0:   CLRA
```

```
1293 AE03            LDX      #3
1295 38A5   D4K1:    LSL      GBT+1
1297 39A4            ROL      GBT
1299 49              ROLA
129A 5A              DECX
129B 2AF8            BPL      D4K1
129D 97              TAX                      ;MAKE X=MSG#
129E B6B4            LDA      KLN             ; AND MAKE A=LBL#
12A0 CD1259          JSR      D1KL            ; AND DSPLY 1 LABEL
12A3 3CB4   D4K2:    INC      KLN             ;NEXT LABEL POS.
12A5 05B4EA          BRCLR    2,KLN,D4K0      ; 4 OF THEM
12A8 81              RTS                      ; AND DONE.
            ;
            ;THIS IS USED ONLY TO DISPLAY THE SIGN-ON MESSAGE...
12A9 A6A7   .DSO:    LDA      #$80+LLM1
12AB CD11E3          JSR      .WDCTL          ;SET CP END TOP LINE
12AE AE27            LDX      #LLM1
12B0 D60D15 DSO1:    LDA      SOU,X
12B3 CD11EF          JSR      .WDDAT          ;WRITE TOP MESSAGE
12B6 5A              DECX
12B7 2AF7            BPL      DSO1
12B9 A6E7            LDA      #$C0+LLM1
12BB CD11E3          JSR      .WDCTL          ;SET CP END BOT LINE
12BE AE27            LDX      #LLM1
12C0 D60D3D DSO2:    LDA      SOL,X
12C3 CD11EF          JSR      .WDDAT          ;WRITE BOTTOM MESSAGE
12C6 5A              DECX
12C7 2AF7            BPL      DSO2
12C9 81              RTS
            ;
            ;
            ;
                     END                      ;OF -INCLUDE
            ;
            ;
            ;***********************************************
            ;ROUTINES TO ACTUALLY GENERATE THE CAL-RUN PULSES...
            ;***********************************************
                     INCLUD   C:SCCRUN.INC    ;ACTUAL PULSE-OUT ROUTINES
            ;THIS DOES EVERYTHING NECESSARY TO DO A PULSE-GEN RUN. THE
            ;COUNT AND RATE VALUES ARE IN CNT1 AND RAT1 BINARY REGISTERS.
12CA A600   .DOCRN:  LDA      #0
12CC AE00            LDX      #0
12CE CD1289          JSR      .D4KL           ;DSPLY BLANK LOWER LINE
            ;FOR PROTO ONLY, PUT COUNT & RATE VALUES ON DISPLAY
12D1 A604            LDA      #%00000100
12D3 CD11E3          JSR      .WDCTL          ;SET DISP TO DECREMENT
12D6 A6E7            LDA      #$C0+39         ;SET CP RIGHT END 2ND ROW
12D8 CD11E3          JSR      .WDCTL
12DB AE92            LDX      #RAT1
12DD A608            LDA      #RG0-PAGE1
12DF CD0FA9          JSR      .BXDA           ;CNVT RAT1 TO BCD IN RG0
12E2 AE02            LDX      #2
12E4 D6012D VV0:     LDA      RG0+5,X
12E7 AA30            ORA      #'0'
12E9 CD11EF          JSR      .WDDAT          ;DSPLY 3 DGTS RAT1 FROM RG0
12EC 5A              DECX
12ED 2AF5            BPL      VV0
12EF A620            LDA      #' '
12F1 CD11EF          JSR      .WDDAT          ;DSPLAY BLANK TO SEPARATE
12F4 AE90            LDX      #CNT1
12F6 A608            LDA      #RG0-PAGE1
12F8 CD0FA9          JSR      .BXDA           ;CNVT CNT1 TO BCD IN RG0
12FB AE04            LDX      #4
12FD D6012B VV1:     LDA      RG0+3,X
1300 AA30            ORA      #'0'
1302 CD11EF          JSR      .WDDAT          ;DSPLY 5 DGTS CNT1 FROM RG0
1305 5A              DECX
1306 2AF5            BPL      VV1
            ;ALL ABOVE FOR PROTO ONLY, NOW MAIN PGM
1308 AE92            LDX      #RAT1
130A A608            LDA      #RG0-PAGE1
130C CD0FA9          JSR      .BXDA           ;CNVT RAT1 TO BCD IN RG0
130F AE10            LDX      #RG1-PAGE1
1311 CD0DAB          JSR      .XCLR
1314 A605            LDA      #5
1316 C70110          STA      RG1             ;MAKES RG1=50000000
1319 AE10            LDX      #RG1-PAGE1
131B A608            LDA      #RG0-PAGE1
```

```
131D CD0F0F        JSR    .XDIVA           ;MAKES RG1=50000000/RAT1
1320 AE1C          LDX    #BTICK-ROMBAS
1322 A608          LDA    #RG0-PAGE1       ;MAKES RG0=00000447
1324 CD0D80        JSR    .XROMA           ; FOR (TICK, SEC E-7) @ /32
1327 AE10          LDX    #RG1-PAGE1
1329 A608          LDA    #RG0-PAGE1
132B CD0F0F        JSR    .XDIVA           ;MAKES RG1=CLOCK COUNT E1
132E AE10          LDX    #RG1-PAGE1
1330 CD0DF5        JSR    .XSHR            ;MAKES RG1=CLOCK COUNT
1333 A105          CMP    #5               ;SEE IF ROUNDUP NEEDED
1335 2505          BLO    DOC1
1337 AE10          LDX    #RG1-PAGE1
1339 CD0DB7        JSR    .XINC            ;THEN DO IT
133C AE10  DOC1:   LDX    #RG1-PAGE1
133E A6A4          LDA    #GBT             ;CNVT BACK TO BINARY
1340 CD0FEF        JSR    .DXBA            ; IN GBT TEMP
1343 A60D          LDA    #TC32            ;TRY TO USE /32 CLOCK
1345 3DA4          TST    GBT              ; IF COUNT ONLY 1 BYTE
1347 2718          BEQ    DOC2
1349 A60E          LDA    #TC64            ;ELSE TRY TO USE /64
134B 34A4          LSR    GBT              ;AND HALF THE COUNT
134D 36A5          ROR    GBT+1
134F 3DA4          TST    GBT              ; IF COUNT ONLY 1 BYTE
1351 270E          BEQ    DOC2
1353 A60F          LDA    #TC128           ;ELSE MUST USE /128
1355 34A4          LSR    GBT              ;AND HALF THE COUNT
1357 36A5          ROR    GBT+1
1359 3DA4          TST    GBT              ;IN CASE STILL TOO BIG
135B 2704          BEQ    DOC2
135D AEFF          LDX    #$FF             ;THEN FORCE TO 255 COUNTDOWN
135F BFA5          STX    GBT+1
1361 B7B8  DOC2:   STA    TCTL
1363 B6A5          LDA    GBT+1
1365 B7B9          STA    TDAT             ;PUT IN TIMER PRIVATE REG.
;BINARY REGISTER TDAT NOW HAS THE REQUIRED COUNT TO PUT INTO THE
;TIMER COUNTDOWN REGISTER TO PRODUCE AN INTERRUPT AT HALF THE REQUIRED
;PERIOD. BINARY REGISTER PAIR CNT1 HAS THE REQUIRED PULSE COUNT.
;THE FOLLOWING CALCULATES THE NUMBER OF SYMBOLS NEEDED FOR THE ACTIVITY
;INDICATOR, DISPLAYS IT, AND PREPARES TO DECREMENT IT...
1367 3FB7          CLR    AICNT            ;CLEAR COUNTER TEMP
1369 AE90          LDX    #CNT1
136B A6A0          LDA    #AITMP
136D CD1418        JSR    .WCPY            ;MAKE COPY OF CNT1 TO USE
1370 A60F          LDA    #%00001111
1372 B7A2          STA    AIMSK
1374 A6FF          LDA    #%11111111
1376 B7A3          STA    AIMSK+1          ;SEED AIMSK TO 0000111111111111
1378 AE03          LDX    #3
137A 38A1  IAI1:   LSL    AITMP+1          ;FIND 4 HI BITS CNT1, PUT THEM
137C 39A0          ROL    AITMP            ; INTO 4 LO BITS OF AICNT
137E 2506          BCS    IAI8
1380 34A2          LSR    AIMSK            ;SHIFT MASK AT SAME TIME TO
1382 36A3          ROR    AIMSK+1          ; MATCH 4 MSBS OF AICNT
1384 20F4          BRA    IAI1
1386 39B7  IAI8:   ROL    AICNT            ;FINISH SHFTNG 4 MSBS INTO AICNT
1388 5A    IAI3:   DECX
1389 2B08          BMI    IAI2
138B 38A1          LSL    AITMP+1
138D 39A0          ROL    AITMP
138F 39B7          ROL    AICNT
1391 20F5          BRA    IAI3
;AICNT NOW HAS # OF STARS TO PUT ON DISPLAY. SHOW THEM.
1393 CD1487 IAI2:  JSR    .SETAI           ;SET UP THE STARS
;THE FOLLOWING CODE ACTUALLY GENERATES THE OUTPUT PULSE STREAM.
1396 CD1581        JSR    .TSTT            ;INIT & START TIMER VIA SUBROUTINE
1399 8F            WAIT                    ;BE SURE FIRST CYCLE IS FULL TIME
139A 1E00  DOC5:   BSET   7,PPA            ;LEADING EDGE TO DRIVE COIL
139C 8F            WAIT                    ;WAIT NOW TIL MID CYCLE
139D 1F00          BCLR   7,PPA            ;TRAILING EDGE TO DRIVE COIL
;SEE IF TIME TO HIT ACTIVITY INDICATOR BY USING MASK ON CNT1...
139F B691          LDA    CNT1+1           ;LO BYTE FIRST
13A1 B4A3          AND    AIMSK+1
13A3 260B          BNE    DOC8             ;NON-ZERO = NOT TIME YET
13A5 B690          LDA    CNT1             ;ELSE MUST LOOK AT HI BYTE TOO
13A7 B4A2          AND    AIMSK
13A9 2605          BNE    DOC8
13AB A62D          LDA    #'-'             ;TIME TO SHOW ACTIVITY. WRITE A
13AD CD11EF        JSR    .WDDAT           ; BLANK TO THE DISPLAY.
13B0 3D91  DOC8:   TST    CNT1+1           ;DECREMENT CNT1 & CHK FOR ZERO
```

```
13B2 2606              BNE     DOC3
13B4 3D90              TST     CNT1
13B6 2707              BEQ     DOC4             ;BOTH BYTES ZERO IF DONE
13B8 3A90              DEC     CNT1             ;DECREMENT HI BYTE
13BA 3A91    DOC3:     DEC     CNT1+1           ;DECREMENT LO BYTE
13BC 8F                WAIT                     ;WAIT NOW TILL FULL CYCLE
13BD 20DB              BRA     DOC5             ;COMPLETES ONE PULSE CYCLE
13BF CD158A  DOC4:     JSR     .TSTP            ;COUNT=0, ALL DONE. DISABLE TIMER
13C2 98                CLC                      ;OK EXIT, MUST RTN WITH C CLR
13C3 81                RTS                      ;AND FINISHED WITH RUN
             ;
             ;
             ;THESE USED TO PREPARE AND DO CALIBRATION OR CHECK RUNS...
13C4 A60D    .RCHK:    LDA     #$D              ;SAY "RNNG CHK STD BY"
13C6 AD16              BSR     RCKX             ;RUN CAL CHK PER CNT1/RAT1
13C8 A60A    RCK1:     LDA     #10
13CA CD15C1            JSR     .ADLY            ;WAIT A SEC
13CD A60E              LDA     #$E
13CF CC143A            JMP     .BLOT            ;GET EDM RDNG...
             ;
13D2 A602    .RCL11:   LDA     #2               ;SAY "RNNG 1 OF 1"
13D4 200E              BRA     RCLX
             ;
13D6 A603    .RCL12:   LDA     #3               ;SAY "RNNG 1 OF 2"
13D8 200A              BRA     RCLX
             ;
13DA A604    .RCL22:   LDA     #4               ;SAY "RNNG 2 OF 2"
13DC 2015              BRA     RNX2
             ;
13DE B7AF    RCKX:     STA     CTXT
13E0 A60C              LDA     #$C              ;SAY "CLR EDM PTCH TTL"
13E2 2004              BRA     RUNX
             ;
13E4 B7AF    RCLX:     STA     CTXT
13E6 A601              LDA     #1               ;DSPLY "PLCE EDM INTO CAL MODE"
             ;
13E9 CD1231  RUNX:     JSR     .DGM             ;MSG# ALRDY IN A
13EB A630              LDA     #$30
13ED AE00              LDX     #0
13EF CD1299            JSR     .D4KL            ; AND "OK "
13F2 CD1403  RNX1:     JSR     .WFKP            ;WAIT FOR OK OR CANCEL
13F5 00A602            BRSET   0.FKEYS,RNX0     ;GOT "OK." RUN THE CAL (S)
13F8 20F8              BRA     RNX1             ;OTHER FKEYS NOT DEFINED HERE.
             ;CORRECT VALUES ALREADY PRESENT IN CNT1 AND RAT1 BINARY WORK REGISTERS
13FA B6AF    RNX0:     LDA     CTXT
13FC CD1231  RNX2:     JSR     .DGM             ;DISPLAY "RNNG X OF X STD BY"
13FF CD12CA            JSR     .DOCRN           ;DO THE RUN VIA A SUBROUTINE
1402 81                RTS                      ;RETURN C CLR IF OK
             ;
             ;
             ;
                       END                      ;OF INCLUDE
             ;
             ;
             ;*******************
             ;"OTHER" ROUTINES...
             ;*******************
                       INCLUD  C:SCMISC.INC     ;MISC SUBROUTINES
             ;these miscellaneous subroutines are for the supercalibrator...
             ;
             ;WAIT FOR A FUNCTION-KEYPRESS & RETURN WITH THE VALUE IN FKEYS
1403                   IF      UDL
1403         .WFKP:    NOP                      ;THIS VERSION FOR UDL TESTING
1403                   TST     FKF
1403                   BPL     .WFKP
1403                   CLR     FKF
1403                   RTS
1403                   ELSE
1403 8E      .WFKP:    STOP                     ;THIS VERSION FOR EPROM
1404 3FA7              CLR     FKF
1406 81                RTS
1407                   ENDIF
             ;
             ;COME HERE AFTER CHANGING THE ROM-FLUID/model #. DO WRAP IF NEEDED.
1407 B6A8    .FTCHK    LDA     FLTP             ;FLUID/MODEL...
1409 2B05              BMI     FTC0             ;CHK FOR UNDERFLOW
140B A118              CMP     #MAXFT           ;CHK FOR OVERFLOW
140D 2206              BHI     FTC1
140F 81                RTS                      ;OK AS IS. DONE.
1410 A618    FTC0:     LDA     #MAXFT           ;WAS UNDERFLOW...
```

```
1412 B7A8              STA     FLTP            ;MAKE MAX TYPE
1414 81                RTS                     ;AND DONE.
1415 3FA8     FTC1:    CLR     FLTP            ;OVERFLOW... MAKE 0
1417 81                RTS                     ;AND DONE.
                ;
                ;A SIMPLE BINARY-WORD COPY ROUTINE. ASSUMES SOURCE AND DEST
                ;ON PG0. ENTER WITH X=SOURCE ADDR, A=DEST ADDR
1418 B7A4     .WCPY:   STA     GBT
141A F6                LDA     ,X
141B B7A5              STA     GBT+1
141D E601              LDA     1,X
141F BEA4              LDX     GBT
1421 E701              STA     1,X
1423 B6A5              LDA     GBT+1
1425 F7                STA     ,X
1426 81                RTS
                ;
                ;THIS TRANSFERS CNT2/RAT2 TO CNT1/RAT1. USED TWEEN CAL RUNS...
1427 AE94     .XFCR:   LDX     #CNT2
1429 A690              LDA     #CNT1
142B ADEB              BSR     .WCPY           ;XFER CNT2 TO CNT1
142D AE96              LDX     #RAT2
142F A692              LDA     #RAT1
1431 20E5              BRA     .WCPY           ;AND RAT2 TO RAT1
                ;
                ;THESE IS USED SEVERAL TIMES FOR DISPLAY FUNCTIONS...
1433 1EBA     .BLAT:   BSET    7,IDPP          ;DISALLOW DP ENTRY
1435 CD1231            JSR     .DGM            ;DSPLY GEN MSG PER A
1438 200A              BRA     BLT0
143A 1FBA     .BLOT:   BCLR    7,IDPP          ;ALLOW DP ENTRY
143C CD1231            JSR     .DGM            ;DSPLY GEN MSG PER A
143F AE08              LDX     #RG0-PAGE1
1441 CD0DAB            JSR     .XCLR           ;ALSO CLEAR FIRST
1444 A69A     BLT0:    LDA     #$9A
1446 AE00              LDX     #0
1448 CD1289            JSR     .D4KL           ;DSPLY "ENTER CLEAR    "
144B CC1106            JMP     .DGNOV          ;ALWAYS GOTO DGT ENTRY SR
                ;
144E A608     .RESHA   LDA     #RG0-PAGE1
1450 CC0FA9            JMP     .BXDA
                ;
                ;THIS IS USED TO XFER COUNT/RATE TO SHADOW REGISTERS...
1453 AE07     .TOSHA:  LDX     #7
1455 E690     TOS1     LDA     CNT1,X
1457 E798              STA     OOC1,X
1459 5A                DECX
145A 2AF9              BPL     TOS1
145C 81                RTS
                ;
                ;THIS IS THE INVERSE OF ABOVE...
145D AE07     .FRSHA:  LDX     #7
145F E698     FRS1     LDA     OOC1,X
1461 E790              STA     CNT1,X
1463 5A                DECX
1464 2AF9              BPL     FRS1
1466 81                RTS
                ;
                ;THIS IS USED TWICE TO MULTIPLY RG0 * 1000...
1467 AE02     .RQE3:   LDX     #2
1469 BFA9              STX     GPT0
146B AE08     RE30:    LDX     #RG0-PAGE1
146D CD0DD6            JSR     .XSHL           ;SHIFT RG0 LFT 3X
1470 3AA9              DEC     GPT0
1472 2AF7              BPL     RE30
1474 81                RTS
                ;
                ;THIS USED TWICE DURING TWEAK DATA-INPUT...
1475 AE2C     .GETCT:  LDX     #DCCT-ROMBAS    ;GET cal-chk pulsecount FROM ROM
1477 A608              LDA     #RG0-PAGE1      ;TO RG0
1479 CC0D80            JMP     .XROMA          ;RG0 NOW HAS cal-chk pulsecount
                ;
                ;THIS USED TWICE DURING TWEAK DATA-INPUT...
147C AE07     .CPYCR:  LDX     #7              ;INIT XFER COUNTER
147E D60824   CCR0:    LDA     TCCK,X          ;GET VAL FROM ROM
1481 E790              STA     CNT1,X          ;AND STORE TO RAM
1483 5A                DECX
1484 2AF8              BPL     CCR0            ;DO THIS 7 MORE TIMES
1486 81                RTS
```

```
                ;THIS SETS UP THE ACTIVITY INDICATOR IN BOTTOM LINE PER # IN AICNT
1487 A606       .SETAI: LDA   #%00000110
1489 CD11E3             JSR   .WDCTL          ;SET DISP TO INCREMENT
148C A6C0               LDA   #%11000000      ;SET BASE LEFT END 2ND ROW
148E CD11E3             JSR   .WDCTL
1491 A6FF               LDA   #$FF            ;"STAR"
1493 CD11EF     SAI0:   JSR   .WDDAT          ;WRITE THE STARS...
1496 3AB7               DEC   AICNT
1498 2AF9               BPL   SAI0
149A A604               LDA   #%00000100
149C CD11E3             JSR   .WDCTL          ;SET TO DECREMENT AGAIN TO ERASE STARS
149F A620               LDA   #'
14A1 CC11EF             JMP   .WDDAT
                ;
                ;THIS DOES THE CORRECTION-FACTOR ADJUSTMENT DURING TWK-AGN PROCESS.
                ;IF (CF1<1 AND CF2<1 AND PERCENT DIF>5) OR (CF1>1 AND CF2>1 AND
                ;PERCENT DIF>5) THEN TO CF2 = CF2 * CF2. ELSE LEAVE ALONE.
                ;ON ENTRY X POINTS TO CF1 E-3, RG0 HAS CF2 E-3, RG6=1E-3
14A4 BFA9       .TWADJ: STX   GPT0            ;SAVE INDEX TO CF1
14A6 AE38               LDX   #RG6-PAGE1      ;INIT RG6 TO 1E-3
14A8 CD0DAB             JSR   .XCLR
14AB A601               LDA   #1
14AD C7013C             STA   RG6+4
14B0 AE08               LDX   #RG0-PAGE1      ;COMPARE CF2-1.000
14B2 A638               LDA   #RG6-PAGE1
14B4 CD0E14             JSR   .XCMPA
14B7 252F               BCS   TAD0
14B9 2603               BNE   TAD2
14BB CC1580             JMP   TADX            ;NO CORRECT IF CF2=1.000
14BE BEA9       TAD2:   LDX   GPT0            ;CF2>1. SEE IF CF1 ALSO.
14C0 A638               LDA   #RG6-PAGE1
14C2 CD0E14             JSR   .XCMPA
14C5 2403               BCC   TAD3
14C7 CC1580             JMP   TADX            ;NO ADJUST IF CF2>1 AND CF1<1
14CA BEA9       TAD3:   LDX   GPT0            ;HAVE CF2>1 AND CF1>1...
14CC A640               LDA   #RG7-PAGE1
14CE CD0D65             JSR   .XCPYA          ;COPY CF1 TO C1DIF (RG7)
14D1 AE40               LDX   #RG7-PAGE1
14D3 A638               LDA   #RG6-PAGE1
14D5 CD0E81             JSR   .XSUBA          ;MAKE C1DIF(RG7)=CF1-1
14D8 AE08               LDX   #RG0-PAGE1
14DA A648               LDA   #RG8-PAGE1
14DC CD0D65             JSR   .XCPYA          ;COPY CF2 TO C2DIF (RG8)
14DF AE48               LDX   #RG8-PAGE1
14E1 A638               LDA   #RG6-PAGE1
14E3 CD0E81             JSR   .XSUBA          ;MAKE C2DIF(RG8)=CF2-1
14E6 2028               BRA   TAD1            ;TO COMMON PROCESSING
14E8 BEA9       TAD0:   LDX   GPT0            ;CF2<1. SEE IF CF1 ALSO
14EA A638               LDA   #RG6-PAGE1
14EC CD0E14             JSR   .XCMPA
14EF 2503               BCS   TAD6
14F1 CC1580             JMP   TADX            ;NO ADJUST IF CF2<1 AND CF1>1
14F4 AE38       TAD6:   LDX   #RG6-PAGE1      ;HAVE CF2<1 AND CF1<1...
14F6 A640               LDA   #RG7-PAGE1
14F8 CD0D65             JSR   .XCPYA          ;MOVE 1.000 TO C1DIF (RG7)
14FB AE40               LDX   #RG7-PAGE1
14FD B6A9               LDA   GPT0
14FF CD0E81             JSR   .XSUBA          ;MAKE C1DIF(RG7)=1.00-CF1
1502 AE38               LDX   #RG6-PAGE1
1504 A648               LDA   #RG8-PAGE1
1506 CD0D65             JSR   .XCPYA          ;MOVE 1.00 TO C2DIF (RG8)
1509 AE48               LDX   #RG8-PAGE1
150B A608               LDA   #RG0-PAGE1
150D CD0E81             JSR   .XSUBA          ;MAKE C2DIF(RG8)=1-CF2
1510 AE40       TAD1:   LDX   #RG7-PAGE1
1512 CD0D9B             JSR   .XCHK0
1515 2605               BNE   TAD7
1517 A601               LDA   #1
1519 C70141             STA   RG7+1           ;ALWAYS CORRECT IF C1DIF(RG7)=0
151C A601       TAD7:   LDA   #1
151E 57A9               STA   GPT0
1520 AE48       TAD4:   LDX   #RG8-PAGE1
1522 CD0DD6             JSR   .XSHL
1525 3AA9               DEC   GPT0
1527 2AF7               BPL   TAD4            ;MAKES C2DIF(E-5) IN RG8
1529 AE48               LDX   #RG8-PAGE1
152B A640               LDA   #RG7-PAGE1
152D CD0F0F             JSR   .XDIVA          ;MAKE PCTDIF(E-2) IN RG8
```

```
1530 A600           LDA     #0
1532 C7013C         STA     RG6+4
1535 A602           LDA     #2
1537 C7013E         STA     RG6+6            ;MAKE RG6=00000020
153A AE48           LDX     #RG8-PAGE1
153C A638           LDA     #RG6-PAGE1
153E CD0E14         JSR     .XCMPA           ;COMPARE PCTDIF(E-2)-00000020
1541 253D           BCS     TADX             ;SKIP ADJUST IF PCTDIF<00000020
1543 AE08           LDX     #RG0-PAGE1       ;DO CF2^2
1545 A640           LDA     #RG7-PAGE1
1547 CD0D65         JSR     .XCPYA           ;COPY CF2 TO RG7
154A AE08           LDX     #RG0-PAGE1
154C A640           LDA     #RG7-PAGE1
154E CD0EC1         JSR     .XMLTA           ;DO CF2(RG0)=CF2*CF2 (SQUARED)
1551 A602           LDA     #2
1553 B7A9           STA     GPT0
1555 AE08   TADS:   LDX     #RG0-PAGE1       ;CORRECT DP AFTER SQUARING
1557 CD0DF5         JSR     .XSHR
155A 3AA9           DEC     GPT0
155C 2AF7           BPL     TADS
155E A604           LDA     #4
1560 C7013E         STA     RG6+6            ;make rg6=00000040
1563 AE48           LDX     #RG8-PAGE1
1565 A638           LDA     #RG6-PAGE1
1567 CD0E14         JSR     .XCMPA           ;COMPARE PCTDIF(E-2)-00000040
156A 2514           BCS     TADX             ;SKIP ADJUST IF PCTDIF<00000040
156C AE08           LDX     #RG0-PAGE1
156E A640           LDA     #RG7-PAGE1
1570 CD0EC1         JSR     .XMLTA           ;DO CF2(RG0)=CF2*CF2 AGAIN (CUBED)
1573 A602           LDA     #2
1575 B7A9           STA     GPT0
1577 AE08   TADC:   LDX     #RG0-PAGE1       ;CORRECT DP AFTER CUBING
1579 CD0DF5         JSR     .XSHR
157C 3AA9           DEC     GPT0
157E 2AF7           BPL     TADC
1580 81     TADX:   RTS                      ;AND DONE
                    ;
                    END                      ;OF INCLUDE
                    ;
                    ;**********************************************
                    ;END OF SUBROUTINES. NEXT ARE INTERRUPT HANDLERS...
                    ;**********************************************
                    INCLUD  C:SCTIME.INC     ;TIMER-INTERRUPT HANDLER(S)
                    ;The timer routines for this program are used during the pulse-train-
                    ;output functions, AND MISC TIMEOUTS. The PRESCALE value will be assumed
                    ;constant, and the COUNT value will be assumed valid in zpg variable
                    ;TDT.
                    ;
                    ;INITIALIZE THE TIMER AND START IT. CLEAR TIMER INT BIT.
                    ;ENABLE TIMER INT, SET FOR INTERNAL CLOCK, RESET PRESCALER AND SET DIV
                    ;RATIO PER TCTL, SET COUNTDOWN PER TDAT. THIS IS A SUBROUTINE, NOT AN
                    ;INTERRUPT HANDLER.
                    ;
1581 B6B8   .TSTT:  LDA     TCTL             ;ASSUME ALRDY HAS CTRL VALUE
1583 B709           STA     TIMCTL           ;SET TCR
1585 B6B9           LDA     TDAT             ;COUNT VALUE FROM VARIABLE
1587 B708           STA     TIMDAT           ;SET COUNT
                    ;(TIMER NOW RUNNING AND ITS INTERRUPT ENABLED)
1589 81             RTS                      ;RTN TO CALLER
                    ;
                    ;
                    ;THIS DISABLES THE TIMER BY SETTING ITS INTERRUPT MASK.
                    ;THIS IS A SUBROUTINE, NOT AN INTERRUPT HANDLER.
                    ;
158A B6B8   .TSTP:  LDA     TCTL             ;SAME VALUE AS ABOVE,
158C AA40           ORA     #%01000000       ; XCPT SET INT MASK
158E B709           STA     TIMCTL           ;DO IT
                    ;(TIMER CANNOT PRODUCE INTERRUPTS ANYMORE)
1590 81             RTS                      ;RTN TO CALLER
                    ;
                    ;
                    ;****************************************************************
                    ;THE SUPERCAL TIMER VECTOR POINTS HERE. COME HERE WHEN TIMER HITS
                    ;ZERO. THIS IS AN INTERRUPT SERVICE ROUTINE ONLY. THE TIMER WILL
                    ;RUN ON THE SYSTEM BUS-CYCLE CLOCK, WHICH WITH A 3.58 MHZ CRYSTAL
                    ;IS ABOUT 1.4 USEC. WILL COME HERE AT SOME MULTIPLE OF THIS AS
                    ;SPECIFIED BY THE COUNTER DATA.
                    ;****************************************************************
```

```
1591 B6B8       .TICK:  LDA     TCTL            ;JUST LIKE STARTING TIMER
1593 B709               STA     TIMCTL          ; OVER AGAIN
1595 B689               LDA     TDAT
1597 B708               STA     TIMDAT          ;MAKES A 25MSEC INT INTERVAL
                       ;(TIMER NOW RUNNING AND ITS INTERRUPT ENABLED)
1599 9A                 CLI                     ;READY TO INTERRUPT PROC AGAIN
159A 80                 RTI
                       ;
                       ;THIS WAITS 15 SECONDS WITH INDICATOR. USED BETWEEN 2-PT CAL RUNS...
159B A612       .W15:   LDA     #$12            ;SAY "TIME DLY... STD BY"
159D CD1231             JSR     .DGM
15A0 A600               LDA     #0              ;AND BLANK BOTTOM LINE
15A2 AE00               LDY     #0
15A4 CD1289             JSR     .D4KL
15A7 A60E               LDA     #14
15A9 B7B7               STA     AICNT
15AB CD1487             JSR     .SETAI          ;SET UP ACTIVITY INDICATOR
15AE A60E               LDA     #14             ;TIME 15 SECS
15B0 B7A9               STA     GPT0
15B2 A60A       W151:   LDA     #10
15B4 CD15C1             JSR     .ADLY           ;IN 1-SEC INCREMENTS
15B7 A62D               LDA     #'-'
15B9 CD11EF             JSR     .WDDAT          ;DEC THE ACTIVITY INDICATOR
15BC 3AA9               DEC     GPT0            ;SEE IF MORE
15BE 2AF2               BPL     W151
15C0 81                 RTS                     ;ELSE DONE
                       ;
                       ;THIS SUBROUTINE WAITS FOR THE # OF tenths of SECONDS IN A...
                       ;I.E. IF NEED 10 SECONDS, ENTER WITH A=100. USES TIMER.
                       ;THIS SETS THE TIMER DIVIDE VARIABLE TO /128.
15C1 B7B1       .ADLY   STA     ADT0            ;SAVE ENTRY VALUE
15C3 A60F               LDA     #TC128          ;SET FOR /128
15C5 B7B8               STA     TCTL
15C7 A638               LDA     #TK10
15C9 B7B9               STA     TDAT            ;WILL RSLT IN 10-MSEC TICK
15CB A609       ADL1:   LDA     #9
15CD B7B2               STA     ADT1            ;10 * 10MSEC = 0.1SEC
15CF CD1581     ADL0:   JSR     .TSTT           ;START THE TIMER
15D2 8F                 WAIT                    ;HERE TILL TICK
15D3 3AB2               DEC     ADT1            ;HAS BEEN 10 MSEC
15D5 2AF8               BPL     ADL0
15D7 3AB1               DEC     ADT0            ;HAS BEEN .1 SEC
15D9 26F0               BNE     ADL1
15DB CD158A             JSR     .TSTF           ;DONE OK. STOP TIMER.
15DE 81                 RTS                     ;AND DONE.
                       ;
                       ;
                        END                     ;OF INCLUDE INCLUD  C:SCIRQ.INC     ;EXT IRQ HANDLER(S)
                       ;*******************************************
                       ;COME HERE IF EXTERNAL SUPERCAL INTERRUPT (EXTIV HERE)
                       ;*******************************************
                       ;on supercalibrator external interrupt is caused by one of the
                       ;four function keys being pressed. This has already been debounced.
                       ;so all needed is to read PA, clear the 4 highest bits (not involved
                       ;with the keys), and store this in a database variable.
15DF B600       .DOEXT: LDA     PPA             ;READ ALL INPUT BITS AT ONCE
15E1 A40F               AND     #%00001111      ;DON'T CARE ABOUT B4-B7
15E3 B7A6               STA     FKEYS           ;PUT IN VARIABLE & DONE
15E5 1EA7               BSET    7,FKF           ;ALSO SET A FLAG
15E7 80                 RTI
                        END                     ;OF INCLUDE
                       ;

;*******************************************
                       ;END OF HANDLERS. NEXT PWR-UP/INIT SECTION...
                       ;*******************************************
                       ;(COME HERE AT POWER-UP OR RESET)
                        INCLUD  C:SCINIT.INC    ;PWR-UP/RESET INIT
                       ;THESE ARE THE POWER-UP/RESET OPERATIONS FOR THE GPI SUPERCALIBRATOR
                       ;RESET VECTOR POINTS HERE. THIS CODE INITS EVERYTHING FOR NORMAL OP-
                       ;ERATION.

;PIA PORT FUNCTIONS AS FOLLOWS:
                       ;PA0-PA3 ARE ALWAYS INPUTS FOR THE KEYPAD MATRIX...
                       ;       PA0 = 0, 4, 8, F1
                       ;       PA1 = 1, 5, 9, F2
                       ;       PA2 = 2, 6, ., F3
```

```
                ;        PA3 = 0, 7, <, #4
                ;PA4-PA6 ARE ALWAYS OUTPUTS FOR THE LCD CONTROL LINES...
                ;        PA4 = LCD RS (HI=DATA, LO=CTRL)
                ;        PA5 = LCD ENA (PULSE HI TO STROBE)
                ;        PA6 = LCD R/W (HI=READ FRM LCD, LO=WRITE TO LCD)
                ;PA7 IS ALWAYS AN OUTPUT FOR THE CAL-COIL DRIVE SIGNAL
                ;        PA7 = CAL-COIL DRIVE
                ;
                ;PB0-PB2 ALWAYS OUTPUTS SHARED BY LCD DATA & KEYPAD STROBES...
                ;        PB0 = LCD D0 & KEYPAD STROBE 0, 1, 2, 3
                ;        PB1 = LCD D1 & KEYPAD STROBE 4, 5, 6, 7
                ;        PB2 = LCD D2 & KEYPAD STROBE 8, 9, .. <
                ;PB3-PB7 ALWAYS OUTPUTS FOR REST OF LCD DATA...
                ;        PB3 = LCD D3
                ;        PB4 = LCD D4
                ;        PB5 = LCD D5
                ;        PB6 = LCD D6
                ;        PB7 = LCD D7
                ;
                ;---------------------------------------------
15E8 9B         .PINIT: SEI                      ;NO INTERRUPTS ALLOWED NOW
15E9 A600               LDA    #%00000000
15EB B700               STA    PPA
15ED A6F0               LDA    #%11110000        ;AND SET PFA DATA DIRECTION
15EF B704               STA    DDRA              ;AS HALF IN, HALF OUT
15F1 A600               LDA    #%00000000        ;SET ALL OF PB LOW
15F3 B701               STA    PFB
15F5 A6FF               LDA    #%11111111        ;AND INIT PPB AS OUTPUTS
15F7 B705               STA    DDRB
                ;
                ;INITIALIZE THE TIMER VARIABLES. SET THE TIMER TO INTERRUPT
                ;AFTER 20MSEC, THEN START IT...
                ;(FOR LCD INIT. SPEC SAYS "MORE THAN 15 MSEC")...
15F9 A60F               LDA    #TC128            ;SET UP /128 CTRL VALUE
15FB B7B8               STA    TCTL
15FD A670               LDA    #112              ;COUNTDOWN VAL FOR 20MSEC @ /128
15FF B7B9               STA    TDAT
1601 CD1581             JSR    .TSTT 1604 9A                 CLI                      ;ENABLE MASTER INTERRUPT NOW
                ;
                ;MOVE THE DISPLAY SUBROUTINE INTO RAM. WHERE IT WILL BE RUN...
1605 AE03               LDX    #3                ;MOVE 4 BYTES
1607 D611A4     MOV0:   LDA    IILA,X            ;FROM IILA IN ROM...
160A D70100             STA    .IILA,X           ; TO .IILA IN RAM
160D 5A                 DECX
160E 2AF7               BPL    MOV0
                ;
                ;NOW WAIT FOR THE END OF THE 20MSEC TIME PERIOD, STILL GOING ON.
1610 8F                 WAIT
                ;
                ;SEND THE FIRST INIT COMMAND TO THE LCD...
1611 A638               LDA    #%00111000
1613 CD11E6             JSR    DCTL              ;XMIT IMMEDIATELY
                ;
                ;SET THE TIMER TO INTERRUPT IN 5MSEC. THEN START IT & WAIT
                ;(FOR LCD INIT. SPEC SAYS "MORE THAN 4.1 MSEC)...
1616 A61C               LDA    #28               ;COUNTDOWN VAL FOR 5MSEC @ /128
1618 B7B9               STA    TDAT
161A CD1581             JSR    .TSTT
161D 8F                 WAIT
                ;
                ;SEND THE SECOND INIT COMMAND TO THE LCD...
161E A638               LDA    #%00111000
1620 CD11E6             JSR    DCTL              ;XMIT IMMEDIATELY
                ;
                ;SET THE TIMER TO INTERRUPT IN 200USEC. THEN START IT & WAIT
                ;(FOR LCD INIT. SPEC SAYS "MORE THAN 100 US")...
1623 A601               LDA    #1                ;COUNTDOWN VAL FOR 179USEC @ /128
1625 B7B8               STA    TCTL
1627 CD1581             JSR    .TSTT
162A 8F                 WAIT
                ;
                ;SEND THE THIRD INIT COMMAND TO THE LCD...
162B A638               LDA    #%00111000
162D CD11E6             JSR    DCTL              ;XMIT IMMEDIATELY
                ;
                ;SET THE TIMER TO INTERRUPT IN 200USEC. THEN START IT & WAIT
                ;(FOR LCD INIT. SPEC SAYS "MORE THAN 100 US")...
```

```
1630 A601                LDA     #1              ;COUNTDOWN VAL FOR 179USEC @ /128
1632 B7B8                STA     TCTL
1634 CD1581              JSR     .TSTT
1637 8F                  WAIT
                  ;
                  ;THE LCD IS NOW READY FOR THE REST OF THE INIT COMMANDS. DO THEM...
                  ;(PER THE LCD SPEC)
1638 A638                LDA     #%00111000
163A CD11E6              JSR     .WDCTL          ;FUNCTION-SET IMMEDIATELY
163D A608                LDA     #%00001000
163F CD11E3              JSR     .WDCTL          ;DSP OFF AFTER BUSY
1642 A601                LDA     #%00000001
1644 CD11E3              JSR     .WDCTL          ;CLR DSP AFTER BUSY
1647 A604                LDA     #%00000100
1649 CD11E3              JSR     .WDCTL          ;SET ENTRY MODE DEC, NO SHFT
164C A60C                LDA     #%00001100
164E CD11E3              JSR     .WDCTL          ;DSP ON, NO CURSOR, NO BLINK
                  ;
                  ;THE LCD IS NOW READY TO RECIEVE DATA.
1651 CD158A              JSR     .TSTP           ;DISABLE TIMER INTERRUPT NOW
1654 3FA7                CLR     FKF             ;CLEAR ANY F-KEY REQUESTS
                  ;
                  ;PUT SIGN-ON MESSAGE ON THE DISPLAY & WAIT 5 SEC
                  ;(BUT WATCH FOR FKEY, GO AHEAD IF HIT)
1656 CD12A9              JSR     .DSO            ;SHOW SIGN-ON MSG
1659 A631                LDA     #49             ;DELAY
165B B7A9                STA     GPT0
165D A601        SOD:    LDA     #1              ;DELAY FOR 100 MSEC
165F CD15C1              JSR     .ADLY
1662 3DA7                TST     FKF             ;WATCH FOR FKEYPRESS
1664 2604                BNE     .ST01           ;CUT SHORT IF GOT ANY FKEY
1666 3AA9                DEC     GPT0            ;ELSE KEEP TIMING
1668 2AF3                BPL     SOD             ;FOR 5 SECONDS
                  ;
                  ;
                          END                     ;OF INCLUDE
                  ;
                  ;
                  ;***********************************
                  ;INIT ALL DONE! NOW BEGIN MAIN PROGRAM
                  ;***********************************
                  ;TOP ENTRY POINT. CLEAR THE CNT/RAT VARIABLES & DFLT TO 1-PT CAL
                  ;SAY "SEL CAL PROCEDURE". ASK FOR "NEW" OR "TWEAK."
166A 9C          .ST01:   RSP
166B 3FA7                CLR     FKF             ;CLEAR FKEY FLAG
166D 3FAD                CLR     NPTS            ;1-PT DEFAULT
166F 3FBC                CLR     TAF             ;NEW TWK DEFAULT
1671 AE07                LDX     #7
1673 6F90        ST11:   CLR     CNT1,X          ;CLEAR THE CNT1/RAT1 VARIABLES
1675 5A                  DECX
1676 2AFB                BPL     ST11
1678 A600                LDA     #0
167A CD1231              JSR     .DGM            ;DSPLY "SEL CAL PROC"
167D A612                LDA     #$12
167F AE80                LDX     #$80
1681 CD1289              JSR     .D4KL           ; AND "PACCAL TWK TWKAGN"
                  ;WAIT NOW FOR FUNCTION-KEY PRESS (DON'T COME BACK TILL GOT ONE..
1684 CD1403      ST10:   JSR     .WFKP           ;VIA SUBROUTINE
                  ;GOT FKEY. SEE WHICH...
1687 00A60C              BRSET   0,FKEYS,.NEWP   ;IF NEW CAL...
168A 03A603              BRCLR   1,FKEYS,ST12
168D CC17A3              JMP     .TWKP           ;IF REGULAR TWEAK...
1690 05A6F1      ST12:   BRCLR   2,FKEYS,ST10
1693 CC177C              JMP     .TWKA           ;IF TWK AGAIN...
                  ;COME HERE AFTER GUY HIT F1 AT STEP 1 (I.E. WANTS NEW CALIBRATION.
                  ;SAY fluid/model DESIG AND << SEL >> CNCL...
1696 3FA8        .NEWP:  CLR     FLTP            ;START W/FIRST fluid/model
1698 A645                LDA     #$45
169A AE60                LDX     #$60
169C CD1289              JSR     .D4KL           ;DISPLAY FKEY LEGENDS "< S > "
169F CD1239      NEW0:   JSR     .DFT            ;DISPLAY THE fluid/model DESIG
16A2 CD1403              JSR     .WFKP           ;WAIT FOR FKEYPRESS
16A5 00A608              BRSET   0,FKEYS,.BAKUP  ;WAS F1. PREVIOUS fluid/model.
16A8 02A615              BRSET   1,FKEYS,.SELCT  ;WAS F2. SELECT THIS fluid/model.
16AB 04A60A              BRSET   2,FKEYS,.AHEAD  ;WAS F3. NEXT fluid/model.
16AE 20EF                BRA     NEW0            ;F4 UNDEFINED HERE..
                  ;
```

```
                ;COME HERE IF GUY WANTS PREVIOUS fluid/model...
16B0 3AA8       .BAKUP: DEC     FLTP            ;BACK UP ONE TYPE...
16B2 CD1407             JSR     .FTCHK          ;MAY HAVE TO WRAP AROUND
16B5 CC169F             JMP     NEW0            ;AND REDISPLAY
                ;
                ;COME HERE IF GUY WANTS NEXT fluid/model...
16B8 3CA8       .AHEAD: INC     FLTP            ;ADVANCE ONE TYPE...
16BA CD1407             JSR     .FTCHK          ;MAY HAVE TO WRAP AROUND
16BD CC169F             JMP     NEW0            ;AND REDISPLAY
                ;
                ;COME HERE IF GUY SELECTS DISPLAYED TYPE...
                ;(THIS MEANS PROCEED TO NEXT STEP)
                ;MUST SEE IF WANTS DO NEW fluid/model (FLTP=MAXFT)
16C0 A618       .SELCT: LDA     #MAXFT
16C2 B1A8               CMP     FLTP
16C4                    IF FLUID
16C4                            BEQ     SELNF           ;IF WANTS NEW TYPE
16C4                    ELSE
16C4 2703                       BEQ     SCTP            ;IF WANTS NEW TYPE
16C6                    ENDIF
16C6 CC1732             JMP     SELOF           ;IF WANTS EXISTING TYPE
                ;*** HAS SELECTED NEW fluid/model. MUST GET DATA FROM KEYBOARD. ***
16C9                    IF FLUID
                ;following step deleted from MODEL-# program...
16C9            SELNF:          LDA     #6
16C9                            JSR     .DGM            ;DSPLY "WILL NEED DATA
16C9                            LDA     #$30
16C9                            LDX     #0
16C9                            JSR     .D4KL           ;AND "OK "
16C9            SNF0:           JSR     .WFKP           ;WAIT FOR FKEY
16C9                            BRSET   0,FKEYS,SCTP    ;GOT "OK". NEXT STEP
16C9                            BRA     SNF0            ;OTHER FKEYS UNDEFINED HERE.
16C9                    ENDIF
                ;MAKE CHOOSE 1PT OR 2PT...
16C9 A607       SCTP:   LDA     #7
16CB CD1231             JSR     .DGM            ;DSPLY "SEL CAL TYPE"
16CE A678               LDA     #$78
16D0 AE00               LDX     #0
16D2 CD1289             JSR     .D4KL           ; AND "1PT 2PT  "
16D5 3FAD       STP0:   CLR     NPTS            ;DEFAULT TO 1-POINT
16D7 CD1403             JSR     .WFKP           ;GET A FKEY
16DA 00A607             BRSET   0,FKEYS,NF1P    ;GUY WANTS 1-POINT CAL
16DD 3CAD               INC     NPTS            ;SET TO 2-POINT CAL
16DF 02A602             BRSET   1,FKEYS,NF1P    ;GUY WANTS 2-POINT CAL
16E2 20F1               BRA     STP0            ;OTHER FKEYS UNDEFINED HERE.
                ;FLAG NPTS NOW SET FOR 1PT (=0) OR 2PT (=1)
                ;MUST ENTER FIRST DATA PAIR REGARDLESS WHETHER 1PT OR 2PT...
                ;*** THIS HAS BEEN CHANGED ***
                ;to enter count, rate, count, rate!
16E4 AE98       NF1P:   LDX     #00C1           ;restore shadow for display
16E6 CD144E             JSR     .RESHA
16E9 A608               LDA     #8              ;DSPLY "ENTER COL-A VAL"
16EB CD1433             JSR     .BLAT           ; AND "0 ENTR CLR" & GET NUM
16EE AE08               LDX     #RG0-PAGE1
16F0 A690               LDA     #CNT1
16F2 CD0FEF             JSR     .DXBA           ;CNVT COUNT TO BINARY IN CNT1
16F5 AE9A               LDX     #00R1           ;restore shadow for display
16F7 CD144E             JSR     .RESHA
16FA A609               LDA     #9              ;DSPLY "ENTER COL B VALUE"
16FC CD1433             JSR     .BLAT           ; AND "000 ENTR CLR"
16FF AE08               LDX     #RG0-PAGE1
1701 A692               LDA     #RAT1
1703 CD0FEF             JSR     .DXBA           ;CNVT RATE TO BINARY IN RAT1
                ;NOW IF TO DO 2-PT CAL MUST GET OTHER SET OF VALUES FROM KEYPAD
1706 3DAD               TST     NPTS            ;NON-ZERO MEANS 2-PT
1708 2603               BNE     NF14
170A CC1757             JMP     .RUNCX          ;ONE POINT... GO AHEAD
                ;MUST GET 2ND SET OF VALUES FOR 2-PT CAL...
                ;*** THIS HAS BEEN CHANGED ***
                ;to enter count, rate, count, rate!
170D AE9C       NF14:   LDX     #00C2           ;restore shadow for display
170F CD144E             JSR     .RESHA
1712 A60A               LDA     #$A             ;DSPLY "ENTER COL-C VALUE"
1714 CD1433             JSR     .BLAT           ; AND "000 ENTR CLR"
1717 AE08               LDX     #RG0-PAGE1
1719 A694               LDA     #CNT2
171B CD0FEF             JSR     .DXBA           ;CNVT RATE TO BINARY IN RAT2
171E AE9E               LDX     #00R2           ;restore shadow for display
1720 CD144E             JSR     .RESHA
```

```
1723 A60B              LDA     #$B                     ;DSPLY "ENTER COL-D VALUE"
1725 CD1433            JSR     .BLAT                   ; AND "000 ENTR CLR"
1728 AE08              LDX     #RG0-PAGE1
172A A696              LDA     #RAT2
172C CD0FEF            JSR     .DXBA                   ;CNVT COUNT TO BINARY IN CNT2
172F CC1757            JMP     .RUNCX                  ;RDY TO CALIBRATE
                       ;
                       ;COME HERE IF GUY SELECTS A ROM fluid/model.
                       ;FIRST GET THE COUNT1 AND RATE1 VALUES PER THE VALUE IN FLTP...
                       ;they are stored in ROM as CNT1,RAT1,CN2,RAT2, 2 bytes each.
                       ;transfer all 8 bytes, even tho 2nd pair may be unneeded...
1732 3FAD     SELOF:   CLR     NPTS                    ;DFLT TO 1-PT CAL
1734 BEA8              LDX     FLTP                    ;GET fluid/model NUMBER
1736 58                LSLX
1737 58                LSLX
1738 58                LSLX                            ;MULT *8 TO FORM INDEX
1739 BFAB              STX     NNDX                    ;SAVE THIS FOR LATER USE
173B BFA9              STX     GPT0                    ;WILL MODIFY THIS
173D 3FAA              CLR     GPC0                    ;INIT XFER COUNTER
173F BEA9     RRC0:    LDX     GPT0
1741 D60C55            LDA     .TFND,X                 ;GET VAL FROM ROM
1744 BEAA              LDX     GPC0
1746 E790              STA     CNT1,X                  ;AND STORE TO RAM
1748 3CA9              INC     GPT0
174A 3CAA              INC     GPC0
174C 07AAF0            BRCLR   3,GPC0,RRC0             ;DO THIS 7 MORE TIMES
                       ;SEE IF COUNT2 IS ZERO. IF SO, MEANS 1-POINT CAL THIS TIME
174F B694              LDA     CNT2
1751 BA95              ORA     CNT2+1                  ;2 BYTES
1753 2702              BEQ     .RUNCX
1755 3CAD              INC     NPTS                    ;SET FOR 2-POINT IF NON-0
                       ;
                       ;ALL ABOVE PROCS CONVERGE HERE.
                       ;DATA NOW LOADED INTO CNT/RAT. PREP TO RUN CAL(S)...
                       ;FIRST update the shadow registers...
1757 CD1453   .RUNCX:  JSR     .TOSHA
                       ;THIS IS FOR REPEAT FUNCTION...
175A CD145D   RPT1:    JSR     .FRSHA
                       ;NOW TEST FOR 1-PT OR 2-PT AND ACT ACCORDINGLY
175D 3DAD              TST     NPTS                    ;NON-0 MEANS 2-PT
175F 2609              BNE     RC12
                       ;
                       ;SAYS 1-PT. DO CAL RUN #1 OF 1...
1761 CD13D2            JSR     .RCL11
1764 CD1907            JSR     .ALDON                  ;GOTO COMMON EXIT
1767 CC175A            JMP     RPT1                    ;IF HERE REPEAT THIS
                       ;
                       ;SAYS 2-PT. DO CAL RUN 1 OF 2...
176A CD13D6   RC12:    JSR     .RCL12
176D CD159B            JSR     .W15                    ;WAIT 15 SEC BEFORE 2ND RUN
                       ;NOW PREPARE AND DO 2ND CAL RUN
1770 CD1427            JSR     .XFCR                   ;XFER CNT2,RAT2 TO CNT1,RAT1
1773 CD13DA            JSR     .RCL22                  ;DO CAL RUN 2 OF 2
1776 CD1907            JSR     .ALDON                  ;SUCCESS. GOTO COMMON EXIT.
1779 CC175A            JMP     RPT1                    ;IF HERE REPEAT THIS
                       ;
                       ;THE "TWEAK-AGAIN" COMMAND FROM STEP 1 COMES HERE.
177C 1EBC     .TWKA:   BSET    7,TAF                   ;MARK FLAG FOR TWK-AGN
177E A613              LDA     #$13
1780 CD1231            JSR     .DGM                    ;DSPLY "WILL NEED PREV CFS"
1783 A630              LDA     #$30
1785 AE00              LDX     #0
1787 CD1289            JSR     .D4KL                   ;AND "OK  "
178A CD1403   TWA0:    JSR     .WFKP                   ;WAIT FOR FKEY
178D 01A6FA            BRCLR   0,FKEYS,TWA0            ;MUST BE "OK"
1790 A614              LDA     #$14                    ;SAY "GET PREV LO-FLO CF"
1792 CD143A            JSR     .BLOT
1795 AE08              LDX     #RG0-PAGE1
1797 A628              LDA     #RG4-PAGE1
1799 CD0D65            JSR     .XCPYA                  ;MOVE IT TO RG4
179C A615              LDA     #$15                    ;SAY "GET PREV HI-FLO CF"
179E CD143A            JSR     .BLOT
17A1 AE08              LDX     #RG0-PAGE1
17A3 A630              LDA     #RG5-PAGE1
17A5 CD0D65            JSR     .XCPYA                  ;MOVE IT TO RG5
```

```
                ;NOW PROCEED WITH TWEAK PROCEDURE...
                ;
                ;THE "TWEAK" COMMAND FROM STEP 1 COMES HERE.
17A8 CD147C    .TWKF: JSR    .CPYCR          ;COPY CNT-RAT FROM ROM
17AB CD13C4           JSR    .RCHK           ;RUN THE FIRST CAL CHECK
17AE AE08             LDX    #RG0-PAGE1      ;RG0 NOW HAS LO READING E-3
17B0 A618             LDA    #RG2-PAGE1
17B2 CD0D65           JSR    .XCPYA          ;XFER FIRST READING TO RG2
                ;FIRST OF TWO CAL-CHECK RUNS NOW DONE. EDM READING IN RG2 AS E-3
17B5 CD1427           JSR    .XFCR           ;XFER CNT2, RAT2 TO CNT1, RAT1
17B8 CD13C4           JSR    .RCHK           ;RUN THE 2ND CAL CHECK
17BB AE08             LDX    #RG0-PAGE1
17BD A620             LDA    #RG3-PAGE1      ;XFER 2ND READING TO RG3
17BF CD0D65           JSR    .XCPYA          ;2ND READING NOW IN RG3 AS E-3
                ;SECOND OF TWO CAL-CHECK RUNS NOW DONE. EDM READING IN RG3 AS E-3
                ;*** NEW REV 1.3 ***
                ;IF THE READING HAD NO DP, THEN EDM HAS x100 STRAP. MUST COMPENSATE B
                ;SHIFTING BOTH RG2 AND RG3 RIGHT 2 PLACES.
17C2 B6BB             LDA    IDP3
17C4 A100             CMP    #0
17C6 260C             BNE    Z0
17C8 AE18             LDX    #RG2-PAGE1
17CA CD0DF5           JSR    .XSHR
17CD AE20             LDX    #RG3-PAGE1
17CF CD0DF5           JSR    .XSHR
17D2 2004             BRA    Z1
                ;IF THE READING HAD 1 DIGIT RIGHT OF DP, THEN EDM HAS x10 STRAP. MUST
                ;COMPENSATE BY SHIFTING RG2 AND RG3 RIGHT 1 PLACE.
17D4 A107     Z0:     CMP    #7
17D6 260A             BNE    Z2
17D8 AE18     Z1:     LDX    #RG2-PAGE1
17DA CD0DF5           JSR    .XSHR
17DD AE20             LDX    #RG3-PAGE1
17DF CD0DF5           JSR    .XSHR
                ;CAN NOW DECIDE IF NEED 1 OR 2 CAL RUNS BY COMPARING RG2/RG3.
                ;ALLOW A DIFFERENCE OF +/- 2 IN THE LSD IF OTHERWISE EQUAL.
                ;!!BUT FORCE 2 RUNS IF TAF SET, PER TWK-AGN!!
17E2 A601     Z2:     LDA    #1              ;FORCE 2-PTS IF...
17E4 B7AD            STA    NPTS
17E6 0EBC69           BRSET  7,TAF,TWR1      ;DOING "TWK-AGN"
17E9 3AAD             DEC    NPTS            ;ELSE ASSUME 1-PT FIRST...
17EB AE18             LDX    #RG2-PAGE1
17ED A620             LDA    #RG3-PAGE1
17EF CD0E14           JSR    .XCMPA          ;COMPARE THE 2 READINGS
17F2 275E             BEQ    TWR1            ;GO AHEAD IF 2 READINGS SAME
17F4 250D             BCS    UU0             ;UNEQUAL. MUST SEE HOW MUCH
17F6 AE18             LDX    #RG2-PAGE1      ;RG2 IS BIGGER...
17F8 A608             LDA    #RG0-PAGE1
17FA CD0D65           JSR    .XCPYA          ;COPY 2 TO 0, 3 TO 1
17FD AE20             LDX    #RG3-PAGE1
17FF A610             LDA    #RG1-PAGE1
1801 200B             BRA    UU1
1803 AE20     UU0:    LDX    #RG3-PAGE1      ;RG3 IS BIGGER...
1805 A608             LDA    #RG0-PAGE1
1807 CD0D65           JSR    .XCPYA          ;COPY 3 TO 0, 2 TO 1
180A AE18             LDX    #RG2-PAGE1
180C A610             LDA    #RG1-PAGE1
180E CD0D65   UU1:    JSR    .XCPYA          ;MAKES RG0 BIG, RG1 SMALL
1811 AE07             LDX    #7
1813 D60108   UU2:    LDA    RG0,X
1816 DA0110           ORA    RG1,X
1819 2605             BNE    UU3             ;FIND COMMON LSD OF 2 REGS
                                             ;GO ON WHEN FOUND
181B 5A               DECX
181C 2AF5             BPL    UU2
181E 2032             BRA    TWR1            ;SHLD NEVER BE HERE
1820 BFA9     UU3:    STX    GPT0            ;THIS IS POS OF REAL LSD
1822 B6A9     UU4:    LDA    GPT0            ;SHIFT BOTH RGS RIGHT...
1824 A107             CMP    #7              ; TO GET RID OF 0 LSDS
1826 240E             BHS    UU5
1828 AE08             LDX    #RG0-PAGE1
182A CD0DF5           JSR    .XSHR
182D AE10             LDX    #RG1-PAGE1
182F CD0DF5           JSR    .XSHR
1832 3CA9             INC    GPT0
1834 20EC             BRA    UU4
1836 AE08     UU5:    LDX    #RG0-PAGE1
1838 A610             LDA    #RG1-PAGE1
183A CD0E81           JSR    .XSUBA          ;GET DIFF RG0-RG1->RG0
183D AE10             LDX    #RG1-PAGE1
```

```
183F CD0DAB         JSR     .XCLR
1842 A603           LDA     #3
1844 C70117         STA     RG1+7           ;MAKES RG1=3
1847 AE08           LDX     #RG0-PAGE1
1849 A610           LDA     #RG1-PAGE1
184B CD0E14         JSR     .XCMPA          ;FINALLY DO RG0 CMP RG1
184E 2502           BCS     TWR1            ;C SET MEANS, DIFF < 3, 1PT
1850 3CAD           INC     NPTS            ;ELSE DIFF >= 3, 2PT
                    ;
                    ;NEED 1-PT CAL FOR SURE.
                    ;CALCULATE CURRENT PULSES/UNIT FACTOR FOR LOW POINT...
1852 CD1475  TWR1:  JSR     .GETCT          ;GET cal-chk pulse ct...
1855 AE08           LDX     #RG0-PAGE1      ;from ROM to RG0 as E-3
1857 A618           LDA     #RG2-PAGE1
1859 CD0F0F         JSR     .XDIVA          ;RG0 NOW HAS cal-chk-ct/READING=PP/UNIT
185C CD1467         JSR     .R0E3           ;SHIFT LFT 3X TO MAKE (PP/UNIT)E-3
185F AE08           LDX     #RG0-PAGE1
1861 A618           LDA     #RG2-PAGE1
1863 CD0D65         JSR     .XCPYA          ;COPY TO RG2. RG2 NOW PP/UNIT E-3
                    ;NOW GET CORRECTION FACTOR FROM USER...
1866 3DAD           TST     NPTS            ;SEE IF 2 POINTS FOR MESSAGE SELECTION
1868 2607           BNE     TWR10
186A A60F           LDA     #$F             ;SAY "GET NEW CORRECT FCTR"
186C CD143A         JSR     .BLOT           ;GET KEY-IN CORRECT FCTR TO RG0 AS E-3
186F 2005           BRA     TWR11
1871 A610   TWR10:  LDA     #$10            ;SAY "GET NEW LO-FLO CORRECT FCTR"
1873 CD143A         JSR     .BLOT
                    ;CAN NOW COMPUTE THE NEW COUNT VALUE TO USE FOR FIRST CAL RUN...
1876 0FBC05  TWR11: BRCLR   7,TAF,TWR12
1879 AE28           LDX     #RG4-PAGE1      ;DO ADJUSTMENT IF TWK-AGAIN
187B CD14A4         JSR     .TWADJ          ;ADJUSTS CF2LO IN RG0 IF NECESSARY
187E AE18   TWR12:  LDX     #RG2-PAGE1
1880 A608           LDA     #RG0-PAGE1
1882 CD0F0F         JSR     .XDIVA          ;MAKES RG2=REQD PULSES/UNIT
1885 AE34           LDX     #DCNU-ROMBAS
1887 A608           LDA     #RG0-PAGE1
1889 CD0D80         JSR     .XROMA          ;MAKES RG0=00000005
188C AE18           LDX     #RG2-PAGE1
188E A608           LDA     #RG0-PAGE1
1890 CD0EC1         JSR     .XMLTA          ;MAKES RG2=REQD n PULSES FOR LO CAL RUN
                    ;
                    ;RG2 NOW HAS REQUIRED # PULSES FOR LOW CAL RUN.
                    ;SEE IF 2 POINTS REQUIRED. IF SO, DO SAME CALCS FOR HI RUN...
1893 3DAD           TST     NPTS            ;NON-ZERO IF 2 REQUIRED
1895 2736           BEQ     TWRX            ;SKIP IF NOT
                    ;
                    ;NEED 2 POINTS. DO SAME CALCS FOR HI RUN...
1897 CD1475         JSR     .GETCT          ;GET cal-chk-count FRM ROM TO RG0
189A AE08           LDX     #RG0-PAGE1
189C A620           LDA     #RG3-PAGE1
189E CD0F0F         JSR     .XDIVA          ;RG0 NOW HAS chk-count/READING=PP/UNIT
18A1 CD1467         JSR     .R0E3           ;SHIFT LFT 3X TO MAKE (PP/UNIT)E-3
18A4 AE08           LDX     #RG0-PAGE1
18A6 A620           LDA     #RG3-PAGE1
18A8 CD0D65         JSR     .XCPYA          ;COPY TO RG3. RG3 NOW CURNT PP/UNIT
                    ;NOW GET CORRECTION FACTOR FROM USER...
18AB A611           LDA     #$11            ;SAY "GET HI-FLO CORR FCTR"
18AD CD143A         JSR     .BLOT           ;GET KEY-IN CORRECT FCTR TO RG0 AS E-3
18B0 0FBC05         BRCLR   7,TAF,TWR13
18B3 AE30           LDX     #RG5-PAGE1      ;DO ADJUSTMENT IF TWK-AGAIN
18B5 CD14A4         JSR     .TWADJ          ;ADJUSTS CF2HI IN RG0 IF NECESSARY
                    ;CAN NOW COMPUTE THE NEW COUNT VALUE TO USE FOR 2ND CAL RUN...
18B8 AE20   TWR13:  LDX     #RG3-PAGE1
18BA A608           LDA     #RG0-PAGE1
18BC CD0F0F         JSR     .XDIVA          ;MAKES RG3=REQD PULSES/UNIT
18BF AE34           LDX     #DCNU-ROMBAS
18C1 A608           LDA     #RG0-PAGE1
18C3 CD0D80         JSR     .XROMA          ;MAKES RG0=00000005
18C6 AE20           LDX     #RG3-PAGE1
18C8 A608           LDA     #RG0-PAGE1
18CA CD0EC1         JSR     .XMLTA          ;MAKES RG3=REQD n PULSES FOR HI CAL RUN
                    ;
                    ;COME HERE FOR EITHER 1-PT OR 2-PT...
                    ;COPY THE CAL-CHECK DEFAULTS TO COUNT/RATE AGAIN, AND THEN PUT
                    ;OUR NEW VALUES IN FOR COUNT1 AND COUNT2
18CD CD147C  TWRX:  JSR     .CPYCR          ;COPY DEFALUT COUNT/RATE VALUES AGAIN
18D0 AE18           LDX     #RG2-PAGE1
18D2 A690           LDA     #CNT1
18D4 CD0FEF         JSR     .DXBA           ;CNVRT NEW COUNT1 TO BINARY
18D7 3DAD           TST     NPTS            ;SEE IF NEED SECOND...
18D9 2707           BEQ     .TWCR           ;SKIP IF NOT
```

```
18DB AE20              LDX    #RG0-PAGE1
18DD A694              LDA    #CNT2
18DF CD0FEF            JSR    .DXBA            ;ELSE CNVT NEW COUNT2 TO BINARY
                ;
                ;NOW READY TO DO THE CAL RUNS FOR TWEAK.
                ;FIRST DECIDE WHETHER 1 OR 2 RUNS NEEDED...
                ;
                ;FIRST update the shadow registers...
18E2 CD1453     .TWCR: JSR    .TOSHA
                ;THIS IS FOR REPEAT FUNCTION...
18E5 CD145D     RPT2:  JSR    .FRSHA
                ;NOW SEE IF 1PT OR 2PT...
18E8 3DAD              TST    NPTS
18EA 2609              BNE    TCR2
                ;NEED ONLY 1 POINT. DO IT.
18EC CD13D2            JSR    .RCL11           ;DO CAL RUN 1 OF 1
18EF CD1907            JSR    .ALDON           ;C CLR = SUCCESS. GOTO COMMON EXIT
18F2 CC18E5            JMP    RPT2             ;IF HERE DO AGAIN
                ;NEED 2 POINTS. DO IT.
18F5 CD13D6     TCR2:  JSR    .RCL12           ;DO RUN 1 OF 2
18F8 CD159B            JSR    .W15             ;WAIT 15 SECONDS BEFORE SECOND RUN
18FB CD1427            JSR    .XFCR            ;TRANSFER CNT2, RAT2 TO CNT1, RAT1
18FE CD13DA            JSR    .RCL22           ;DO CAL RUN 2 OF 2
1901 CD1907            JSR    .ALDON           ;SUCCESS. GOTO COMMON EXIT.
1904 CC18E5            JMP    RPT2
                ;
                ;
                ;COME HERE AT SUCCESSFUL COMPLETION OF ANY PROCEDURE...
                ;SAY "DONE, RESTORE ETC"
1907 CD159B     .ALDON JSR    .W15             ;WAIT 15 SEC (EDM WILL FLASH)
190A A605              LDA    #5
190C CD1231            JSR    .DGM             ;THEN SHOW DONE MESSAGE
190F A6CD              LDA    #$CD
1911 AE00              LDX    #0
1913 CD1289            JSR    .D4KL            ; AND "OK"
1916 CD1403            JSR    .WFKP            ;WAIT FOR FKEY PRESS
1919 02A603            BRSET  1,FKEYS,ALD1     ;REPEAT ON FK1
191C CC166A            JMP    .STG1            ;ANY OTHER FK BACK TO TOP OF PGM.
191F 81         ALD1:  RTS
                ;
                ;
                ;
1920            PGEND  EQU    $
1120            USDROM EQU    PGEND-ROMBAS     ;AMT OF ROM USED
06D6            FREROM EQU    IVBAS-PGEND      ;AMT OF ROM AVAILABLE
                ;
                ;
                ;****************************
                ;END OF CODE. SET UP VECTORS NOW
                ;****************************
1FF6                   ORG    IVBAS            ;ORG OF VECTORS
                ;
1FF6 1591              DW     .TICK            ;TIMER FROM WAIT MODE
1FF8 1591              DW     .TICK            ;TIMER NORMAL (AWAKE)
1FFA 15DF              DW     .DOEXT           ;EXT INTRPT (IRQ)
1FFC 15E8              DW     .PINIT           ;SWI. NOT USED THIS PGM
1FFE 15E8              DW     .PINIT           ;RESET
                ;
                ;
0000                   END
                 0000         .WCPY   1418     DCNU   0834     DGD2   12CC
                 0000         .WDCTL  11E3     DCP    00B6     DUMMY  0100
.ADLY    15C1         .WDDAT  11EF     DCTL   11E6     DUX    1241
.AHEAD   16B8         .WDNB   11FB     DDAT   11F2     DXA1   1000
.ALDON   1907         .WFKP   1403     DDRA   0004     DXX    127E
.BAKUP   16B0         .XADDA  0E33     DDRB   0005     ERAMB  0080
.BLAT    1433         .XCHK0  0D9B     DGD1   1176     ERAMT  03FF
.BLOT    143A         .XCLR   0DAB     DGD2   1167     EXTIV  1FFA
.BXDA    0FA9         .XCMPA  0E14     DGD3   1186     FALSE  0000
.CPYCR   147C         .XCPYA  0D65     DGD5   1179     FKEYS  00A6
.D4KL    1289         .XDIVA  0F0F     DGD6   117D     FKF    00A7
.DFT     1239         .XFCR   1427     DGDD   1195     FLTF   00A8
.DGDSP   115F         .XINC   0DB9     DGDX   1196     FLUID  0000
```

| | | | | | | | |
|---|---|---|---|---|---|---|---|
| .DGM | 1231 | .XMLTA | 0EC1 | DGN1 | 1066 | FPROD | 0168 |
| .DGNOV | 1106 | .XMSG | 11CF | DGN4 | 106E | FQUOT | 0168 |
| .DGNTR | 1101 | .XROL | 0DD7 | DGN5 | 107D | FREROM | 06D6 |
| .DKDN | 10AB | .XROMA | 0D80 | DGN6 | 108A | FRS1 | 145F |
| .DOCRN | 12CA | .XROR | 0DF6 | DGN7 | 1097 | FTC0 | 1410 |
| .DOEXT | 15DF | .XSHL | 0DD6 | DGN8 | 1075 | FTC1 | 1413 |
| .DSO | 12A9 | .XSHR | 0DF5 | DGN9 | 1082 | GBT | 00A4 |
| .DXBA | 0FEF | .XSUBA | 0E81 | DGNA | 108F | GPC0 | 00AA |
| .FRSHA | 145D | ADL0 | 15CF | DGNB | 10A4 | GPT0 | 00A9 |
| .FTCHK | 1407 | ADL1 | 15CB | DGNC | 109C | IAI1 | 137A |
| .FTM | 0B13 | ADT0 | 00B1 | DGNI | 1057 | IAI2 | 1393 |
| .GETCT | 1475 | ADT1 | 00B2 | DIVDD | 0158 | IAI3 | 1388 |
| .IILA | 0200 | AICNT | 00B7 | DIVSR | 0150 | IAI8 | 1386 |
| .KLM | 0AC1 | AIMSK | 00A2 | DKD1 | 1137 | IDF1 | 00BB |
| .MLOC | 11A8 | AITMP | 00A0 | DKD2 | 1143 | IDFP | 00BA |
| .NEWP | 1696 | ALD1 | 191F | DKD3 | 114E | IILA | 11A4 |
| .PINIT | 15E8 | ANDX | 00AC | DKD5 | 10FE | IRAMB | 0010 |
| .R0E3 | 1467 | BDT | 008E | DKD50 | 10AD | IRAMT | 007F |
| .RCHK | 13C4 | BLT0 | 1444 | DKD51 | 10AF | IVBAS | 1FF6 |
| .RCL11 | 13D2 | BTAT0 | 0150 | DKD6 | 1120 | KLN | 00B4 |
| .RCL12 | 13D6 | BTAT1 | 0158 | DKD7 | 1125 | LCLR | 1217 |
| .RCL22 | 13DA | BTICK | 081C | DKD8 | 10BB | LL | 0026 |
| .RESHA | 144E | BXA2 | 0FCF | DKDG | 10C8 | LLM1 | 0027 |
| .RUNCX | 1757 | BXA3 | 0FDC | DKDQ | 1154 | LXT0 | 00BC |
| .SELCT | 16C0 | BXA4 | 0FBA | DKDR | 1159 | MAXFT | 0018 |
| .SETAI | 1487 | CCR0 | 147E | DKDS | 115C | MC0 | 0087 |
| .STG1 | 166A | CIOBAS | 0000 | DKDV | 10DA | MC1 | 0088 |
| .TFND | 0C55 | CNT1 | 0090 | DKDW | 10CE | MC2 | 0089 |
| .TICK | 1591 | CNT2 | 0094 | DKDX | 10E3 | MF0 | 002A |
| .TOSHA | 1453 | CTXT | 00AF | DKDY | 10F5 | MF1 | 008B |
| .TSTP | 158A | D1KL | 1259 | DKDZ | 10C0 | MF2 | 008C |
| .TSTT | 1581 | D4K0 | 1292 | DOC1 | 133C | MF3 | 008D |
| .TWADJ | 14A4 | D4K1 | 1295 | DOC2 | 1361 | MLCND | 0158 |
| .TWCR | 18E2 | D4K2 | 12A3 | DOC3 | 13BA | MLG | 008F |
| .TWKA | 177C | DBS2 | 1048 | DOC4 | 138F | MLOQ | 11A8 |
| .TWKP | 17A8 | DBS3 | 1056 | DOC5 | 139A | MLO1 | 115F |
| .ULM | 083C | DBSUB | 103B | DOCS | 13B0 | MLO2 | 110C |
| .W15 | 159B | DCCT | 082C | DSO1 | 1290 | MLPLR | 0150 |
| | | RG0 | 0108 | TAF | 00BC | XADA2 | 0E51 |
| | | RG1 | 0110 | TC128 | 000F | XADA3 | 0E55 |
| | | RG2 | 0118 | TC32 | 000D | XADA4 | 0E66 |
| | | RG3 | 0120 | TC64 | 000E | XADA5 | 0E7C |
| | | RG4 | 0128 | TCCK | 0824 | XASX | 0E73 |
| | | RG5 | 0130 | TCR2 | 18F5 | XC01 | 0DA0 |
| | | RG6 | 0138 | TCTL | 00B8 | XCA2 | 0E2F |
| | | RG7 | 0140 | TDAT | 00B9 | XCL2 | 0DB0 |
| | | RG8 | 0148 | TIMCTL | 0009 | XCMA1 | 0E1C |
| | | RNX0 | 13FA | TIMDAT | 0008 | XCYA1 | 0D6D |
| | | RNX1 | 13F2 | TIMIV | 1FF8 | XDA1 | 0F34 |
| | | RNX2 | 13FC | TIMWV | 1FF6 | XDA11 | 0F1A |
| | | ROMBAS | 0800 | TK10 | 0038 | XDA2 | 0F44 |
| | | RPT1 | 175A | TOS1 | 1455 | XDA5 | 0F55 |
| | | RPT2 | 18E5 | TRUE | FFFF | XDA51 | 0F5E |
| | | RRC0 | 173F | TWA0 | 178A | XDA52 | 0F77 |
| | | RUNX | 13E8 | TWR1 | 1852 | XDA54 | 0F6C |
| | | SAI0 | 1493 | TWR10 | 1371 | XDA6 | 0F9D |
| | | SCTP | 16C9 | TWR11 | 1976 | XDA7 | 0F94 |
| | | SELOF | 1732 | TWR12 | 187E | XDA8 | 0F80 |
| | | SOD | 165D | TWR13 | 18B8 | XDAX | 0FA4 |
| | | SOL | 0D3D | TWRX | 18CD | XDC0 | 1219 |
| | | SOU | 0D15 | UCLR | 1213 | XDC1 | 122A |
| | | ST10 | 1684 | UDL | 0000 | XIN1 | 0D8D |
| | | ST11 | 1673 | USDROM | 1120 | XIN3 | 0DCA |
| | | ST12 | 1690 | UU0 | 1803 | XMA1 | 0ED9 |
| | | STF0 | 16D5 | UU1 | 180E | XMA3 | 0EDB |
| | | SWIIV | 1FFC | UU2 | 1813 | XMA33 | 0EF3 |
| | | TAD0 | 14E8 | UU3 | 1820 | XMS0 | 11D9 |
| | | TAD1 | 1510 | UU4 | 1822 | XRL2 | 0DE2 |
| | | TAD2 | 14BE | UU5 | 1836 | XRMA1 | 0D88 |
| | | TAD3 | 14CA | VV0 | 12E4 | XRR2 | 0E01 |
| | | TAD4 | 1520 | VV1 | 12FD | XSBA1 | 0E9B |
| | | TAD6 | 14F4 | W151 | 15B2 | XSBA4 | 0EB2 |
| | | TAD7 | 151C | WDGK | 00AE | Z0 | 17D4 |
| | | TADC | 1577 | WNB0 | 1203 | Z1 | 17D8 |
| | | TADS | 1555 | WNFK | 105D | Z2 | 17E2 |
| | | TADX | 1580 | XADA1 | 0E3D | | |

What is claimed is:

1. A method of calibrating, with a calibration apparatus including a calibration microcomputer having preset calibration data stored therein, a data entry means for entering data into the calibration microcomputer, and a coil connected to the calibration microcomputer, a flowmeter connected into a line through which fluid can flow, which flowmeter includes a body and which flowmeter also includes the following disposed in the body: an electromagnetic member, a display, a flowmeter microcomputer connected to the electromagnetic member and the display, and control means for placing the flowmeter microcomputer in a calibration mode of operation, said method comprising the steps of:
  coupling the coil of the calibration apparatus to the body of the flowmeter without removing the flowmeter from the line;
  operating the control means of the flowmeter to place the flowmeter microcomputer in the calibration mode;
  activating the calibration microcomputer;
  operating the data entry means of the calibration apparatus so that the calibration microcomputer generates a calibration signal; and
  transmitting the calibration signal through the coil of the calibration apparatus to the electromagnetic member of the flowmeter.

2. An apparatus for calibrating a flowmeter which includes a body and an electromagnetic member disposed in the body, said apparatus comprising:
  calibration means for providing a calibration signal characterized as electrical pulses;
  electromagnetic means, connected to said calibration means, for transmitting electromagnetic pulses in response to said electrical pulses; and connecting means for connecting said electromagnetic means to the body of the flowmeter so that the electromagnetic member of the flowmeter is responsive to said electromagnetic pulses, said connecting means includes a strap, including two ends and having said electromagnetic means connected thereto intermediate said two ends, said two ends adapted to be secured together after said strap is wrapped around the body of the flowmeter.

3. An apparatus as defined in claim 2, wherein said electromagnetic means includes:
  a container connected to said strap;
  a metallic member disposed in said container;
  a coil wound around said metallic member; and conductor means for connecting said coil to said calibration means.

4. An apparatus as defined in claim 3, wherein said calibration means includes:
  a housing;
  a microcomputer disposed in said housing;
  a display disposed in said housing and connected to said microcomputer;
  data entry means, disposed in said housing and connected to said microcomputer in said housing and connected to said microcomputer, for entering data into said microcomputer; and
  connector means, disposed in said housing, for connecting said microcomputer to said conductor means.

5. An apparatus as defined in claim 4, wherein said calibration means further includes:
  power supply means for providing electrical energy to said apparatus;
  switch means for activating said power supply means; and
  timer means, having a time period which expires if the time period is not restarted prior thereto, for automatically deactivated said power supply means when said time period expires.

6. An apparatus as defined in claim 2, wherein said calibration means includes:
  a portable housing separate from the flowmeter;
  a display disposed in said housing;
  data entry means, disposed in said housing, for entering data;
  computing means, disposed in said housing, for computing the calibration signal in response to said data entry means and for controlling said display in response thereto; and
  connecting means, disposed in said housing, for providing electrical pulses to said electromagnetic means in response to said computing means.

* * * * *

UNITED STATES PATENT AND TRADEMARK OFFICE
CERTIFICATE OF CORRECTION

PATENT NO. : 4,918,973
DATED : April 24, 1990
INVENTOR(S) : Richard M. Kruse

It is certified that error appears in the above-identified patent and that said Letters Patent is hereby corrected as shown below:

Column 1, line 48, delete "slowmeter" and substitute therefor --flowmeter--;

Column 4, line 58, after "because" and before "of" insert --each--;

Column 5, line 64, delete "10-I3" and substitute therefor --I0-I3--;

Column 7, line 68, delete "output put" and substitute therefor --output--;

Column 9, line 1, delete "Two" and substitute therefor --To--;

Column 9, line 49, delete "present" and substitute therefor --preset--;

Column 11, line 25, delete "tionroutine" and substitute therefor --tion-routine--;

Column 12, line 2, delete "an" and substitute therefor --and--;

Column 12, line 13, delete "is" and substitute therefor --if--;

Column 12, line 33, delete "pulses-pergallon" and substitute therefor --pulses-per-gallon--;

Column 12, line 43, after "enough" and before "to" insert --times--; and

UNITED STATES PATENT AND TRADEMARK OFFICE
CERTIFICATE OF CORRECTION

PATENT NO. : 4,918,973

DATED : April 24, 1990

INVENTOR(S) : Richard M. Kruse

It is certified that error appears in the above-identified patent and that said Letters Patent is hereby corrected as shown below:

Column 80, lines 14-15 (claim 4), delete "connected to said microcomputer in said housing and".

Signed and Sealed this

Sixteenth Day of June, 1992

Attest:

DOUGLAS B. COMER

Attesting Officer

Acting Commissioner of Patents and Trademarks